(12) United States Patent
Toyoda et al.

(10) Patent No.: US 7,136,097 B1
(45) Date of Patent: Nov. 14, 2006

(54) CAMERA SYSTEM FOR HIGH-SPEED IMAGE PROCESSING INCLUDING SELECTION OF AT LEAST ONE FRAME BASED ON PROCESSED RESULTS

(75) Inventors: Haruyoshi Toyoda, Hamamatsu (JP); Kazuhiro Nakamura, Hamamatsu (JP); Seiichiro Mizuno, Hamamatsu (JP); Hiroo Yamakawa, Hamamatsu (JP); Naohisa Mukohzaka, Hamamatsu (JP)

(73) Assignee: Hamamatsu Photonics K.K., Hamamatsu (JP)

( * ) Notice: Subject to any disclaimer, the term of this patent is extended or adjusted under 35 U.S.C. 154(b) by 694 days.

(21) Appl. No.: 10/089,192

(22) PCT Filed: Oct. 4, 2000

(86) PCT No.: PCT/JP00/06905

§ 371 (c)(1),
(2), (4) Date: Mar. 27, 2002

(87) PCT Pub. No.: WO01/26051

PCT Pub. Date: Apr. 12, 2001

(30) Foreign Application Priority Data

Oct. 4, 1999 (JP) .................................. 11-282969
Oct. 19, 1999 (JP) .................................. 11-296753

(51) Int. Cl.
*H04N 5/228* (2006.01)
(52) U.S. Cl. .................................... 348/222.1; 348/308
(58) Field of Classification Search ............ None
See application file for complete search history.

(56) References Cited

U.S. PATENT DOCUMENTS

| 4,805,224 A | * | 2/1989 | Koezuka et al. ............ 382/141 |
| 5,196,938 A | * | 3/1993 | Blessinger ................... 348/22 |
| 5,875,004 A | * | 2/1999 | Yamane et al. ............. 348/705 |
| 5,877,715 A | * | 3/1999 | Gowda et al. ............. 341/122 |
| 6,115,066 A | * | 9/2000 | Gowda et al. ............. 348/308 |
| 6,118,483 A | * | 9/2000 | Etoh ......................... 348/315 |
| 6,147,712 A | * | 11/2000 | Shimamoto et al. ........ 348/446 |
| 6,636,254 B1 | * | 10/2003 | Onishi et al. ................ 348/65 |

FOREIGN PATENT DOCUMENTS

| JP | A 7-85260 | 3/1995 |
| JP | B2 7-62866 | 7/1995 |
| JP | A 10-21407 | 1/1998 |
| JP | A 10-145680 | 5/1998 |
| WO | WO 95/24793 | 9/1995 |

OTHER PUBLICATIONS

U.S. Appl. No. 09/807,039, filed Apr. 9, 2001, Toyoda et al.

(Continued)

*Primary Examiner*—Ngoc-Yen Vu
*Assistant Examiner*—Hung Lam
(74) *Attorney, Agent, or Firm*—Oliff & Berridge, PLC

(57) ABSTRACT

The analog-to-digital converter array 13 includes one analog-to-digital converter 210 for each row of photodetectors 120 in the photodetector array 11. The image-processing unit 14 includes the plurality of processing circuits 400 for performing high-speed image processing. The signal converter 17 combines the output signals from the analog-to-digital converter array 13 with output signals from the image-processing unit 14. Under control of the control circuit 15 and the signal conversion controller 19, the signal converter 17 downconverts the composite signal at an important timing to a frame rate suitable for display on the monitor 18 and subsequently displays the signal on the monitor 18.

20 Claims, 32 Drawing Sheets

OTHER PUBLICATIONS

U.S. Appl. No. 09/936,267, filed Sep. 10, 2001, Shikawa et al.
Standley, "An Object Position and Orientation IC with Embedded Imager", Solid State Circuits, vol. 26, No. 12, pp. 1853-1859, 1991.
Hutchinson et al., "Computing Motion Using Analog and Binary Resistive Networks", Computer, vol. 21, pp. 52-64, 1988.
Kyuma et al., "Artificial Retinas- fast versatile image processors", Nature, vol. 372, 1994.
Integrated Vision Products AB, MAPP2200 Product Information Ver 2.1, 1998.

* cited by examiner

CAMERA SYSTEM FOR HIGH-SPEED IMAGE PROCESSING INCLUDING SELECTION OF AT LEAST ONE FRAME BASED ON PROCESSED RESULTS

TECHNICAL FIELD

The present invention relates to a high-speed camera system having an image processing function.

BACKGROUND ART

High-speed image processing is required to operate robots at a high speed in a factory automation (FA) system or the like. For example, when a robot is configured with a feedback loop between its vision sensor and its actuator, the actuator can be controlled in units of milliseconds. Accordingly, the image processing speed that matches this speed is required. However, because the image processing speed in modern vision systems is limited by the video frame rate, the robot can only operate at low speeds that match this image processing speed. It is impossible to take full advantage of the robot's performance. Inspection systems with using vision sensors is limited in their accuracy and speed because of the restrictions of the video frame rate.

There are some high-speed CCD cameras that can take images within about one (1) millisecond. In these devices, the images are temporarily stored in memory and later read and processed. Therefore, the devices can be applied to such applications as image analysis. However, the devices have almost no real-time capability, and are not suitable for controlling robots, on-line inspections, or other applications.

In order to overcome these problems, institutes such as the Massachusetts Institute of Technology, the California Institute of Technology, and Mitsubishi Electric Corporation have been researching a vision chip that combines the image reading portion and the processing portion into one unit ("An Object Position and Orientation IC with Embedded Imager," David L. Standley, *Solid State Circuits*, Vol. 26, No. 12, December 1991, pp. 1853–1859, IEEE); "Computing Motion Using Analog and Binary Resistive Networks," James Hutchinson, et al., *Computer*, Vol. 21, March 1988, pp. 52–64, IEEE); and "Artificial Retinas—fast versatile image processors," Kazuo Kyuma, et al., *Nature*, Vol. 372, Nov. 10, 1994). However, these chips employ a fixed analog circuit that is easy to integrate. Accordingly, these circuits have various shortcomings. That is, the circuits require subsequent-processing of output signals. The circuits suffer from the problems specific to analog signals. For example, the circuits are required to cope with noise and to attain a desired signal-to-noise ratio. The type of image processing they can perform is limited to special applications. The circuits have a lack of universality because the contents of the image processing are limited to particular applications.

To overcome these problems, a technology for a vision sensor capable of performing general purpose high-speed image processing is disclosed in Japanese examined patent application publication no. HEI-7-62866 (hereinafter referred to as conventional technology no. 1). For further improving integration, a technology for optimizing transfer lines in each row has been proposed in Japanese unexamined patent application publication HEI-10-145680 (hereinafter referred to as conventional technology no. 2). These types of vision sensor increase processing speed by providing a plurality of processing elements in one to one correspondence with a plurality of photodetector elements to achieve complete parallel processing. A technology for constructing a high-resolution sensor through partial parallel processing by providing one processing element for each array of photodetector elements is disclosed in International Publication WO95/24793 (hereinafter referred to as conventional technology no. 3). When used in inspection equipment on a production line, this type of vision sensor can greatly reduce the length of testing time.

In the actual use of these sensors, however, it is frequently necessary for a human being to visually confirm images while the images are being processed. When examining products on a belt conveyor, for example, a human worker is often entrusted with the final check. Hence, the image must be outputted to a display device that the worker can view. When setting and adjusting the equipment, in order to grasp how the inspection is achieved, visual confirmation is also necessary for checking lighting conditions on the image pick up position, lens focus, stains on the lenses, and other conditions. An efficient method of establishing processing algorithms for inspection methods is to set threshold levels and matching points while monitoring the processes by viewing actual images. It is possible to efficiently estimate the processing algorithms.

However, devices conforming to conventional technologies nos. 1 through 3 do not have an efficient function for outputting acquired images to external devices. These devices can only output results of calculations, in the form of characteristic quantities (such as the object's center of gravity and inspection results) or in the form of control signals (for controlling the motor and the like). Even if those devices are modified to output the acquired images, the frame rate of the images outputted from the high-speed camera is extremely fast and cannot be supported by a normal television monitor. Accordingly, a special display device is required to output the images, thereby increasing the cost of the system. Further, even if the images outputted from the high-speed camera can be displayed as they are, necessary details of the image may not be perceived by the human eye, which has a limited response rate (about 30 milliseconds).

A device for monitoring fast moving objects at a high-resolution has been disclosed in Japanese unexamined patent application publication HEI-10-21407 (hereinafter referred to as conventional technology no. 4). This monitor operates by overlaying image data from the high-speed image-processing device on image data from a conventional image-processing device. However, the frame rate of images outputted from the monitor of conventional technology no. 4 is limited to nearly the same video rate as the conventional rate. Therefore, it is difficult to extract the required information when observing fast moving objects.

Sometimes it is important to capture images at a particular timing, such as the instant of a press or the penetration of a drill performed by automated machine tools, the instant a part is inserted, the moment a golf club or a baseball bat meets a ball, and the like. It is difficult to display such images at the appropriate timing and in a manner that can be perceived by the human eye.

DISCLOSURE OF THE INVENTION

In view of the foregoing, it is an object of the present invention to solve the above-described problems, and to provide a camera system for high-speed image processing which is capable of performing image processing at a high rate of speed and which is capable of outputting images that are picked up at a particularly important timing.

In order to overcome the above-described problem and other problems, the present invention provides a camera for high-speed image processing, comprising: a photodetector array having a plurality of photodetectors, which are arranged two-dimensionally in a plurality of rows and in a plurality of columns and which are divided into a plurality of blocks, the photodetector array repeatedly receiving optical images and generating output signals for the optical images in a plurality of consecutive frames at a predetermined frame rate; an analog-to-digital converter array including a plurality of analog-to-digital converters in one-on-one correspondence with the plurality of blocks in the photodetector array, each analog-to-digital converter performing analog-to-digital conversion of the output signals which are read sequentially from the photodetectors in the corresponding block; an image-processing unit performing predetermined parallel processes on digital signals, which are transferred from the analog-to-digital converter array and which correspond to the signals outputted from the photodetectors, thereby generating a processed result signal indicating the results of the processes; a selector selecting at least one frame based on the processed results obtained by the image-processing unit; a signal converter converting, into an image signal of a desired frame rate, at least one of the processed result signal and the output signal from the analog-to-digital converter array, the signal converter outputting the image signal; and a signal conversion controller controlling the signal converter to perform the image signal conversion operation for the at least one frame selected by the selector.

In the camera system for high-speed image processing according to the present invention, the image-processing unit performs parallel processes, thereby attaining high-speed processing in real-time. Moreover, the camera system includes the signal converter. The signal converter converts, into image signals of a desired frame rate, at least one of the processed result signals from the image-processing unit and the signal from the analog-to-digital converter array. The signal converter outputs the image signals. Thus, the camera system extracts a desired image based on the processing results by the image-processing unit, and converts, into image signals of the desired frame rate, at least one of the processed result signals for the extracted image and the output signal from the analog-to-digital converter array for the extracted image.

Accordingly, by outputting at least one of the above signals at an appropriate frame rate, it is possible to output an image for a special timing at an appropriate frame rate. For example, by appropriately displaying at least one of the above signals for the extracted image on a monitor, an image of an important timing can be monitored. Also, by appropriately outputting at least one of the above signals for the extracted image to an image-processing device in a later stage, it is possible to supply an image of an important timing for further image processing. Accordingly, the present invention can perform high-speed image processing through parallel processes and output the processed result at a desired timing.

It is preferable that the desired frame rate is lower than the predetermined frame rate. In this case, the signal converter downconverts at least one of the processed result signals from the image-processing unit and the signal outputted from the analog-to-digital converter array, into an image signal of a desired low frame rate supported by a monitor, which is used to display images, or supported by an image-processing unit for performing further image processes, and outputs the image signal. It is possible to display the image, which has been processed at a high speed, on a monitor at an appropriate frame rate and for a desired timing required for performing visual inspections or the like. It is therefore possible to display only the images that need attention and therefore that have been selected from all the images. Further, by outputting images, which have been processed at a high speed, at a desired frame rate for a timing required for image processing or the like, it is possible to extract and output only the images that need attention.

It is preferable that the signal converter converts either one of the output signal from the analog-to-digital converter array and the processed result signal, into the image signal of the desired frame rate, and outputs the image signal. Hence, it is possible to extract desired images from among the raw images obtained by the photodetector array, per se. and the images obtained through processing by the image-processing unit, and to output the extracted desired images. Accordingly, it is possible to extract and display only images that need attention, for example.

The signal converter may combine the output signal from the analog-to-digital converter array and the processed result signal, convert the combined signal into the image signal of the desired frame rate, and output the image signal. For example, with this construction, it is possible to extract desired images from the raw images, obtained by the photodetector array, and to display those images along with processing results obtained by the processing of the extracted desired images. For example, the raw image and the processed result image can be displayed next to each other, top and bottom or left and right. Accordingly, the present invention achieves high-speed image processing using parallel processes, and displays the processed results superimposed over the original image on a monitor at a desired timing. For example, it is possible to extract only images that need attention and emphasize those images in the monitor display.

It is preferable that the signal converter has a buffer memory at a signal input side thereof, the buffer memory storing at least one of the output signal from the analog-to-digital converter array for at least several frames and the processed result signal for the at least several frames. With this construction, it is possible to extract a plurality of images, such as consecutive images, at a special timing, and to output the extracted images thereafter. By providing the signal converter with the data buffer capable of storing image data for a plurality of frames, it is possible to display the video images around a desired timing while slowing down the display speed.

It is preferable that the camera for high-speed image processing according to the present invention further comprises a data buffer storing predetermined process data, the image-processing unit performing a predetermined parallel process, using the predetermined process data, onto the digital signals that are transferred from the analog-to-digital converter array and that correspond to the signals outputted from the photodetectors. By using the predetermined process data stored in the data buffer, it is possible to perform processes, particularly comparison processes and the like, at a high speed.

It is preferable that the plurality of analog-to-digital converters in the analog-to-digital converter array are provided in one-on-one correspondence with the plurality of rows or the plurality of columns of photodetectors in the photodetector array. This configuration facilitates data transfer to processing elements, and circuit design.

It is preferable that the image-processing unit includes a plurality of processors in one-to-one correspondence with the plurality of photodetectors, the plurality of processors performing parallel processes on the digital signals that are transferred from the analog-to-digital converter array and that correspond to the signals outputted from the plurality of photodetectors. In this way, processes are performed only once on the plurality of pixels simultaneously, to thereby achieve image processing at a higher rate of speed.

It is preferable that the image-processing unit includes at least one parallel processing circuit, each of the at least one parallel processing circuit performing a corresponding parallel process on the digital signals that are transferred from the analog-to-digital converter array and that correspond to the signals outputted from the photodetectors, thereby outputting a processed result signal indicative of the processed result, the selector selecting at least one frame based on at least one process result from the at least one parallel processing circuit, the signal converter converting at least one of the output signal from the analog-to-digital converter array and the processed result signal obtained by the at least one parallel processing circuit, into the image signal of the desired frame rate, and outputting the image signal.

In this case, it is preferable that each of the at least one parallel processing circuit is provided with several processing elements in one-to-one correspondence with several blocks that make up at least a portion of all the plurality of blocks in the photodetector array, each of the several processing elements performing a predetermined parallel process on the digital signals that are transferred from the corresponding analog-to-digital converter and that are equivalent to the signals outputted from the photodetectors existing in the corresponding block.

When the plurality of analog-to-digital converters in the analog-to-digital converter array are provided in one-to-one correspondence with the plurality of rows of photodetectors in the photodetector array, it is preferable that each of the at least one parallel processing circuits includes several processing elements which are provided in one-to-one correspondence with several rows that make up at least a portion of all the plurality of rows in the photodetector array, each of the several processing elements performing a predetermined parallel process on digital signals that are transferred from the analog-to-digital converter array and that are equivalent to the signals outputted from the photodetectors in the corresponding row.

BRIEF DESCRIPTION OF THE DRAWINGS

FIGS. 11(a)–11(c) are timing charts of image data signals showing the overlap of raw images and processed images, wherein FIG. 11(a) shows the timing of raw image data, FIG. 11(b) shows the timing in which processed signals are combined with the raw image data, and FIG. 11(c) shows another example of the timing in which processed signals are combined with the raw image data;

FIGS. 14(a)–14(c) are explanatory diagrams showing how an image is extracted from consecutive images, wherein FIG. 14(a) is an image prior to a desired extraction timing, FIG. 14(b) is an image at the desired extraction timing, and FIG. 14(c) is an image after the desired extraction timing;

BEST MODE FOR CARRYING OUT THE INVENTION

Figure 1:
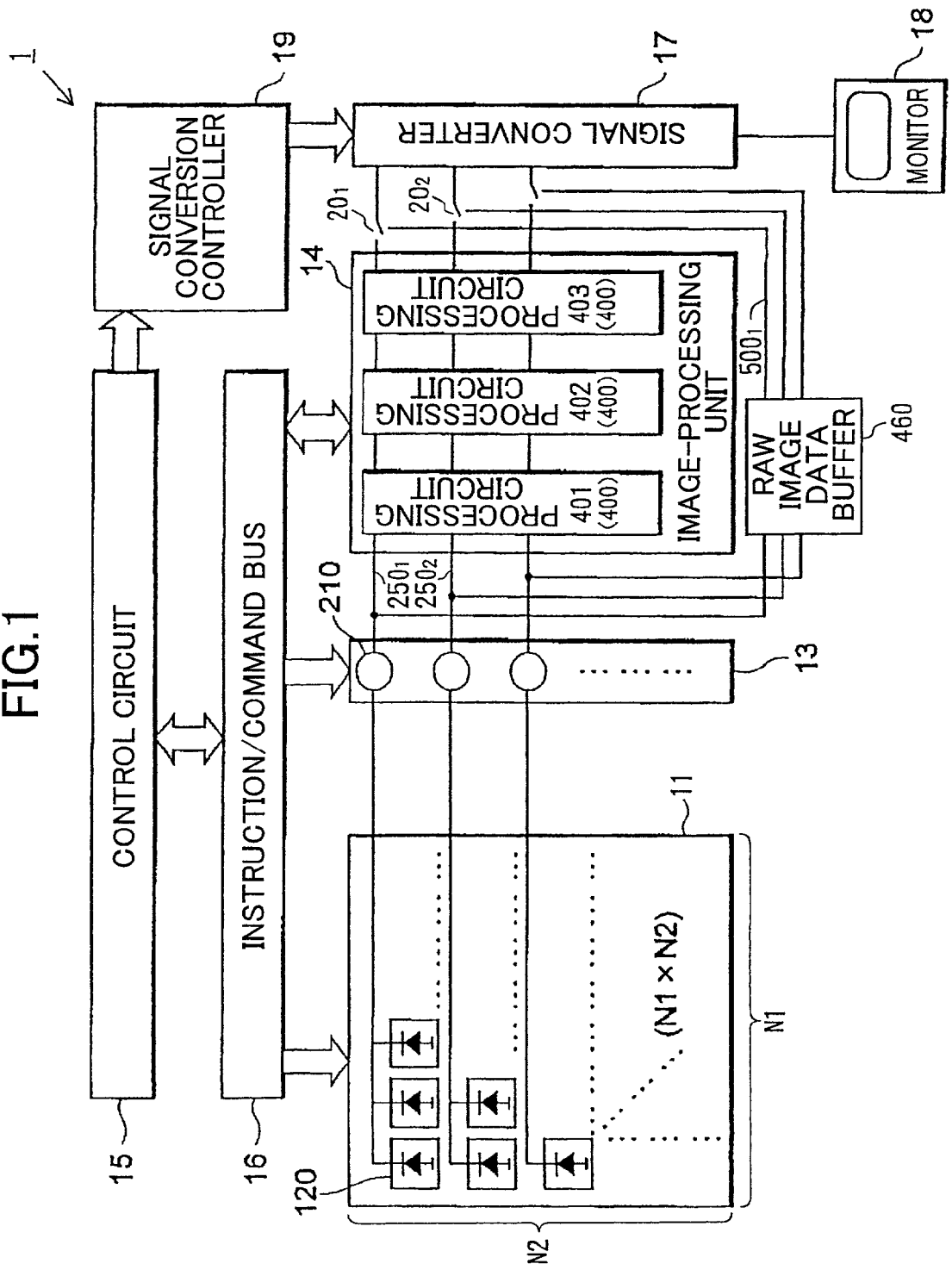
FIG. 1 shows the construction of a camera system for high-speed image processing according to a first embodiment of the present invention.

A camera system for high-speed image processing according to preferred embodiments of the present invention will be described while referring to FIGS. 1 through 27.

Like parts and components are designated by the same reference numerals to avoid duplicating description.

First, a camera system for high-speed image processing according to a first embodiment of the present invention will be described with reference to FIGS. 1 through 16.

FIG. 1 is a block diagram showing a camera system 1 for high-speed image processing according to the first embodiment of the present invention.

The camera system 1 of the present embodiment includes: a photodetector array 11; an analog-to-digital (A/D) converter array 13; an image-processing unit 14; a control circuit 15; an instruction/command bus 16; a signal converter 17; a signal conversion controller 19; and a monitor 18. The photodetector array 11 includes N1×N2 photodetector elements 120 which are arranged two-dimensionally. The analog-to-digital converter array 13 includes N2 analog-to-digital converters 210. Each analog-to-digital converter 210 corresponds to one row of the photodetector array 11, and serves to convert the electric charge outputted from photodetectors, that belong to the corresponding row, into voltage signals and to perform analog-to-digital conversion on the voltage signals. The image-processing unit 14 is provided with a processing element array. The processing element array includes a plurality of (three, in the present example) processing circuits 400. The control circuit 15 is for controlling all the circuits by sending commands and the like thereto. The instruction/command bus 16 is for transmitting signals from the control circuit 15 to all the circuits. The signal converter 17 is for selectively accumulating data signals transmitted from the image-processing unit 14 and converting the signals into image display signals. The signal conversion controller 19 is for controlling the signal converter 17 to perform the signal accumulation and the signal conversion. The monitor 18 is for displaying images by using the image display signals obtained by conversion at the signal converter 17. The monitor 18 is a television monitor, for example, that provides image displays for visual inspection. It is also possible to connect a computer, in place of the monitor 18, to the signal converter 17. In this case, signals selectively converted by the signal converter 17 are outputted directly to the computer as output signals. The computer can perform image processing using conventional image processing techniques on the results of calculations executed by the image-processing unit 14.

Figure 2:
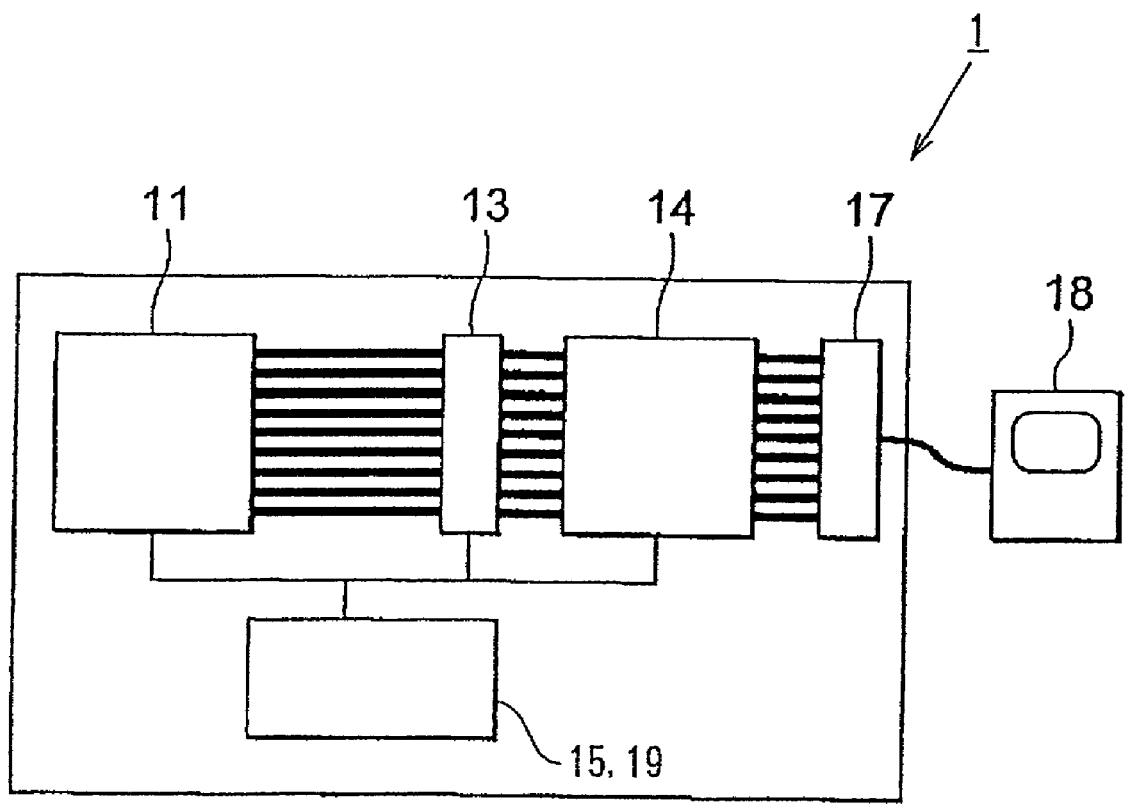
FIG. 2 shows the general configuration of the camera system for high-speed image processing according to the first embodiment.

FIG. 2 shows the structure of an example of the camera system 1 according to the present embodiment. In this figure, semiconductor chips, such as the photodetector array 11, the analog-to-digital converter array 13, the image-processing unit 14, the signal converter 17, the signal conversion controller 19, and the control circuit 15 are bonded directly on a single substrate. The camera system 1 can therefore be manufactured with a high level of integration. In addition, it is possible to employ a processing method suitable for the characteristics of each device, thereby enabling a stable production. In the future, according to the advance of the processing technology, it will become possible to integrate all the functions on one chip.

Next, the internal structure of each circuit will be described.

Figure 3:
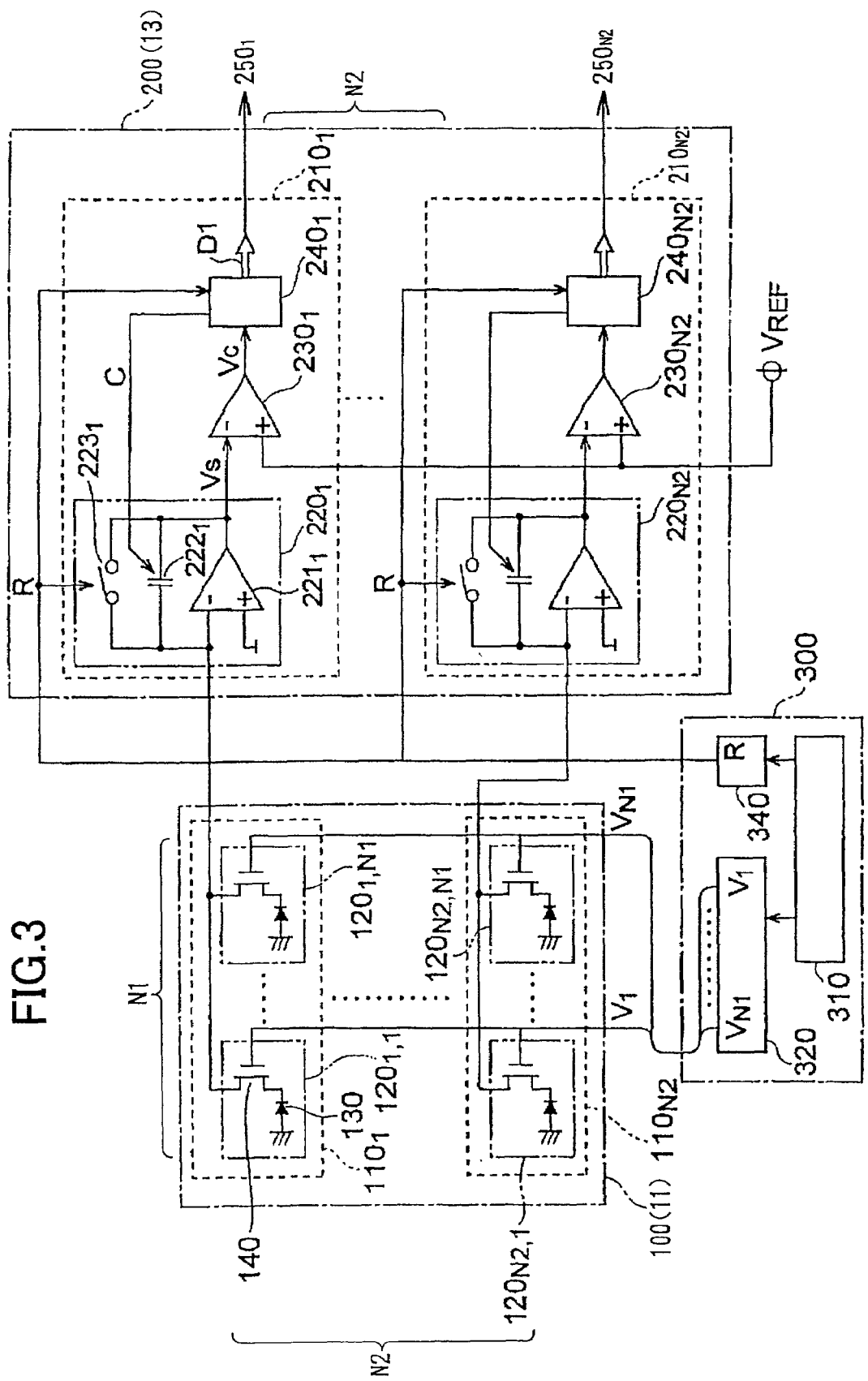
FIG. 3 is a circuit diagram for a photodetector array and analog-to-digital converter array in the camera system according to the first embodiment.

FIG. 3 shows a detailed construction of an image input portion. The image input portion includes: a light receiving portion 100, a signal processing portion 200, and a timing control portion 300. The light receiving portion 100 is for detecting light. (The light receiving portion 100 corresponds to the photodetector array 11 in FIG. 1.) The signal processing portion 200 is for processing output signals from the light receiving portion 100. (The signal processing portion 200 corresponds to the analog-to-digital converter array 13 in FIG. 1.) The timing control portion 300 is for transmitting instruction signals, indicative of operation timings, to both of the light receiving portion 100 and the signal processing portion 200. (The timing control portion 300 corresponds to a part of the control circuit 15 in FIG. 1.)

First, with reference to FIG. 3, the structure of the light receiving portion 100, which corresponds to the photodetector array 11 in FIG. 1, will be described.

One photodetector 120 is configured from a photoelectric conversion element 130 and a switch element 140. The photoelectric conversion element 130 is for generating an electric charge according to the intensity of received light. The switch element 140 is connected to a signal output terminal of the photoelectric conversion element 130. The switch element 140 outputs the electric charge, accumulated in the photoelectric conversion element 130, in response to a horizontal scan signal $V_i$ (i=1 ~N1).

One horizontal photodetector row 110 is constructed from N1 photodetectors 120 which are arranged in a first direction (which will be referred to as "horizontal direction") with their switch elements 140 being connected with one another. The light receiving portion 100 is constructed from N2 horizontal photodetector rows 110 which are arranged vertically, that is, perpendicularly to the horizontal direction. Next, the structure of the signal processing unit 200, which corresponds to the analog-to-digital converter array 13, will be described with reference to the same FIG. 3.

The signal processing unit 200 includes N2 analog-to-digital converters 210 (j=1~N2). Each analog-to-digital converter $210_j$ is for individually extracting electric charges transmitted from the corresponding horizontal photodetector row $110_j$ (j=1~N2), for processing the electric charges, and for outputting digital signals corresponding to the magnitudes of the electric charges. Each analog-to-digital converter $210_j$ includes: an integrating circuit $220_j$ having a charge amp $221_j$; a comparator circuit $230_j$; and a capacity control mechanism $240_j$.

The integrating circuit $220_j$ includes: the charge amp $221_j$; a variable capacity unit $222_j$; and a switch element $223_j$. The charge amp $221_j$ is for amplifying the charge of an input signal received from the horizontal photodetector row $110_j$. The variable capacity unit $222_j$ is connected, on one end, to the input terminal of the charge amp $221_j$, and is connected, on the other end, to the output terminal of the same. The switch element $223_j$ is connected, on one end, to the input terminal of the charge amp $221_j$, and is connected, on the other end, to the output terminal of the same. The switch element $223_j$ is turned ON or OFF in response to a reset signal R, thereby toggling the operation of the integrating circuit $220_j$ between an integrating state and a not-integrating state.

Figure 4:
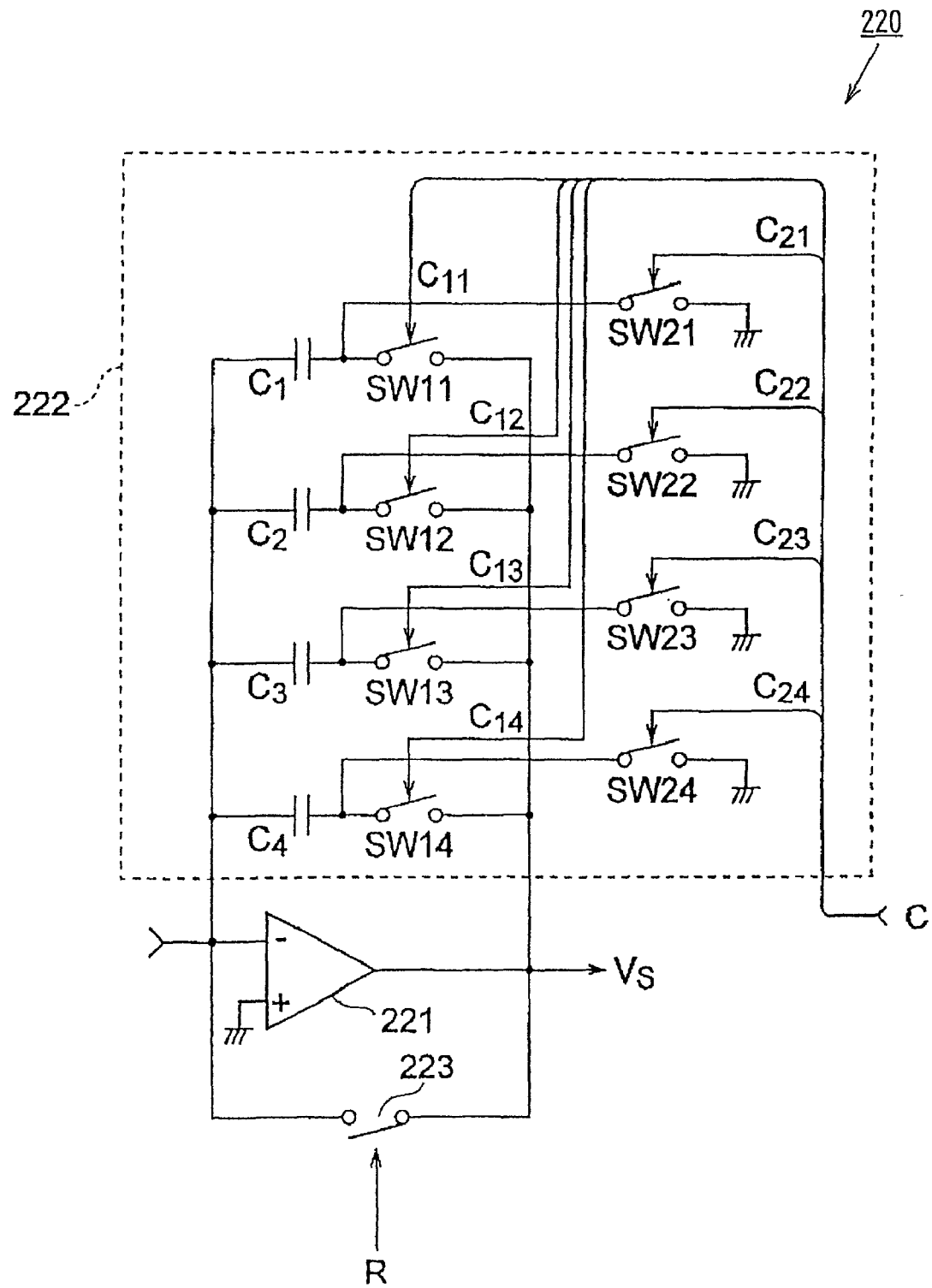
FIG. 4 is a detailed circuit diagram for an integrating circuit in the camera system according to the first embodiment.

FIG. 4 shows a more detailed construction of the integrating circuit 220. This drawing shows one example of the integrating circuit that has an analog-to-digital converting function with a 4-bit (16 gradation) resolution. The integrating circuit 220 will be described below for this circuit structure.

The variable capacity unit 222 includes: capacity elements C1–C4; switch elements SW11–SW14; and other switch elements SW21–SW24. Each of the capacity elements C1–C4 is connected, on one end, to the input terminal of the charge amp 221 that receives signals outputted from the corresponding horizontal photodetector row. Each of the switch elements SW11–SW14 is connected between the other end of a corresponding capacity element C1–C4 and the output terminal of the charge amp 221. The switch elements SW11–SW14 are for opening and closing in response to capacity instructions signals $C_{11}$–$C_{14}$, respectively. Each of the switch elements SW21–SW24 has one terminal, which is connected between the corresponding capacity element C1–C4 and the corresponding switch element SW11–SW14, and another terminal, which is connected to a ground level GND. The switch elements SW21–SW24 are for opening and closing in response to capacity instructions signals $C_{21}$–$C_{24}$, respectively. The capacities $C_1$–$C_4$ of the capacity elements C1–C4 have the following relationships:

$$C_1=2C_2=4C_3=8C_4$$

$$C_0=C_1+C_2+C_3+C_4$$

Wherein $C_0$ is the maximum electrical capacity required by the integrating circuit 220. It is assumed that the saturation charge of the light receiving element 130 (see FIG. 3) is $Q_0$ and that a reference voltage is $V_{REF}$. In this case, the following relationship is satisfied:

$$C_0=Q_0/V_{REF}$$

The remainder circuits in the analog-to-digital converter 210j other than the integrating circuit $220_j$ will be described below while once again referring to FIG. 3. The comparator circuit 230j is for comparing the value of an integral signal $V_s$, which is outputted from the integrating circuit $220_j$, with the reference voltage $V_{REF}$, and for outputting a comparison result signal $V_c$. Based on the value of the comparison result signal $V_c$, the capacity control mechanism $240_j$ outputs a capacity instruction signal C to notify the variable capacity unit $222_j$ in the integrating circuit $220_j$. The capacity control mechanism $240_j$ also outputs, to a data transfer line 250, a digital signal D1 that corresponds to the capacity instruction signal C. In this way, photoelectric conversion output obtained at each photodetector 120(i,j) is converted into a digital signal D(x,y) (where (x,y)=(i,j)), which is a raw image signal indicative of image information.

The output terminal of the capacity control mechanism 240j in each analog-to-digital converter 210j is connected to a corresponding data transfer line $250_j$. Accordingly, N2 data transfer lines 250j are connected to the output terminal of the signal processing unit 200 (analog-to-digital converter array 13). As shown in FIG. 1, the data transfer lines $250_j$ are connected to the image processing unit 14. The data transfer lines $250_j$ are connected also to the raw image data buffer 460. N2 data transfer lines 500j are connected to the output terminal of the raw image data buffer 460. The raw image data buffer 460 is for storing the digital signals D1, which are successively inputted from each data transfer line $250_j$, for a predetermined period of time, and thereafter transferring those digital signals D1 to the signal converter 17 via a corresponding data transfer line 500j.

It is noted that the analog-to-digital converter array 13 has been described above for the case where the analog-to-digital converter array 13 has a 4-bit (16 gradation) resolution. However, the analog-to-digital converter array 13 can be configured to have a 6-bit, 8-bit, or other bit resolution.

Next will be described the structure of the timing control portion 300 shown in FIG. 3. The timing control portion 300 includes: a basic timing portion 310, a horizontal shift register 320, and a control signal portion 340. The basic timing portion 310 is for generating a basic timing to attain clock control of the entire circuit. The horizontal shift register 320 is for generating a horizontal scan signal $V_i$ according to a horizontal scan instruction inputted from the basic timing portion 310. The control signal portion 340 is for generating a reset instruction signal R.

In the image-processing unit 14, the plurality of processing circuits 400 are connected in cascade or in parallel with one another. The analog-to-digital converter array 13 outputs, for each row j, digital signals in order from the most significant bit (MSB). The image-processing unit 14 conducts a predetermined image process on the digital signals thus transferred from the analog-to-digital converter array 13.

The image process performed by each processing circuit 400 can be implemented in either hardware or software. The present embodiment employs processing circuits that perform calculations in hardware.

More specifically, a binarization circuit 401, a center-of-gravity calculating circuit 402, and an edge extraction circuit 403 are provided as the processing circuits 400. Each of the circuits 401, 402, and 403 has a special construction suited for its particular process. Here, a field programmable gate array (FPGA) or the like, which facilitates the development and mounting of hardware for each image process, can be used in order to efficiently perform setting processes for each objective in hardware. Further, it is now possible to design circuits in software using HDL (Hardware Description Language), making it easier to apply conventional knowledge.

Figure 5:
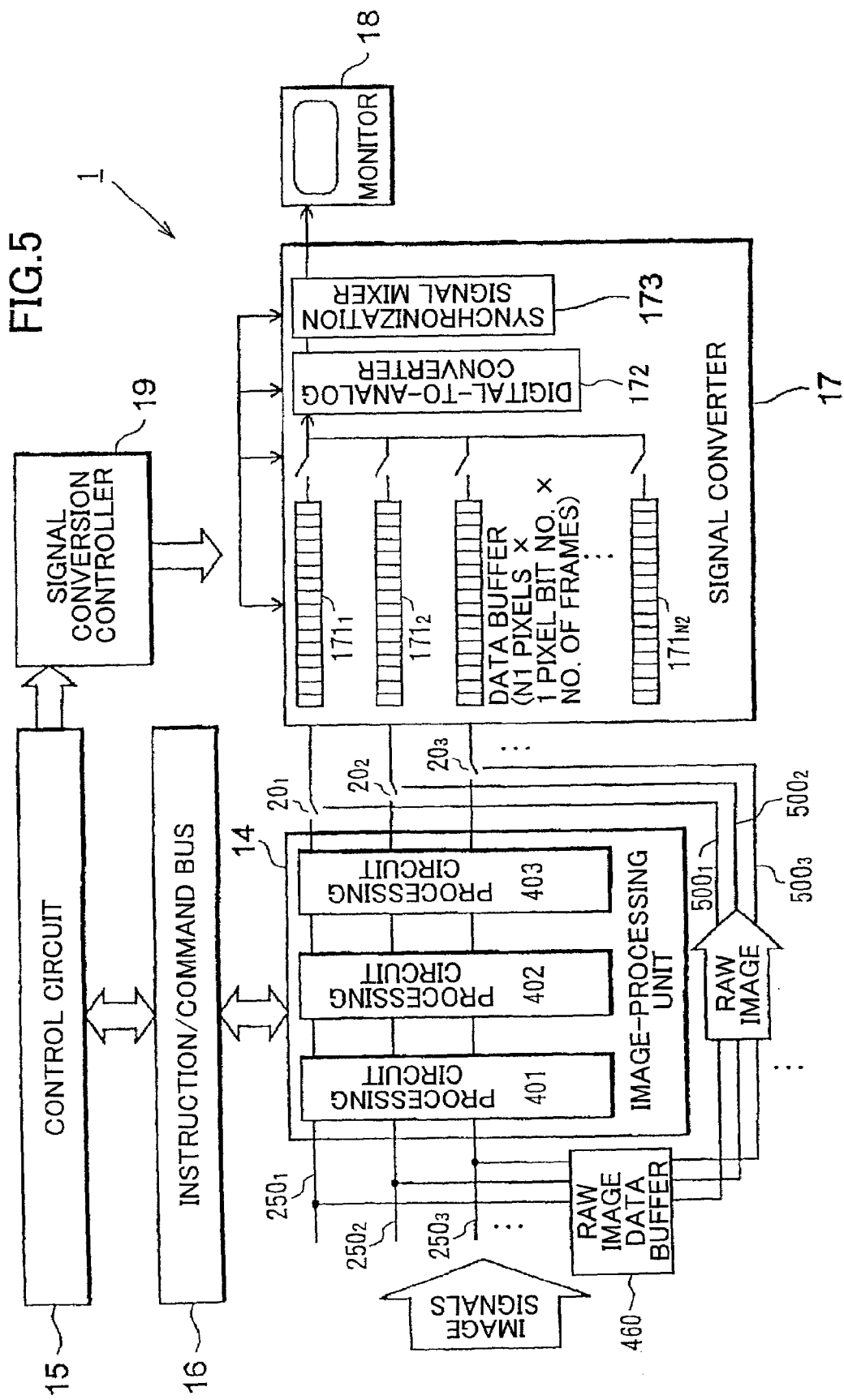
FIG. 5 is a block diagram showing a detailed construction of a signal converter in the camera system according to the first embodiment.

As shown in FIG. 5, the image-processing unit 14 and the raw image data buffer 460 are connected to the signal converter 17 via N2 switches 20. The switches 20 enable the results of processes by the processing circuits 400 in the image-processing unit 14 and the raw image data to be combined as they are supplied to the signal converter 17.

Below, a more detailed description is provided for the binarization circuit 401, the center-of-gravity calculating circuit 402, and the edge extraction circuit 403 in the image-processing unit 14. In the present embodiment, the center-of-gravity calculating circuit 402 and the edge extraction circuit 403 are connected in parallel with each other in the later stage of the binarization circuit 401.

First the binarization circuit 401 will be described with reference to FIG. 6. In the binarization circuit 401, N2 bit comparators 405j are provided in one-to-one correspondence with the N2 rows in the photodetector array 11. One input terminal of each bit comparator $405_j$ is connected to the corresponding data transfer line $250_j$ from the analog-to-digital converter array 13. The other input terminal of the bit comparator 405j is connected to the control circuit 15 via the instruction/command bus 16. The other input terminal is inputted with a data signal for the object of comparison. The output terminal of each bit comparator 405*j* is connected to a data transfer line 440*j*. Each bit comparator 405*j* outputs its comparison results to the corresponding data transfer line 440*j*. In this way, each data transfer line 440*j* is connected, via the analog-to-digital converter array 13, to one pixel line of the corresponding row j in the photodetector array 11.

Figure 6:
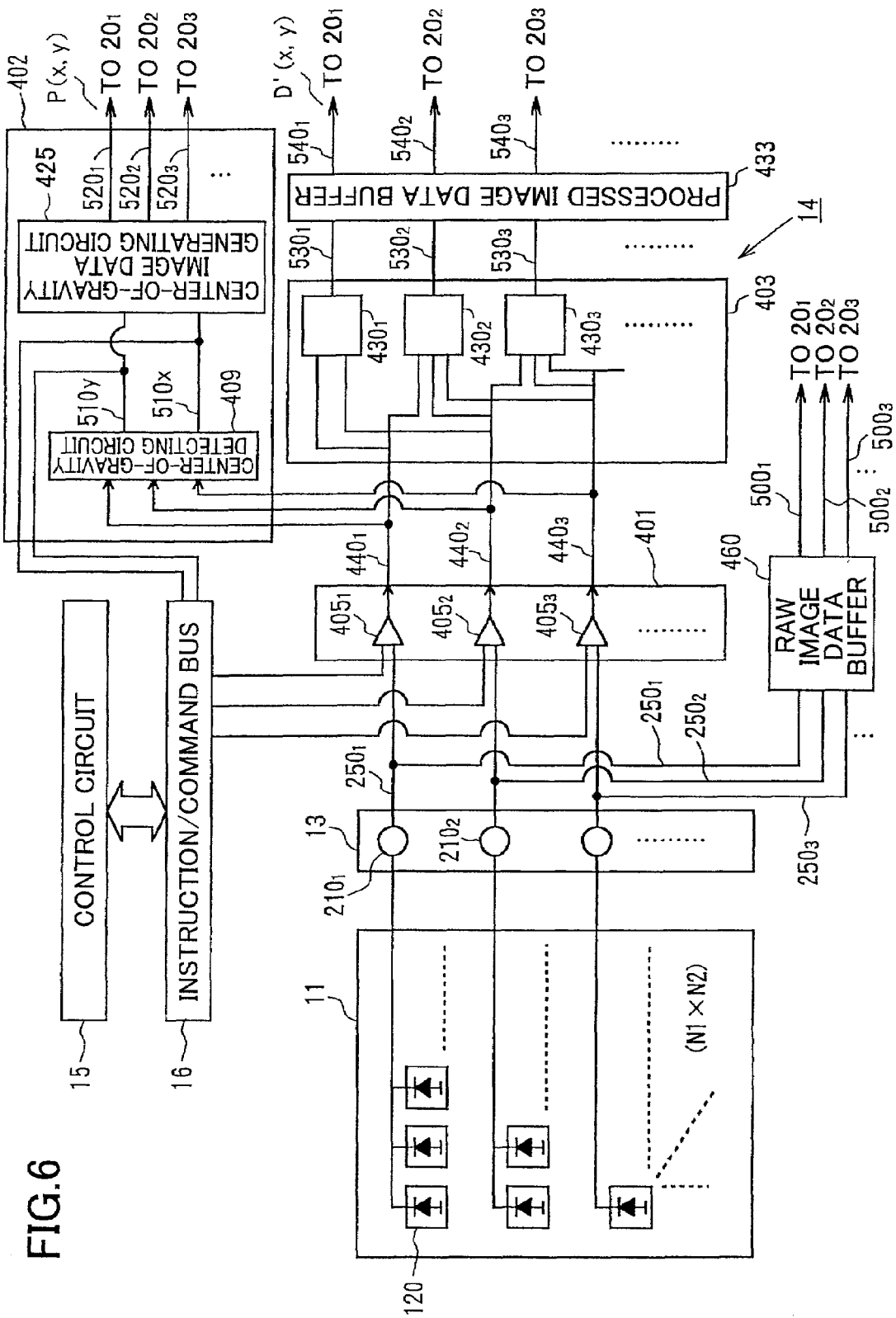
FIG. 6 is a block diagram of a processing circuit in the image-processing unit of the camera system according to the first embodiment.

As shown in FIG. 6, the center-of-gravity calculating circuit 402, used to perform center-of-gravity calculations, is connected to the N2 data transfer lines 440*j* from the binarization circuit 401. The center-of-gravity calculating circuit 402 serves to calculate the center of gravity, a basic process in image processing. The center-of-gravity calculating circuit 402 includes a center-of-gravity detecting circuit 409 and a center-of-gravity image data generating circuit 425.

The construction of the center-of-gravity detecting circuit 409 will be described in detail below with reference to FIG. 7.

The center-of-gravity detecting circuit 409 has N2 adders 410*j* that correspond to the N2 rows of the photodetector array 11, that is, the N2 analog-to-digital converters 210*j*. In other words, the N2 data transfer lines 440*j* extending from the binarization circuit 401 are connected to the N2 adders 410*j*, respectively. Each adder 410*j* is connected to one input terminal of a corresponding multiplier 411*j*. A row position data supply circuit 412 is connected to the other input terminal of each multiplier 411*j*. The output terminals of all the N2 multipliers 411*j* are connected to N2 input terminals of a single adder 413. The output terminal of the adder 413 is connected to the dividend input terminal of a divider 414.

The N2 data transfer lines 440*j* from the binarization circuit 401 are also connected to N2 input terminals of another single adder 415. The output terminal of the adder 415 is connected both to: a single input terminal of another adder 418 and an input terminal of a multiplier 416. A column position data supply circuit 417 is connected to the other input terminal of the multiplier 416. The output terminal of the multiplier 416 is connected to an input terminal of an adder 419. The output terminal of the adder 419 is connected to the dividend input terminal of a divider 420. The output terminal of the adder 418 is connected to a divisor terminal of each of the dividers 414 and 420. The quotient (divided result) determined by the dividers 414 and 420 indicate the y coordinate and x coordinate for the center-of-gravity position (Px, Py) in a single frame image denoted by the N1×N2 input signals D(x, y). Data transfer lines 510*y*, and 510*x* are connected to the output terminals of the dividers 414 and 420, respectively. The dividers 414 and 420 output the center-of-gravity position data Py and Px via the corresponding data transfer lines 510*y* and 510*x*.

As shown in FIG. 6, the data transfer lines 510*y* and 510*x* from the dividers 414 and 420 are connected to the control circuit 15 via the instruction/command bus 16 in order to output the center-of-gravity position data (Px, Py) to the control circuit 15. The data transfer lines 51*y* and 510*x* are also connected to the center-of-gravity image data generating circuit 425.

The center-of-gravity image data generating circuit 425 functions to generate center-of-gravity image data P(x, y) indicating a point corresponding to the position of the center of gravity based on the quotient from the dividers 414 and 420, that is, the center-of-gravity position (Px, Py) of the input image data. N2 data transfer lines 520*j* are connected to the output terminal of the center-of-gravity image data generating circuit 425. The center-of-gravity image data generating circuit 425 outputs binary data (1) to one data transfer line 520*j*, that corresponds to the y-axis position Py for the center of gravity, at a timing that corresponds to the x-axis position Px for the center of gravity, thereby generating center-of-gravity image data P(x, y) displaying the point of the center-of-gravity position (Px, Py).

Next, the edge extraction circuit 403 will be described. As shown in FIG. 6; the edge extraction circuit 403 is connected to the N2 data transfer lines 440*j* extending from the binarization circuit 401.

In the present embodiment, the edge extraction circuit 403 has a circuit configuration for performing a 3×3 masking operation, enabling the circuit to perform an edge extraction operation using data for neighboring pixels. As shown in FIG. 6, the edge extraction circuit 403 includes N2 sum-of-product computing units 430*j* corresponding to the N2 rows in the photodetector array 11, that is, the N2 analog-to-digital converters 210*j*. The N2 data transfer lines 440*j* from the binarization circuit 401 are connected to corresponding N2 sum-of-product computing units 430*j*, respectively. In addition to being connected to the data transfer line 440*j* of the corresponding row j, each sum-of-product computing unit 430*j* is also connected to the data transfer lines 440*j−1* and 440*j+1* of the corresponding rows j and j+1 directly above and below the corresponding row j.

Figure 8:
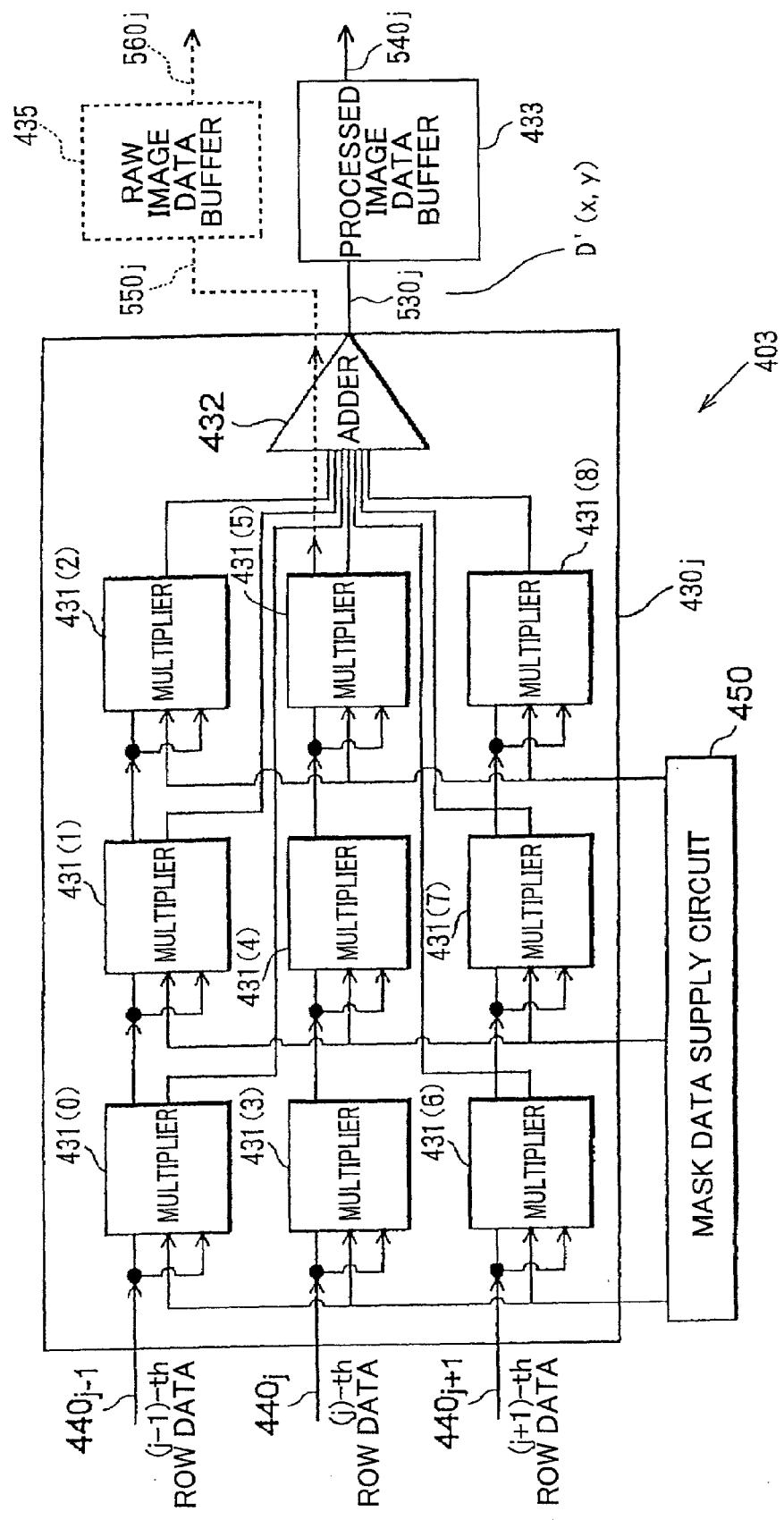
FIG. 8 is a block diagram of an edge extraction circuit in the image-processing unit of the camera system according to the first embodiment.

As shown in FIG. 8, nine multipliers 431(0) through 431(8) and one adder 432 are provided in each sum-of-product computing unit 430*j*. The output from each multiplier 431 is connected to a corresponding input terminal of the adder 432. Of these multipliers 431(0)–431(8), the multipliers 431(0) through 431(2) are connected to the data transfer line 440*j−1*; the multipliers 431(3) through 431(5) are connected to the data transfer line 440*j*; and the multipliers 431(6) through 431(8) are connected to the data transfer line 440*j+1*. In each row j−1, j, and j+1, each multiplier 431 is capable of orderly transferring image data from the corresponding data transfer line 440 to its subsequent multiplier 431. In this way, as data is transferred via the multipliers 431, image data for a certain photodetector element 120 and for the eight photodetector elements surrounding that photodetector element 120 is inputted into the input terminals of the corresponding multipliers 431. Since no row j−1 exists for the sum-of-product computing unit 430₁, corresponding to the first row (j=1), no data transfer line 440 is connected to the multipliers 431(0) through 431(2) in the sum-of-product computing unit 430₁. Accordingly, the image data 0 is always inputted into the multipliers 431(0) through 431(2) in the sum-of-product computing unit 430₁. Similarly, since no row j+1 exists for the sum-of-product computing units 430$_{N2}$ corresponding to the N2$^{th}$ row (j=N2), no data transfer line 440 is connected to the multipliers 431(6) through 431(8) in the sum-of-product computing units 430$_{N2}$. Accordingly, image data (0) is always inputted into the multipliers 431(6) through 431(8) in the sum-of-product computing units 430$_{N2}$.

The other input terminal of each of the multipliers 431(0) through 431(8) is connected to a mask data supply circuit 450. Mask data specifying details of an operation (in this case, mask data for performing edge extraction) are transferred from the mask data supply circuit 450 to the multipliers 431(0) through 431(8).

In each sum-of-product computing unit 430*j* having this construction, a data transfer line 530*j* is connected to the output terminal of the adder 432 for outputting processed image data D'(x, y), where y=j. The data D' is the sum calculated by the adder 432. Therefore, N2 data transfer lines 530*j* are connected to the output terminal of the entire edge extraction circuit 403. As shown in FIG. 6, these N2 data transfer lines 530*j* are connected to a processed image data buffer 433. N2 data transfer lines 540$_j$ are connected to output terminals of the processed image data buffer 433. The processed image data buffer 433 stores, for a predetermined time period, processed image data D'(x, y) which are received sequentially from each data transfer line 530$_j$. Subsequently, the processed image data buffer 433 transfers this data sequentially to the signal converter 17 via the corresponding data transfer line 540$_j$.

Figure 9:
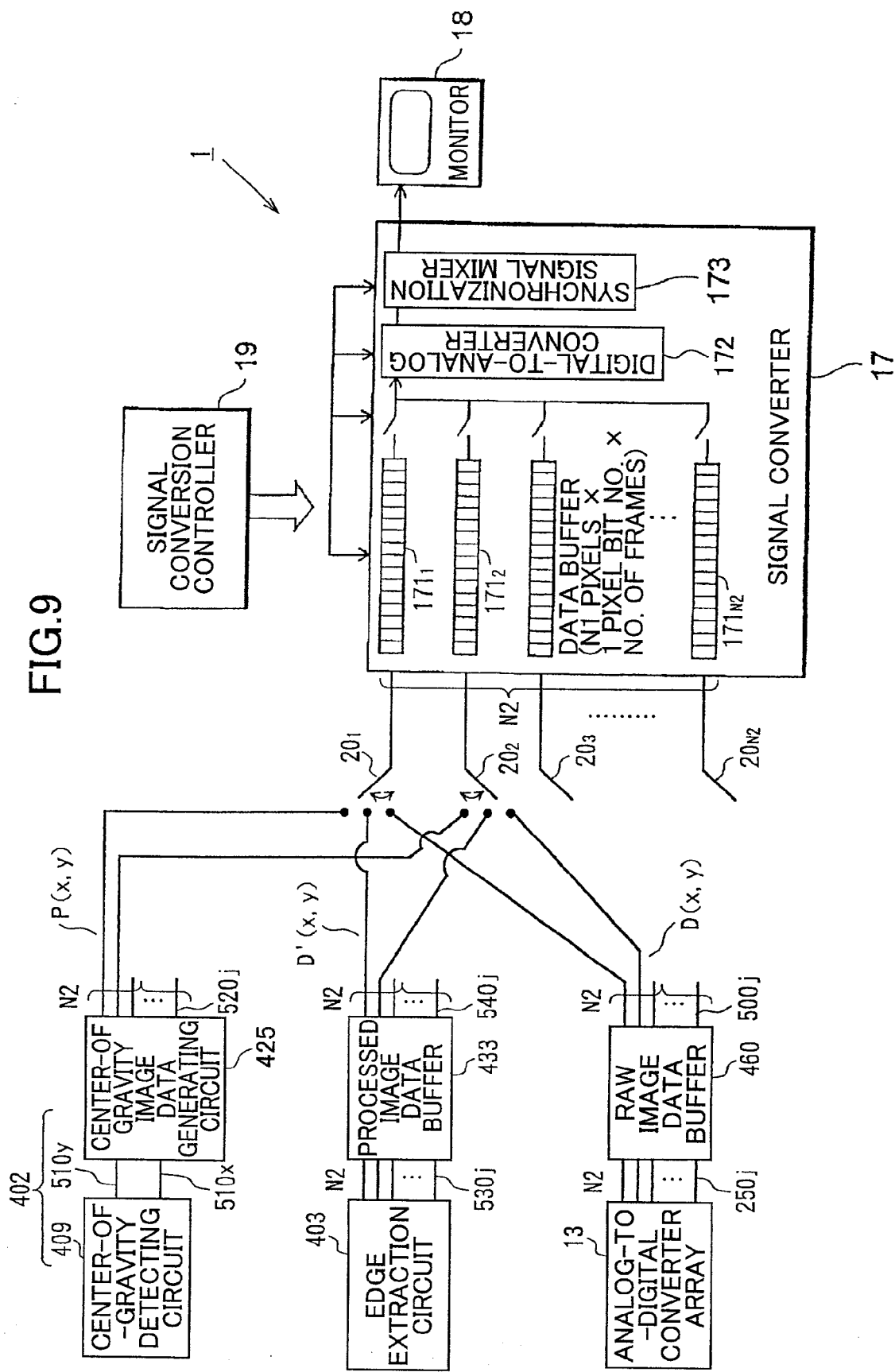
FIG. 9 is an explanatory diagram showing how the signal converter is connected to the analog-to-digital converter array and each processing circuit in the image-processing unit in the camera system according to the first embodiment.

As shown in FIG. 9, the N2 data transfer lines 500$_j$ extending from the raw image data buffer 460, the N2 data transfer lines 520$_j$ extending from the center-of-gravity image data generating circuit 425, and the N2 data transfer lines 540$_j$ extending from the processed image data buffer 433 are connected to the signal converter 17 via N2 switches 20$_j$.

In the signal converter 17, N2 data buffers 171$_j$ are provided. Each data buffer 171$_j$ is for accumulating a corresponding row (N1 pixels) of composite image data for a predetermined number of frames (n frames, for example, where n is a positive integer). Each data buffer 171$_j$ is connected to the corresponding data transfer line 500$_j$, 520$_j$, and 540$_j$ via a corresponding switch 20$_j$. Composite image data for each row j is formed by combining the raw image data D(x, y), center-of-gravity image data P(x, y), and processed image data D' (x, y) and is inputted into each corresponding data buffer 171$_j$ by switching each switch 20$_j$ at a predetermined timing.

Further, a digital-to-analog converter 172 and a synchronization signal mixer 173 are connected to the data buffers 171$_j$. The D/A converter 172 converts the composite image data, which is in the form of digital image signals, to analog signals. The synchronization signal mixer 173 generates image signals at a required frame rate by adding a synchronization signal, appropriate for the frame rate of the monitor 18 (or a subsequent general-purpose image-processing device, such as a computer), to the analog signals inputted from the digital-to-analog converter 172.

The control circuit 15 includes a CPU, memory, and the like not shown in the drawings, and controls overall operations of the camera system 1 via the instruction/command bus and the signal conversion controller 19. To achieve this, the control circuit 15 executes a control program described below (see FIG. 12) stored in its memory. The signal conversion controller 19 includes a CPU, memory, and the like not shown in the drawings. Based on instructions received from the control circuit 15, the signal conversion controller 19 controls the signal converter 17 to accumulate raw image data and processed image data and to perform signal conversion of this data. It is possible to configure the control circuit 15 and the signal conversion controller 19 using the same CPU.

Next, the operations of the camera system 1 according to the present embodiment will be described with reference to FIG. 10.

The camera system 1 of the present embodiment serves as an image processor by performing binarization, center of gravity calculation, and edge extraction operations. The camera system 1 overlays the processed result on the original image.

First, the reset signal R is reset to enabled, all of the switches SW11–SW14 in the variable capacity unit 222 of FIG. 4 are set to ON, and all the switches SW21–SW24 are set to OFF. With this operation, the capacity between the input and output terminals of the charge amp 221 is set to $C_0$. At the same time, all the switch elements 140 shown in FIG. 3 are set to OFF, and the horizontal scan signal $V_i$ is set to a state that does not select any photodetectors 120. From this state, the reset signal R is set to disabled, and each integrating circuit 220 is controlled to start integration operations.

After starting the integration operation, a horizontal scan signal $V_1$ is outputted for setting, to ON, only the switch element 140 in the first photodetector 120$_{1,j}$ among the photodetectors in each of the N2 horizontal photodetector rows 110$_j$ shown in FIG. 3. When the switch element is thus turned ON, a charge $Q_1$, which has been accumulated in the photoelectric conversion element 130 in response to light received until present, is outputted as a current signal from the light receiving portion 100. In this way, it is possible to read out a signal indicative of a raw image 901 of an object 900, shown in FIG. 9, which is taken by the photodetectors. The charge $Q_1$ then flows to the variable capacity unit 222, which is now being set at capacity $C_0$.

Next, the internal operations of the integrating circuit 220 will be described with reference to FIG. 4. The capacity control mechanism 240 (FIG. 3) opens switches SW12–SW14, and then closes the switches SW22–SW24. As a result, the integral signal $V_s$ is outputted to have the following voltage value:

$$V_s = Q/C_1$$

The integral signal $V_s$ is inputted into the comparator circuit 230, and is compared with the reference voltage $V_{REF}$. If the difference between the integral signal $V_s$ and the reference voltage $V_{REF}$ is within the range of resolution, that is, lower than or equal to $\pm C_4/2$, then the integral signal $V_s$ is determined to match the reference voltage $V_{REF}$. In this case, no further capacity control is performed and the integral operation ends. On the other hand, if the difference does not fall within the range of resolution, then further capacity control will be performed to continue the integral operation.

For example, if $V_s > V_{REF}$, the capacity control mechanism 240 opens the switch SW22 and subsequently closes the switch SW12. As a result, the integral signal $V_s$ changes to have the following voltage value:

$$V_s = Q/(C_1 + C_2)$$

This integral signal $V_s$ is inputted into the comparator circuit 230 (FIG. 3) and is compared with the reference voltage $V_{REF}$.

On the other hand, if $V_s < V_{REF}$, then the capacity control mechanism 240 opens both switches SW11 and SW22 and subsequently closes the switches SW12 and SW21. As a result, the integral signal $V_s$ changes to have the following voltage value:

$$V_s = Q/C_2$$

This integral signal $V_s$ is outputted to the comparator circuit 230 to be compared with the reference voltage $V_{REF}$.

By repeating this feedback loop among the integrating circuit 220, the comparator circuit 230, the capacity control mechanism 240, and back to the integrating circuit 220, comparison operation and capacity setting operation (that is, control of the ON/OFF settings of the switches SW11–SW14 and SW21–SW24) are repeated until the integral signal $V_s$ matches the reference voltage $V_{REF}$ within the resolution range. The values of the capacity instructions signals $C_{11}$–$C_{14}$, which indicate the ON/OFF states of the switches SW11–SW14 at the time when the integration operations are ended, constitute a digital signal that corresponds to the charge $Q_1$, wherein the most significant bit (MSB) of the digital signal is the value of $C_{11}$, while the least significant bit (LSB) is the value of $C_{14}$. The input signal is thus analog-to-digital converted into the digital signal, and the digital signal is outputted as a digital signal D1 to the processing element array 14 via the corresponding data transfer line 250.

As described above, the present apparatus successively determines the values of the respective bits in the digital signal D1 one bit at a time from the MSB to the LSB.

Hence, according to the present embodiment, the integral signal $V_s$ is repeatedly compared with the reference voltage $V_{REF}$, while the capacity elements C1–C4 are successively turned ON one at a time. The comparison result is outputted as a digital signal D1. More specifically, C1 is first set to ON, thereby making integral signal $V_s$ equal to Q/C1. This integral signal $V_s$ is compared with the reference voltage $V_{REF}$. A one (1) ($=C_{11}$) is outputted as the MSB (most significant bit) if the integral signal $V_s$ is larger than the reference voltage $V_{REF}$. A zero (0) ($=C_{11}$) is outputted as the MSB (most significant bit) if the integral signal $V_s$ is smaller than the reference voltage $V_{REF}$. Next, C2 is set to ON, making the integral signal $V_s$ be equal to Q/(C1+C2) when MSB=1, or the integral signal $V_s$ be equal to Q/C2 when MSB=0. This integral signal $V_s$ is compared to the reference voltage $V_{REF}$. A one (1) ($=C_{12}$) is outputted as the second bit if the integral signal $V_s$ is larger than the reference voltage $V_{REF}$. A zero (0) ($=C_{12}$) is outputted as the second bit if the integral signal $V_s$ is smaller than the reference voltage $V_{REF}$. Analog-to-digital conversion is executed by repeating the above-described process the number of times that is equal to the number of bits required.

When output of a digital signal equivalent to the photoelectric output from the first photodetector $120_{1,j}$ is completed, the reset signal R is enabled. The reset signal is then disabled again, and the capacity value of the variable capacity unit $222_j$ is initialized. Subsequently, a horizontal scan signal $V_2$ is outputted for turning ON the switch element 140 only in the second photodetector $120_{2,j}$ in each row $110_j$. Then, the above-described process is performed again for reading the photoelectric output from the second photodetector $120_{2,j}$ and for outputting a corresponding digital signal. Hereafter, by successively changing the horizontal scan signal $V_t$, photoelectric outputs are read successively from all the photodetectors 120, and corresponding digital signals are outputted to the processing element array 14.

Figure 10:
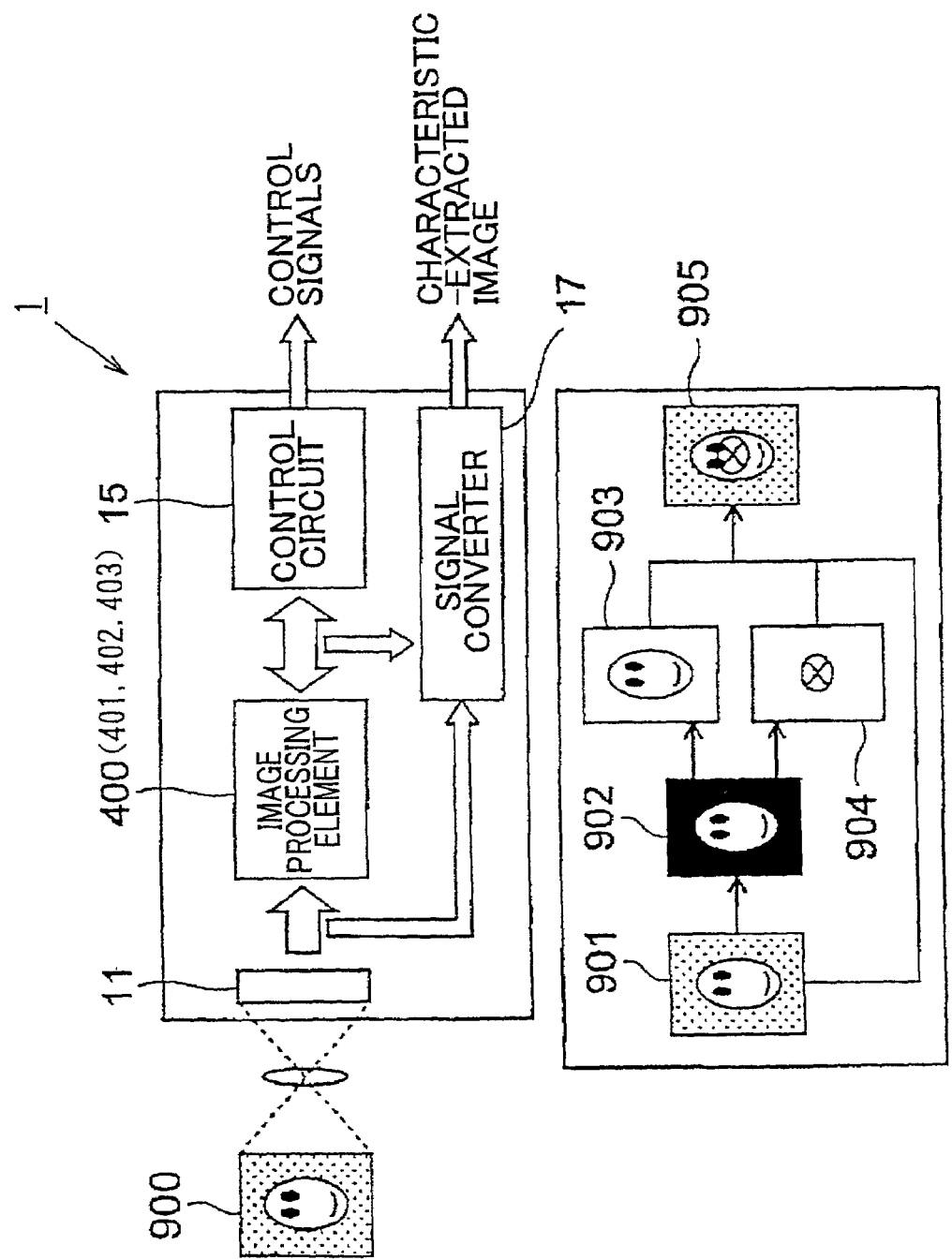
FIG. 10 is an explanatory diagram showing the concept of image processing in the camera system according to the first embodiment.
Figure 11A:
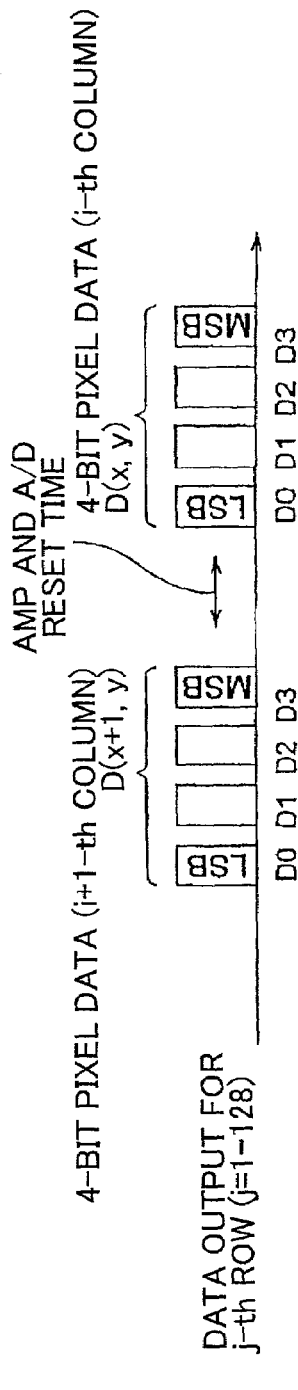

As a result, as shown in FIG. 11(a), to each data transfer line $250_j$, outputs from all the photodetectors $120_{1,j}$–$120_{N1,j}$ in the corresponding j-th row are outputted successively in this order. The output from each photodetector $120_{i,j}$ is outputted from its most significant bit (MSB) to its least significant bit (LSB) in this order. The four-bit raw image data D(x,y)=901 (shown in FIG. 10) thus outputted from each photodetector $120_{i,j}$ is transmitted not only to the binarization processing circuit 401 but also to the raw image data buffer 460, in which the four-bit raw image data D(x,y) is stored for the predetermined period of time.

According to the configuration of the analog-to-digital converter array 13 of the present embodiment, the analog-to-digital conversion rate per pixel is about 1 μs/bit. For example, if 128 photodetectors 120 exist in each row, it takes 1.024 ms (=8 μs×128) to convert input analog signals from all the 128 photodetectors 120 in one row into 8-bit (128 gradation) digital signals, for example. In other words, it is possible to acquire each frame image within about one millisecond. It is therefore possible to obtain successive frames' worth of images at a high frame rate of about 1,000 frames/second.

Next, the operations of the image processing unit 14 will be described with reference to FIG. 1 and FIGS. 6 through 10.

First, the binarization process performed by the binarization circuit 401 will be described with reference to FIG. 6.

Specifically, each comparator $405_j$ receives image data 901 (FIG. 10) from the corresponding analog-to-digital converter $210_j$. As described above, the image data 901 is a series of digital signals inputted beginning from its MSB. Each comparator $405_j$ also receives a comparison signal, to be used for comparison, from the control circuit 15. The comparison signal is a series of signals inputted beginning from the MSB. The comparator $405_j$ performs sequential comparisons on the thus inputted data. The comparator 405 outputs one (1) when the image signal matches or is greater than the comparison signal, and zero (0) when the image signal is smaller than the comparison signal. Accordingly, each comparator $405_j$ outputs 1-bit binary image data via the corresponding data transfer line $440_j$. As a result, a binary image 902 corresponding to the raw image data 901 is obtained as shown in FIG. 10. This binary image data is transmitted to the center-of-gravity calculating circuit 402 and edge extraction circuit 403 via the data transfer lines $440_j$.

Subsequently, center-of-gravity data and an edge extraction image are obtained based on the binarized image data.

The center-of-gravity data is calculated as described below by the center-of-gravity calculating circuit 402 having the construction shown in FIG. 7.

Assuming that the binary image data inputted to the circuit 402 is D(x, y), the center-of-gravity coordinates (Px, Py) for the X and Y directions can be determined according to the following equations:

$$Px = \frac{\sum_{x=1}^{N1}\sum_{y=1}^{N2} x \times D(x, y)}{\sum_{x=1}^{N1}\sum_{y=1}^{N2} D(x, y)} \qquad (a)$$

$$Py = \frac{\sum_{x=1}^{N1}\sum_{y=1}^{N2} y \times D(x, y)}{\sum_{x=1}^{N1}\sum_{y=1}^{N2} D(x, y)} \qquad (b)$$

The center-of-gravity detecting circuit 409 in the center-of-gravity calculating circuit 402 calculates a common denominator and the respective numerators in the equations (a) and (b) in parallel processes.

In other words, each adder $410_j$ is inputted with binarized image data for all pixels in the corresponding row j via the corresponding data transfer line $440_j$. Accordingly, each adder $410_j$ adds binary image data for all the N1 pixels in the corresponding row j. Each multiplier $411_j$ multiplies this sum by the corresponding row position data y received from the row position data supply circuit 412. The adder 413 obtains a value for the numerator of equation (b) by adding these products for all N2 lines.

All the data transfer lines $440_j$ are also connected to the adder 415. Hence, the adder 415 adds the binary image data in each column i for all N2 rows. The adder 418 further adds the sums of each column i for all the N1 columns to obtain a denominator for each equation (a) and (b).

The binary image data added for each column i by the adder 415 is also sent to the multiplier 416. The multiplier 416 multiplies a corresponding column position data x, received from the column position data supply circuit 412, by the sum for each column i and outputs this result to the adder 419. The adder 419 obtains a numerator for equation (a) by adding the results obtained by the multiplier 416 for all N1 columns.

The divider 414 obtains an output corresponding to Py by dividing the total sum of image data weighted by the row position data y by the total sum of image data outputted from the adder 418. The divider 420 obtains an output corresponding to Px by dividing the total sum of image data weighted by the column position data x by the total sum of image data outputted from the adder 418.

The center-of-gravity data (Px, Py) is transferred to the control circuit 15 via the data transfer lines 510$x$, 510$y$, and the instruction/command bus 16.

After receiving the center-of-gravity data (Px, Py) via the data transfer lines 510$x$ and 510$y$, the center-of-gravity image data generating circuit 425 generates center-of-gravity image data P(x, y) in which only the point at the center-of-gravity position (Px, Py) is set to one and all the remaining pixels (x, y), wherein $1 \leq x \leq N1$, $x \neq Px$, $1 \leq y \leq N2$, and $y \neq Py$, are set to 0. This data is outputted via the data transfer lines 520$_j$. In other words, the data 0 is continuously outputted to all the data transfer lines 520$_j$ not corresponding to Py (that is, j≠Py). The data 1 is outputted only to the data transfer line 520$_j$ corresponding to Py (that is, j=Py) at a timing corresponding to Px. The data 0 is outputted to the data transfer line 520$_j$ corresponding to Py (that is, j=Py) at all the remaining timings. In this way, the center-of-gravity image data P(x, y) is generated.

The thus produced center-of-gravity image data P(x, y) is an image indicating a point only at the center-of-gravity position, such as an image 904 in FIG. 10. In the image 904, the intersecting point of an X within a circle denotes the center-of-gravity position.

Next, the edge extraction process will be described. The edge extraction process is performed by the edge extraction circuit 403. The edge extraction circuit 403 is provided with N2 3×3 sum-of-product computing units 430$_j$ each having the construction shown in FIG. 8.

Each 3×3 sum-of-product computing unit 430$_j$ performs the image process expressed by the following equation:

$$D'(i,j) = \text{mask}(0) \times D(i-1,j-1) + \text{mask}(1) \times D(i,j-1) + \text{mask}(2) \times D(i+1,j-1) + \text{mask}(3) \times D(i-1,j) + \text{mask}(4) \times D(i,j) + \text{mask}(5) \times D(i+1,j) + \text{mask}(6) \times D(i-1,j+1) + \text{mask}(7) \times D(i,j+1) + \text{mask}(8) \times D(i+1,j+1) \quad (c)$$

In this equation, D(i, j), equivalent to D(x, y), is the inputted binary image data. More specifically, D(i−1, j), D(i, j), and D(i+1, j) are binary data for three neighboring pixels that are transmitted via the data transfer line 440$_j$. Similarly, D(i−1, j−1), D(i, j−1), and D(i+1, j−1) are binary data for three neighboring pixels that are transmitted via the data transfer line 440$_{j-1}$. In addition, D(i−1, j+1), D(i, j+1), and D(i+1, j+1) are binary data for three neighboring pixels transmitted via the data transfer line 440$_{j+1}$.

D' (x, y) is the image data outputted as a result of the process. The "mask" is masking data supplied from the mask data supplying circuit 405.

In the edge extraction process, a Laplacian operation is performed with the mask values set as shown below.

$$\text{mask} = \{1,1,1,1,-8,1,1,1,1\} \quad (d)$$

The binary image data D(x, y) is transferred into the 3×3 sum-of-product computing unit 430 via the data transfer lines 440. As a result, image data D(i±1, j±1) for neighboring 3×3 pixels is inputted into the multipliers 431. At the same time, the mask data supply circuit 450 inputs the mask data shown in equation (d) into each multiplier 431. That is, a value of one (1) is inputted into the multipliers 431(0) through 431(3) and multipliers 431(5) through 431(8), while a −8 value is inputted into the multiplier 431 (4). The result of multiplying the image data with the inputted mask data is transmitted to and added in the adder 432. The resulting sum data D' (x, y), that is, the edge detection data is outputted. This outputted edge extraction data is equivalent to an edge extraction image 903, shown in FIG. 10.

Hence, the edge extraction results D' (i, j) obtained from each of the 3×3 sum-of-product computing units 430$_j$ is outputted to the corresponding data transfer line 530$_j$. After being stored for a predetermined period of time in the processed image data buffer 433, the data is outputted via the corresponding data transfer line 540$_j$.

The above operation uses parallel processing for processing all the lines simultaneously, thereby reducing processing time and increasing the operation speed. Accordingly, images acquired at a high-speed frame rate, which is determined by the analog-to-digital conversion rate, can be processed in real-time.

Next, the process of overlaying the processed images and raw image data will be described with reference to FIGS. 9 through 11(c).

Figure 11B:
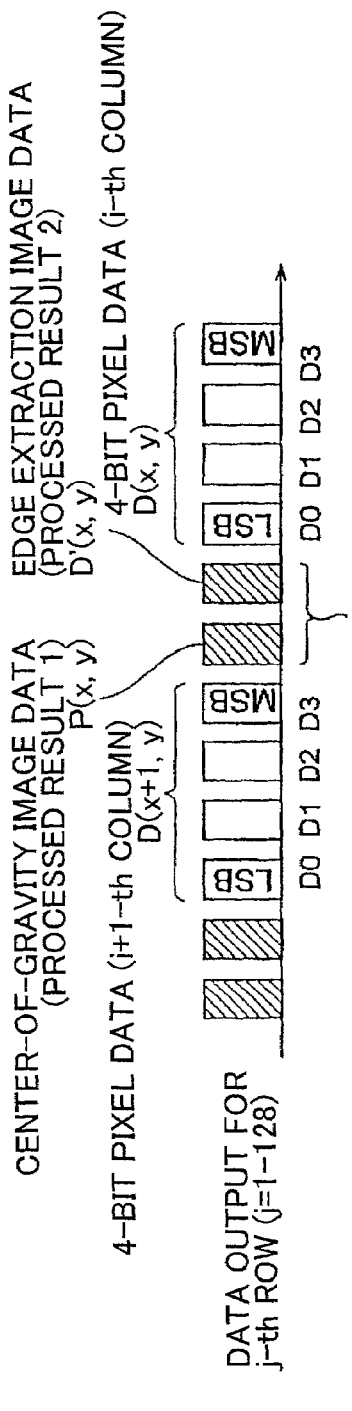

As described above, a signal for one row of the raw image data 901 is outputted for each row j. As shown in FIG. 11(a), the one-row signal is outputted sequentially as a bit serial signal beginning from its MSB. Data for each pixel is composed of four bits, for example. A signal-less interval is inserted between successive sets of pixel data in order to reset the amplifiers and the analog-to-digital converters. As shown in FIG. 9, the switch 20$_j$ corresponding to each row j is controlled to switch the input of signals to be sent to the corresponding data buffer 171$_j$ among: the data transfer line 520$_j$ from the image-processing unit 14, the data transfer line 540$_j$ from the image-processing unit 14, and the data transfer line 500$_j$ from the analog-to-digital converter array 13 that circumvents the image-processing unit 14. As shown in FIG. 11(b), the image processing results (in this case, the center-of-gravity image data and edge extraction image data) are inserted during the signal-less interval between successive pixel data for the raw image. This process generates six bits of data from the four bits of raw image data and the additional two bits of processed image data (one bit for center-of-gravity image data and one bit for edge extraction image data).

Here, the switch 20$_j$ corresponding to each row j is switched sequentially between the data transfer line 500$_j$ from the analog-to-digital converter array 13 (raw image data buffer 450), the data transfer line 520$_j$ from the center-of-gravity image data generating circuit 425, and the data transfer line 540$_j$ from the edge extraction circuit 403 (processed image data buffer 433). This switching process combines the raw image data, center-of-gravity image data, and edge extraction image data.

In this way, the one-bit center-of-gravity image data (0 or 1) and the one-bit edge extraction image data (0 or 1) obtained as processed results are added before or after the four bits of raw image data for each pixel i in every row j. It is noted that because a certain amount of time is required for the center-of-gravity calculating circuit 402 to complete the center-of-gravity process, the raw image data is stored temporarily in the raw image data buffer 450 and the image data from the edge extraction process is stored temporarily in the processed image data buffer 433. These raw image data and edge extraction image data are outputted from the corresponding data buffers 450 and 433 in synchronization with the timing in which the center-of-gravity image data generating circuit 425 generates the center-of-gravity image data.

As shown in FIG. 11(b), for example, one-bit signals for the center-of-gravity data and one-bit signals for edge extraction image are inserted in this order following the four bits of raw image data. As a result, a composite image 905 is generated as shown in FIG. 10. This composite image 905 emphasizes the edges in the raw image and displays the center-of-gravity position.

It is unnecessary to provide the data buffer 450 or 433 in this construction. In such a case, the center-of-gravity image data can be inserted in the position of the corresponding pixel at a timing one frame later than that of the raw image data and edge extraction image data.

Figure 11C:
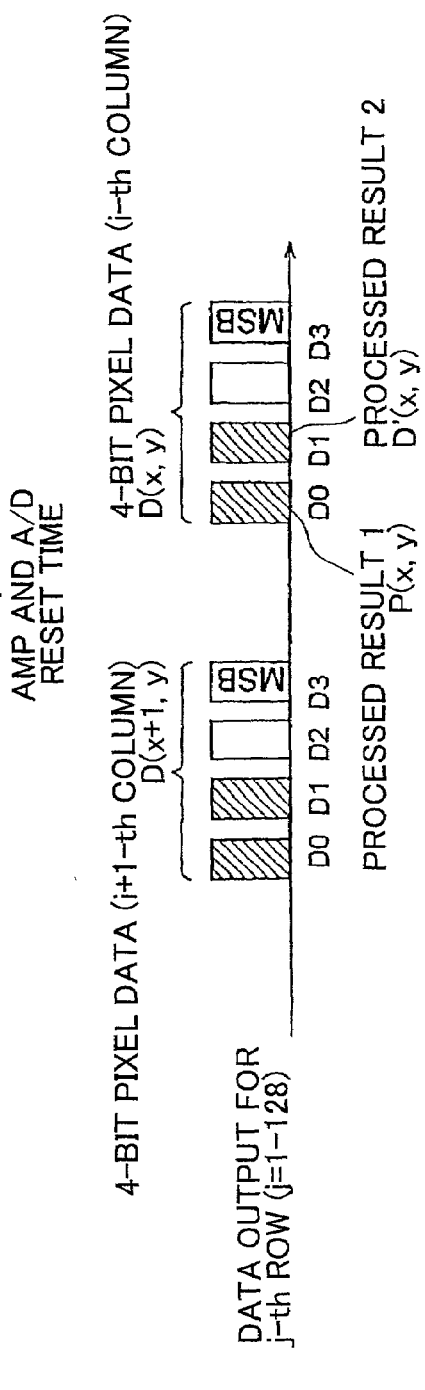

When it is necessary to maintain a four-bit length for the output image data, due to the restrictions by the display device and processing devices in later stages, the processed results can be inserted in place of the LSB or MSB of the raw image data. For example, as shown in FIG. 11(c), the one bit signal for center-of-gravity data and the one bit signal for edge extraction image can be inserted in this order in place of the two low-order bits in the raw image. This process also generates a composite image 905 emphasizing edges of the raw image and displaying the center-of-gravity position as shown in FIG. 10.

The composite image 905 thus obtained for each row j in this way is stored in the corresponding data buffer $171_j$. Each data buffer $171_j$ has a capacity suited to storing the number of bits in the composite image 905. When the composite image 905 is formed of six bits for each pixel, as in the example of FIG. 11(b), for example, each data buffer $171_j$ has a capacity of 6 bits×N1 (number of pixels in each row j)×n (number of frames). When the composite image 905 is formed of four bits for each pixel, as in the example of FIG. 11(c), each data buffer $171_j$ has a capacity of 4 (bits)×N1 (number of pixels in each row j)×n (number of frames). Accordingly, all N2 data buffers $171_j$ can store the composite image 905 for n frames.

The camera system 1 of the present embodiment repeatedly obtains image data 901 for a plurality of consecutive frames at a high frame rate which is determined by the analog-to-digital conversion rate of the analog-to-digital converter array 13. The camera system 1 then repeatedly generates and stores a composite image 905 for each frame. The camera system 1 converts some composite images, that have been acquired at desired timings, into a desired frame rate, and displays the images on the monitor 18.

This desired time, for example, may be determined as the time when the center-of-gravity position (Px, Py) determined by the center-of-gravity detecting circuit 409 matches a desired set position. Each time an image for one frame is obtained, the control circuit 15 receives data of the center-of-gravity position (Px, Py) from the center-of-gravity detecting circuit 409 and determines whether this position matches the predetermined set value (X, Y). When the position does not match, the signal conversion controller 19 is controlled to store the composite image data for the present frame in the data buffer 171. However, when the center-of-gravity position (Px, Py) for the present frame is determined to match the set position (X, Y), the control circuit 15 outputs an instruction to the signal conversion controller 19 to perform a monitor display process. When commanded to perform a display process, the signal conversion controller 19 controls the signal converter 17 to read composite image data for n frames already stored in the data buffer 171, reading in order from the oldest frame, convert the data to signals suitable for the monitor display, and display the images on the monitor 18. The same process is performed to display the present frame as well. The same process is also performed to display composite image data for the next n frames in sequence. Based on commands from the signal conversion controller 19, the signal converter 17 converts the overlaid image signals to image signals appropriate for displaying on the monitor 18, and displays those image signals on the monitor 18.

Figure 12:
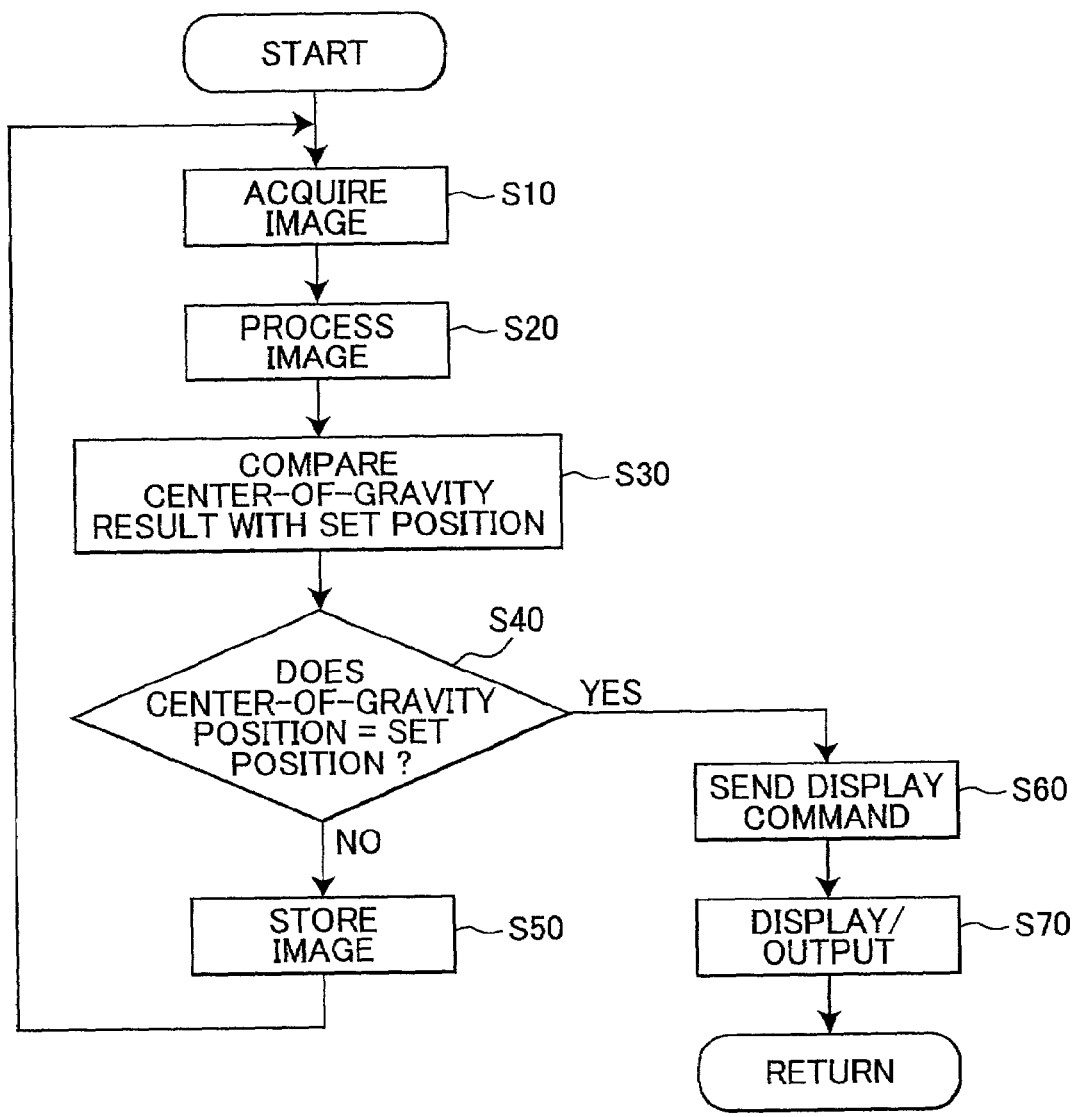
FIG. 12 is a flowchart showing the process of control in the camera system according to the first embodiment.

The camera system 1 of the present embodiment performs the above-described process following the flowchart shown in FIG. 12 under the control of the control circuit 15.

First, in S10, the control circuit 15 controls the photodetector array 11 and the analog-to-digital converter array 13 to acquire raw image data (x, y) for one frame, wherein $1 \leq x \leq N1$ and $1 \leq y \leq N2$. The raw image data D(x, y) is transferred via the data transfer lines $250_j$ to the image-processing unit 14 and stored in the raw image data buffer 460.

In S20, the control circuit 15 controls the image-processing unit 14 to perform image processing. First, the binarization circuit 401 is controlled to binarize the raw image data received from the data transfer lines $250_j$ to thereby generate binary image data. Next, the center-of-gravity calculating circuit 402 is controlled to calculate the center-of-gravity position (Px, Py) in the present frame based on the binary image data. The results of this calculation are transmitted both to the control circuit 15 and to the center-of-gravity image data generating circuit 425. The center-of-gravity image data generating circuit 425 creates center-of-gravity image data. Further, the edge extraction circuit 403 is controlled to generate edge extraction image data based on the binary image data. The edge extraction image data is stored in the processed image data buffer 433.

In S30, the control circuit 15 compares the center-of-gravity position (Px, Py) received for the present frame with the set data (X, Y). If the center-of-gravity position (Px, Py) does not match the set data (X, Y) (No in S40), then the control circuit 15 controls the signal conversion controller 19 to generate the composite image data for the current frame and to store the composite image data in the data buffers 171 of the signal converter 17. More specifically, the control circuit 15 controls the switches $20_j$ to combine the raw image data in the raw image data buffer 460, the center-of-gravity image data from the center-of-gravity image data generating circuit 425, and the edge extraction image data from the processed image data buffer 433, and to store this composite image in the data buffers 171. The next frame is then acquired and processed beginning from S10. It is noted that when n frames of composite image data have already been accumulated in the data buffers 171, composite image data for the oldest frame is discarded and composite image data for the current frame is stored in the data buffer 171.

On the other hand, if the center-of-gravity position (Px, Py) for the current frame matches the set data (X, Y) (Yes in S40), the control circuit 15 controls the signal conversion controller 19 to initiate a monitor display process in S60. After the control circuit 15 sends the instruction to the signal conversion controller 19, the process returns to S10 and the control circuit 15 begins acquiring and processing the next frame.

After receiving the instruction to initiate the monitor display process, the signal conversion controller 19 begins controlling the signal converter 17 in S70 to display composite image data already stored in the data buffers 171, composite image data for the current frame, and composite image data for subsequent n frames in order. More specifically, the signal conversion controller 19 reads in order of oldest to newest all frames (n frames) currently stored in the data buffer 171. The signal conversion controller 19 converts these frames to analog signals using the digital-to-analog converter 172, combines the analog signals with a synchronization signal in the synchronization signal mixer 173, and displays the resulting signal on the monitor 18. The signal conversion controller 19 also performs the same process to display the composite image data for the current frame and for the subsequently received n frames.

The control process described above is used for displaying images before and after a specific instant. However, if it is only necessary to display images for the frame of the specific instant and frames thereafter, there is no need to accumulate images in S50. In this case, images need to be accumulated and displayed only for the frame at which a Yes is determined in S40 and several frames thereafter.

As described above, according to the present embodiment, the analog-to-digital converter array 13 includes one analog-to-digital converter 210 for each row of photodetector elements 120 in the photodetector array 11. The image-processing unit 14 includes the plurality of processing circuits 400 for performing high-speed image processing. The signal converter 17 combines the output signals from the analog-to-digital converter array 13 with output signals from the image-processing unit 14. Under control of the control circuit 15 and the signal conversion controller 19, the signal converter 17 also downconverts the composite signal at an important timing to a frame rate suitable for display on the monitor 18 and subsequently displays the signal on the monitor 18. Accordingly, it is possible to extract only the necessary frames from among images that are acquired and processed at a high frame rate and to convert and display only those signals.

Figure 13A:
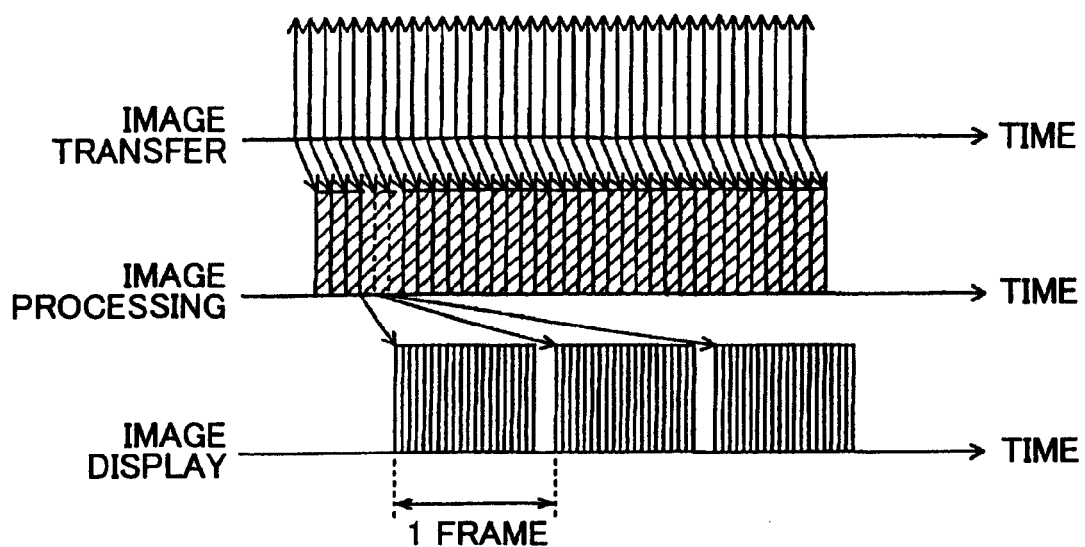
FIG. 13(a) is a timing chart for image processing and image display with the camera system of the first embodiment.
Figure 13B:
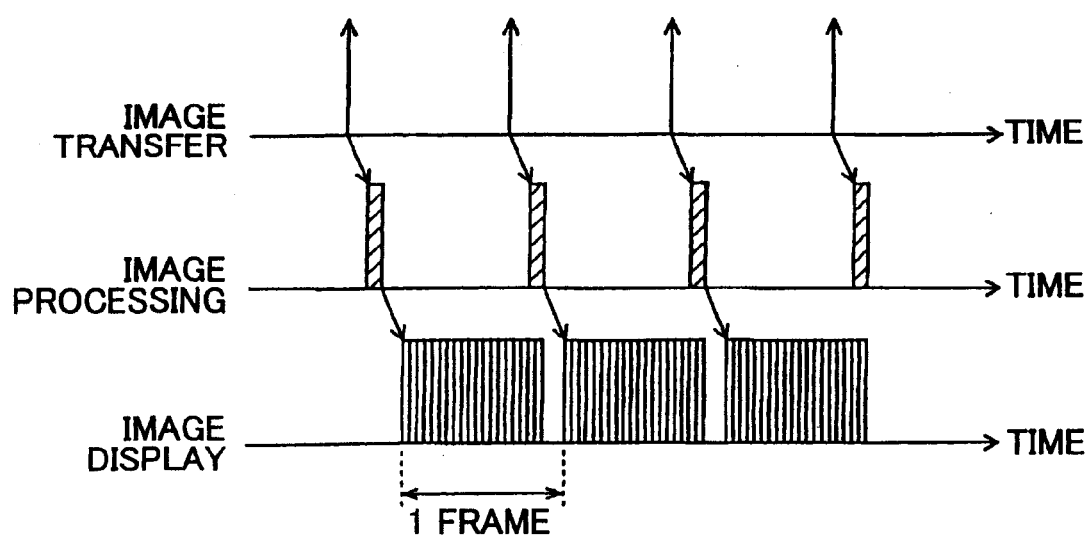
FIG. 13(b) is a timing chart for image processing and image display according to the prior art.

In apparatus using conventional technology no. 4, the frame rate of image sensors used to display the images is limited to 30 milliseconds. Moreover, it is impossible to perform high-speed image processing because image transmission and image processing have to be conducted in conformity to the image display timings, as shown in FIG. 13(b). In contrast, the apparatus of the present embodiment performs image transfer and image processing at the fast frame rate of 1,000 milliseconds. This apparatus stores video images of arbitrary timings in the data buffers 171, then generates and outputs a video signal conforming to the frame rate of the monitor 18 using the digital-to-analog converter 172 and the synchronization signal mixer 173. Accordingly, the apparatus of the present embodiment can extract video images at certain timings and display those images while slowing down the display speed thereof as shown in the timing chart of FIG. 13(a).

Figure 14A:
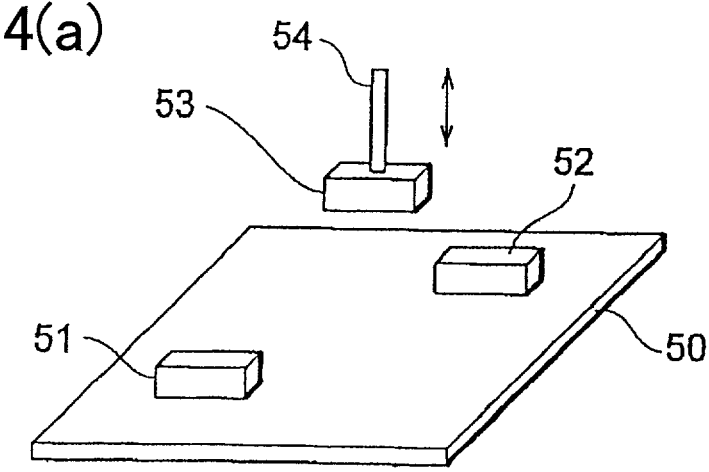
Figure 14B:
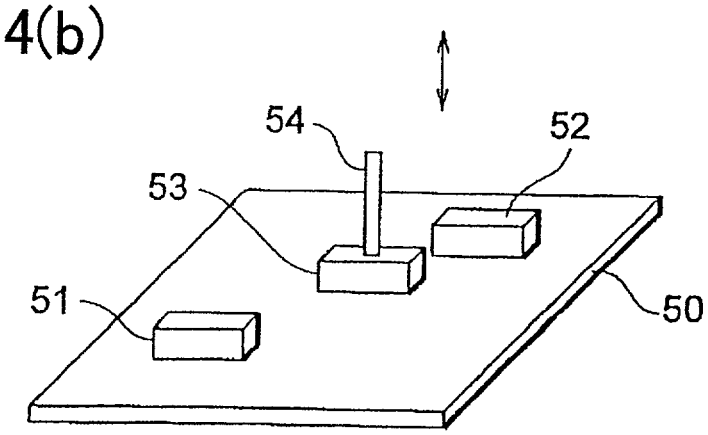
Figure 14C:
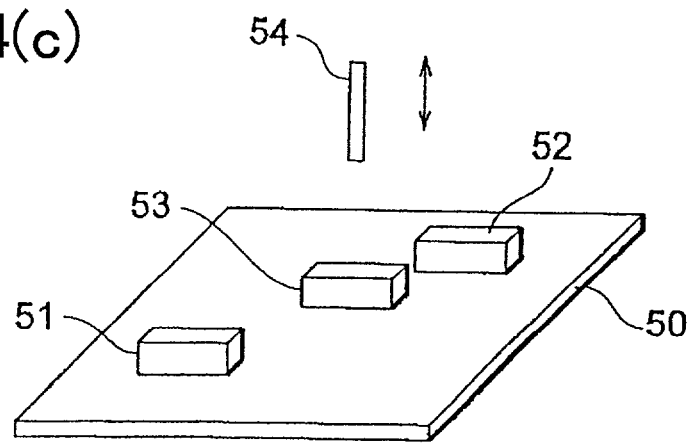

FIGS. 14(a) through 14(c) illustrate an example of how the camera system 1 according to the preferred embodiment can extract images at the instant in which a chip 53 is mounted on a substrate 50 using a device 54. Here, chips 51 and 52 are already mounted on the substrate 50. FIG. 14(b) is an image of the instant at which the chip 53 is mounted, while the images in FIGS. 14(a) and 14(c) are acquired before and after the instant in FIG. 14(b).

In order to extract an image at the moment when the chip 53 is mounted, the camera system 1 of the present embodiment performs a special characteristic extracting process to extract the chip 53, which is the target image, from the inputted image. The camera system 1 outputs the image when the target is mounted at a predetermined position on the substrate.

More specifically, the input image D(x, y) is first transferred to the image-processing unit 14. The image-processing unit 14 performs the center of gravity calculation processes and the edge extraction processes to generate processed images. The positions of the chip 53 are found quickly (at a fast frame rate) based on the results of the center-of-gravity calculation. At a timing, when the chip 53 reaches the predetermined position on the substrate 50, the signal conversion controller 19 instructs the signal converter 17 to convert image signals. Video images before and after the image at this timing (the image shown in FIG. 14(b)) are displayed on the monitor 18.

With this function, the apparatus can extract a series of images containing the most essential data, such as that just before and after the instant at which a drill contacts a machining workpiece or the instant at which a bat meets a ball, for example, and output these images to a monitor. Because most conventional image processings can be implemented in hardware in a similar manner as described above, it is possible to process images of fast moving objects.

Furthermore, the edge extraction circuit 403 that performs a 3×3 mask operation can perform various operations in addition to edge extraction by varying the mask data used in equation (c). For example, the mask $\{1, 1, 1, 1, 8, 1, 1, 1, 1\}$ can be used for a smoothing process; the mask $\{-1, 0, 1, -1, 0, 1, -1, 0, 1\}$ can be used for vertical line detection; and the mask $\{-1, -1, -1, 0, 0, 0, 1, 1, 1\}$ can be used for horizontal line detection.

In the embodiment described above, the composite image is displayed by overlaying the raw image and the processed images. However, the display screen could be split in half, simultaneously displaying the raw image in one half and the processed image(s) in the other. For example, in order to display the raw image and the processed image simultaneously in the left and right halves of the monitor, when transferring signals to the data buffers 171 shown in FIG. 9, the switches 20 can be changed to transfer signals from the analog-to-digital converter array 13 to a buffer region corresponding to the pixels displaying the raw image and to transfer signals from the image-processing unit 14 to a buffer region corresponding to the pixels displaying the processed image.

By switching each switch 20 at an arbitrary timing, it is possible to output only the raw image, to output only one processed image (only the center-of-gravity image or only the edge extraction image), or to output only the composite processed image (the composite image including the center-of-gravity image and the edge extraction image). Hence, images can be outputted in a user's desired format.

The binarization circuit 401 can be configured to pass the raw image data unchanged and to insert its binarized result after the LSB of this raw image data. Similarly, the edge extraction circuit 403 can be configured to allow the raw image data to pass unchanged. In this case, it becomes unnecessary to provide the data transfer lines $500_j$ that lead from the analog-to-digital converter array 13 to the switches 20 circumventing the image-processing unit 14.

Figure 15:
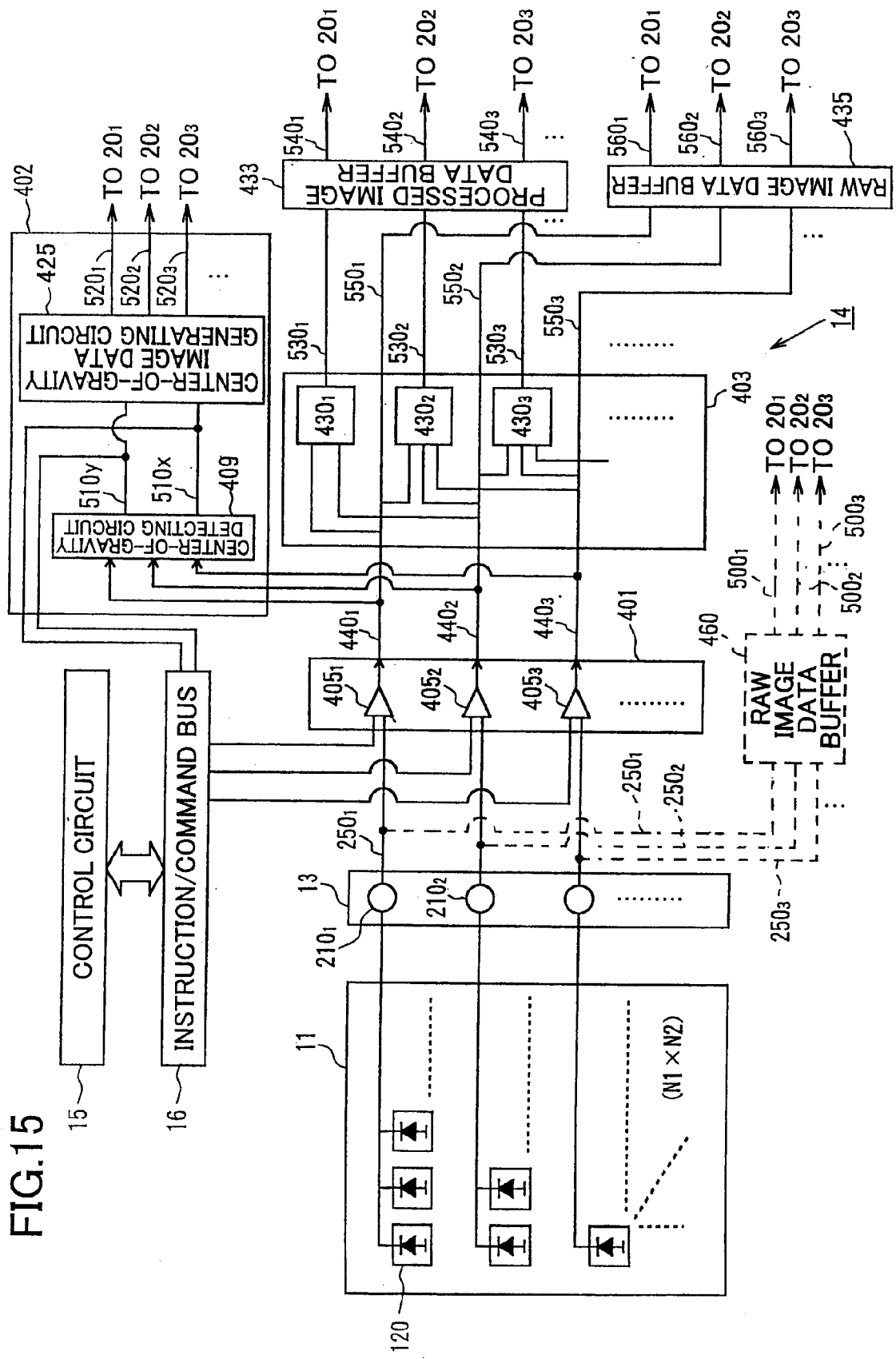
FIG. 15 is a block diagram showing a modification of the processing circuits in the image-processing unit of the camera system according to the first embodiment.
Figure 16:
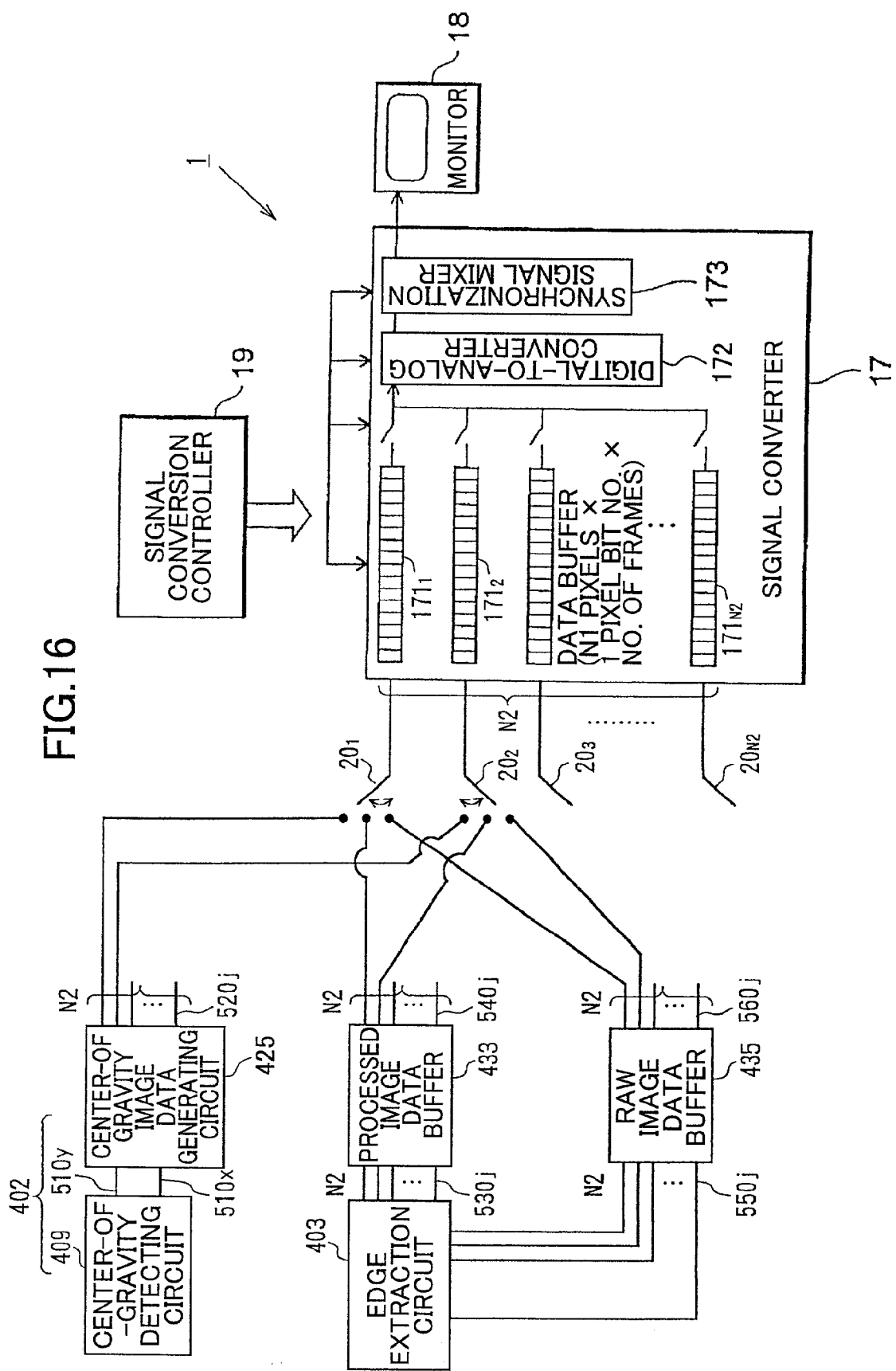
FIG. 16 is an explanatory diagram showing how the signal converter is connected to each processing circuit in FIG. 15.

More specifically, when binarizing the raw image data, each of the bit comparators $405_j$ in the binarization circuit 401 adds the binarized data to the raw image data and outputs the result to the corresponding data transfer line $440_j$, as shown in FIG. 15. In addition, as indicated by the dotted line in FIG. 8, a data transmission line $550_j$ for outputting raw image data D(x, y) for each row j is connected to the output terminal of the multiplier 431(5) in each sum-of-product computing unit $430_j$. In this case, all N2 data transfer lines $530_j$ and all N2 data transmission lines $550_j$ are connected to the output terminals of the N2 sum-of-product computing units $430_j$, as shown in FIG. 15. A raw image data buffer (a raw image data buffer 435, in this example) is connected to all the N2 data transmission lines $550_j$. N2 data transfer lines $560_j$ are connected to the output terminal of the raw image data buffer 435. This construction eliminates the need to provide an extended branch on the data transfer lines $250_j$, from the analog-to-digital converter array 13, in order to circumvent the image-processing unit 14. As shown in FIG. 16, therefore, composite image data can be generated by switching the switch $20_j$ corresponding to each row j in order to connect the corresponding data transfer line $560_j$ from the raw image data buffer 435, the corresponding data transfer line $540_j$ from the processed image data buffer 433, and the corresponding data transfer line $520_j$ from the center-of-gravity image data generating circuit 425 to the corresponding data buffer $171_j$.

In the above description, the center-of-gravity position is determined from the binarized image. However, a more precise center-of-gravity position can be determined using a similar calculation on the raw image, although the processing load is increased. Similarly the edge extraction process can be performed based on the raw image data.

A computer or other processing device can be connected to the signal converter 17 in place of the monitor 18. In this case, only composite image data of the extracted frames is outputted to the processing device at a desired frame rate. Accordingly, the processing device can easily perform required operations on the necessary images.

The object of the present embodiment is to provide an image sensor device, which extracts an image at a desired timing based on high-speed processed results, which combines the processed results with a raw image, and which outputs the combined results or displays the combined results for monitoring. The necessary processing speed is determined, for the factory automation robot, for example, dependently on the moving speed of an object and on the actuator speed of the robot (1–10 ms). According to the present embodiment, the processing speed is determined by the speed of the analog-to-digital conversion performed by the analog-to-digital converters 210. The number of bits in the outputs from the analog-to-digital converters 210 can be varied. Accordingly, if a higher-speed processing is required, it is possible to increase the processing speed by increasing the analog-to-digital conversion speed by reducing the number of bits. For example, if it takes 10 µs to perform conversion into eight bites, it is possible to make the conversion rate two times as high as the original conversion rate by reducing the data length into four-bit length from the eight-bit length.

In the embodiment described above, each data buffer 171 in the signal converter 17 is designed for buffering data of a plurality of frames. However, this construction can be simplified by omitting the data buffer 171, provided that acquiring still images at a specified timing is sufficient.

In the above-described system, in order to perform processing at a higher frame rate, it is possible to increase the frame rate by increasing the total number of pixels, from which data is transmitted per a unit time, by decreasing the number of tones (gradation) of conversion attained by the analog-to-digital converters 210. It is possible to increase the frame rate by making the data amount per one pixel from 8 bits (256 tones) through one bit (binary). For example, it is possible to increase the frame rate eight times as high as the original frame rate by changing the original data amount of 8 bits per pixel into one bit per pixel. More specifically, in the analog-to-digital converter shown in FIG. 3, comparison operation is performed for one pixel from its most significant bit to a lower bit. When the conversion has finished to a desired bit number, the conversion operation is reset. Then, the conversion operation is proceeded to the next pixel. It is therefore possible to attain the analog-to-digital conversion with an arbitrary gradation without changing the hardware construction. According to the present system, bit serial transfer method is employed in order to attain a parallel processing with using a small number of data lines. In other words, the outputs from each analog-to-digital converter are transferred via a corresponding single data line from the most significant bit. It is possible to easily cope with the change in the total number of bits by merely performing processing operation onto data of the effective bit number.

Another method for processing at a high frame rate is to perform calculations at a reduced resolution to reduce the amount of data. This can be achieved by simultaneously reading signals from several neighboring photodetector elements 120 in the photodetector array 11 shown in FIGS. 1 and 3. By reading a 128×128 pixel image at 64×128 pixels (simultaneously reading every two adjacent pixels in the horizontal direction) or at 32×128 pixels (simultaneously reading every four adjacent pixels in the horizontal direction), it is possible to reduce the amount of image data by 25% or 50%, thereby improving the processing speed by two times or four times. This procedure for achieving high-speed processing by taking the sum of electric currents from several pixels is called "binning."

The above two functions can be combined to perform adaptive image processing on an object. For example, the object is tracked at a high frame rate during normal monitoring, while acquiring images at a small number of analog tones and a rough resolution. When approaching a desired timing, the process is switched to acquire multiple toned high-resolution images for more detailed inspection.

Next, a camera system for high-speed image processing according to a second embodiment of the present invention will be described with reference to FIGS. 17 through 20.

Figure 17:
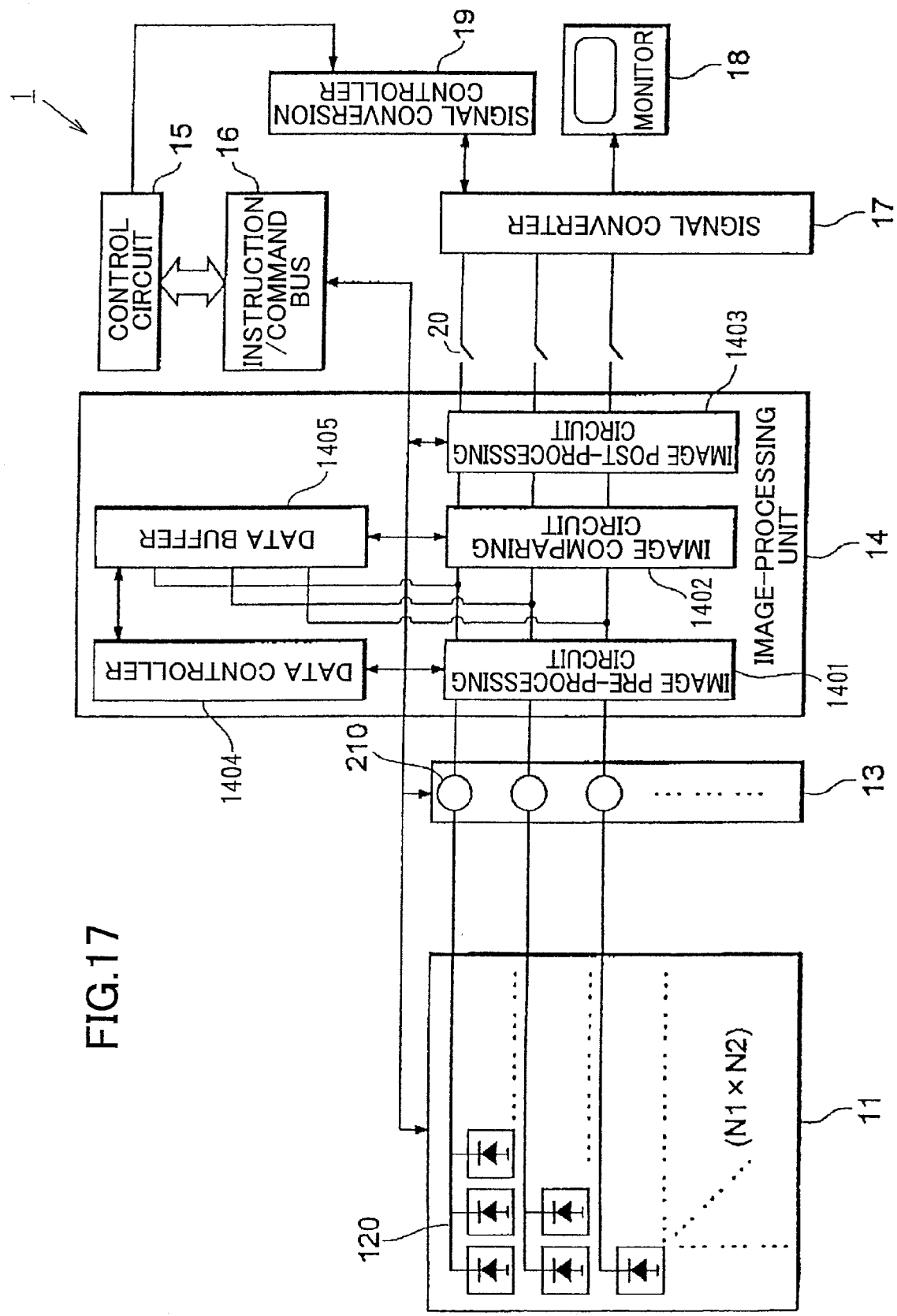
FIG. 17 shows the configuration of a camera system for high-speed image processing according to a second embodiment of the present invention.

FIG. 17 shows the construction of the camera system 1 according to the second embodiment of the present invention. Parts and components the same or similar to those in the camera system for high-speed image processing of the first embodiment are designated by the same reference numerals to avoid duplicating description.

The present embodiment differs from the first embodiment in that the camera system of the present embodiment is provided with an image pre-processing circuit 1401 in place of the binarization circuit 401. The image pre-processing circuit 1401 is for reducing noise. The camera system of the present embodiment also includes an image post-processing circuit 1403 that is constructed from the center-of-gravity calculating circuit 402 and edge extraction circuit 403. In addition, an image comparing circuit 1402 is provided between the image post-processing circuit 1403 and image pre-processing circuit 1401.

In the image-processing unit 14 of the present embodiment, a data controller 1404 and a data buffer 1405 are connected to the processing element array that is constructed from the processing circuits 1401 through 1403. Here, the data buffer 1405 is connected to the image comparing circuit 1402, and stores background image data to be supplied to the image comparing circuit 1402. The data controller 1404 controls the transfer of background image data from the data buffer 1405 to the image comparing circuit 1402.

Accordingly, the image-processing unit 14 in the present embodiment includes the image pre-processing circuit 1401, image comparing circuit 1402, image post-processing circuit 1403, data controller 1404, and data buffer 1405.

The control circuit 15 in the present embodiment is connected to the data buffer 1405, data controller 1404, image pre-processing circuit 1401, image comparing circuit 1402, and image post-processing circuit 1403 via the instruction/command bus 16. The control circuit 15 controls each of these components.

Another difference from the first embodiment is that the second embodiment has no branch portion connected to the N2 data transfer lines $250_j$ leading from the analog-to-digital converter array 13 to circumvent the image-processing unit 14. The second embodiment is also not provided with the raw image data buffer 460.

Accordingly, the camera system for high-speed image processing of the second embodiment performs noise reduction as a pre-process, background removal as a comparison process, and edge extraction and center-of-gravity calculations as post-processes.

Figure 18:
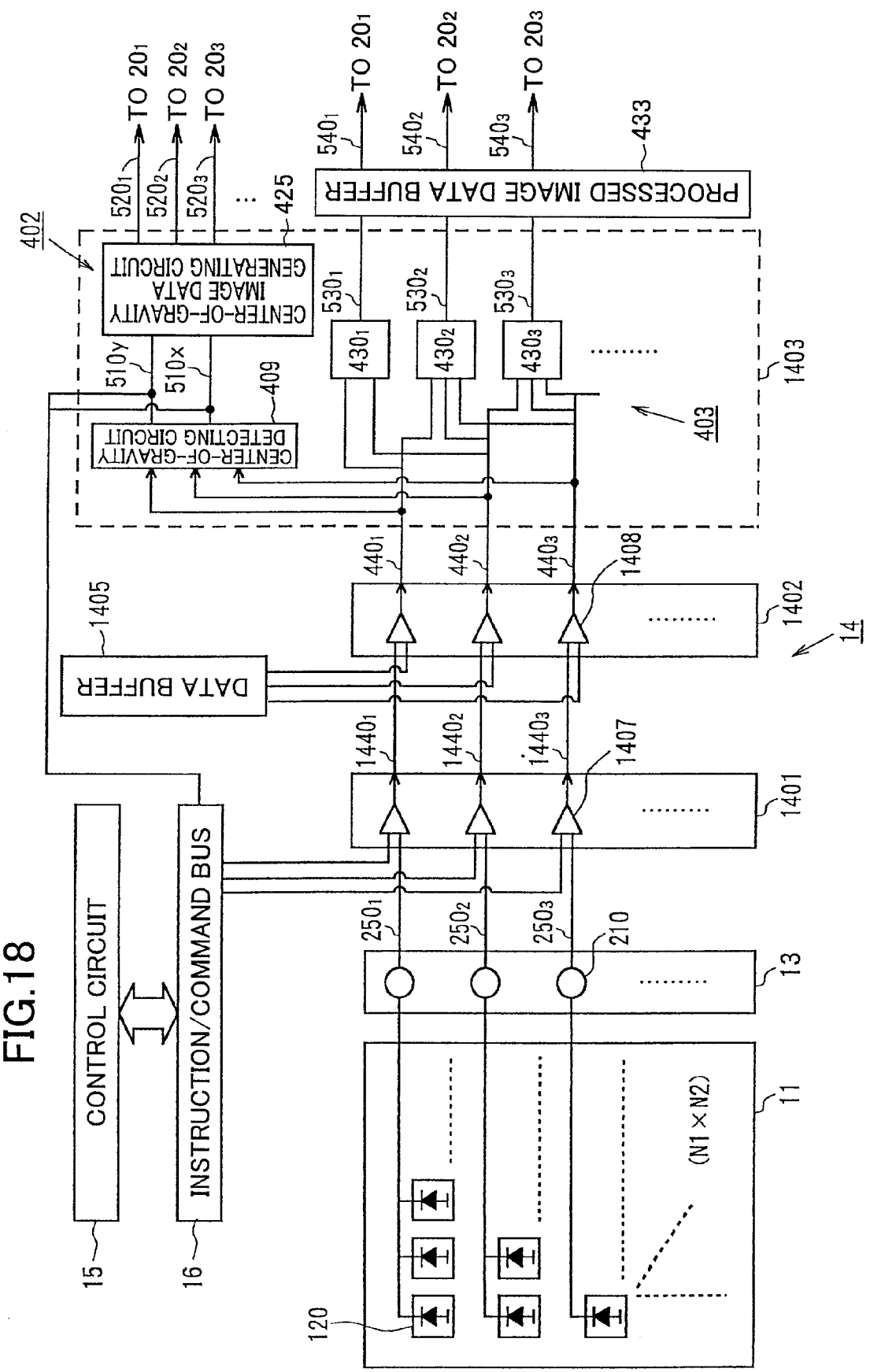
FIG. 18 is a block diagram of processing circuits in the image-processing unit of the camera system according to the second embodiment.

FIG. 18 is a block diagram showing the overall construction of the image pre-processing circuit 1401, image comparing circuit 1402, and image post-processing circuit 1403.

A plurality of bit comparators $1407_j$ are provided in the image pre-processing circuit 1401 for performing noise reduction, one for each row j in the photodetector array 11. In other words, N2 bit comparators $1407_j$ are provided in the image pre-processing circuit 1401. One input terminal of each bit comparator $1407_j$ is connected to the data transfer line $250_j$ from the corresponding analog-to-digital converter $210_j$. The other input terminal of each bit comparator $1407_j$ is connected to the control circuit 15 via the instruction/command bus 16. A data transfer line $1440_j$ is connected to the output terminal of each bit comparator $1407_j$. Hence, N2 data transfer lines $1440_j$ are outputted from the image pre-processing circuit 1401.

The image comparing circuit 1402 is configured of a plurality of subtractors 1408, one for each row j in the photodetector array 11. Hence, N2 subtractors $1408_j$ are provided in the image comparing circuit 1402. The positive input terminal of each subtractor $1408_j$ receives, via the corresponding data transfer line $1440_j$, signals which have been processed by a corresponding bit comparator $1407_j$ in the image pre-processing circuit 1401. The negative input terminal of each subtractor $1408_j$ receives signals indicating a predetermined background image from the data buffer 1405. The output terminal of each subtractor $1408_j$ is connected to the corresponding data transfer line $440_j$. Accordingly, N2 data transfer lines $440_j$ are outputted from the overall image comparing circuit 1402.

The image post-processing circuit 1403 includes the center-of-gravity calculating circuit 402 and the edge extraction circuit 403. Similar to the first embodiment, the center-of-gravity calculating circuit 402 includes the center-of-gravity detecting circuit 409 and the center-of-gravity image data generating circuit 425. Further, the edge extraction circuit 403 includes a plurality of sum-of-product computing units $430_j$, which are provided in one-to-one correspondence with the rows j in the photodetector array 11 and each of which is for performing a 3×3 mask operation. Further, the center-of-gravity detecting circuit 409 and edge extraction circuit 403 are connected in parallel with each other to the N2 data transfer lines $440_j$, which extend from the image comparing circuit 402. The center-of-gravity detecting circuit 409 and edge extraction circuit 403 are provided to perform a center-of-gravity calculation and edge extraction process on the raw image data, from which noise and background image has been removed.

As in the first embodiment, N2 data transfer lines $520_j$ are connected to the output terminal of the center-of-gravity image data generating circuit 425. The processed image data buffer 433 is connected to the edge extraction circuit 403 via the N2 data transfer lines $530_j$. Also, N2 data transfer lines $540_j$ extend out from the processed image data buffer 433.

Figure 19:
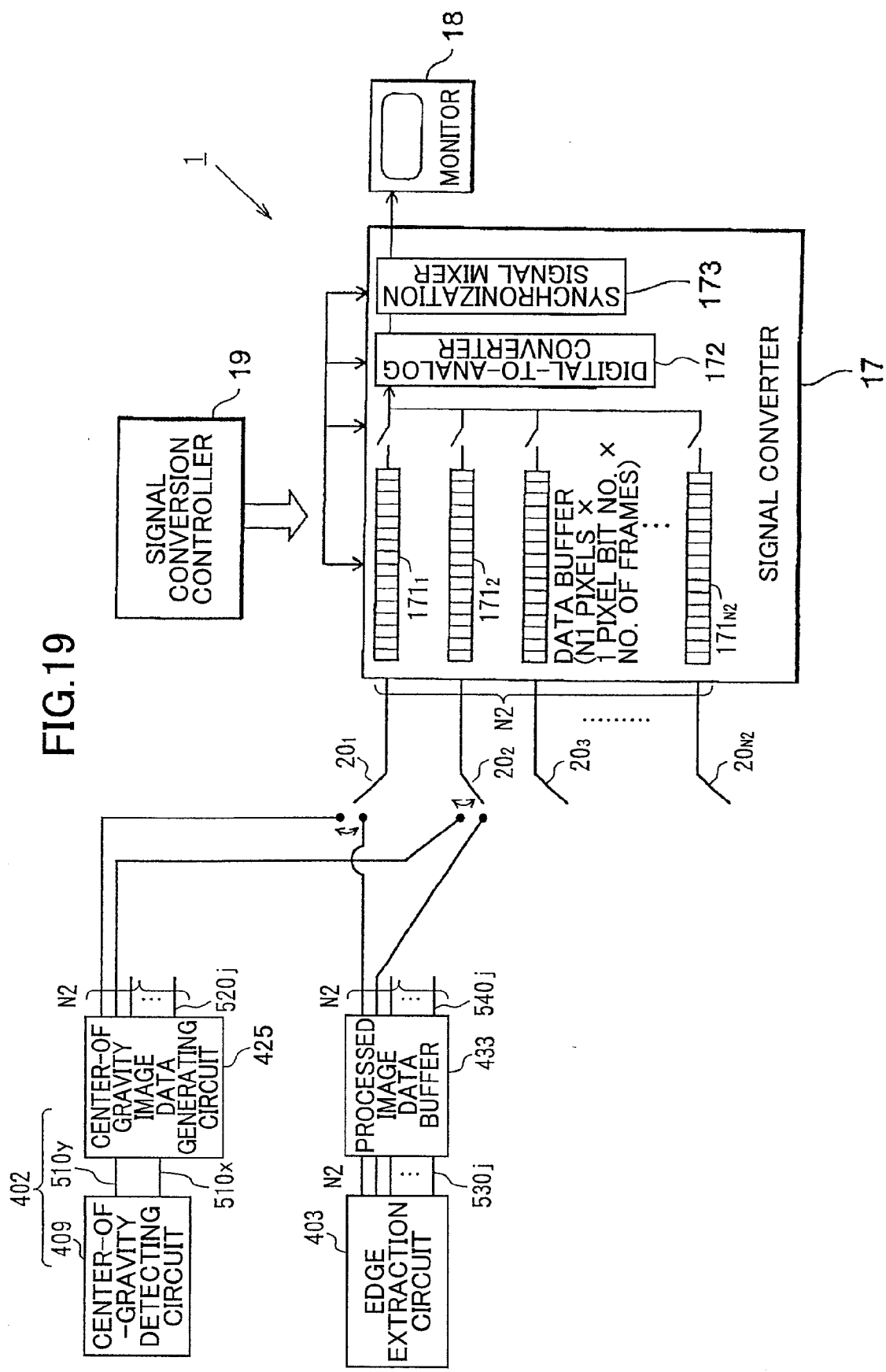
FIG. 19 is an explanatory diagram showing how the signal converter is connected to each processing circuit in the second embodiment.

As shown in FIG. 19, the switch $20_j$ corresponding to each row j switchinly connects the corresponding data transfer line $520_j$ and the corresponding data transfer line $540_j$ to the corresponding data buffer $171_j$.

According to the camera system 1 of the present embodiment having the construction described above, as shown in FIG. 20, a pre-process is performed on the raw image data acquired by the photodetector array 11 to reduce noise. Subsequently, a comparison operation is performed to remove the background. Then post-processes are conducted, including a center-of-gravity detection and edge extraction. Through these processes, it is possible to display the processed results by overlaying the center-of-gravity image and edge extraction image.

Figure 20:
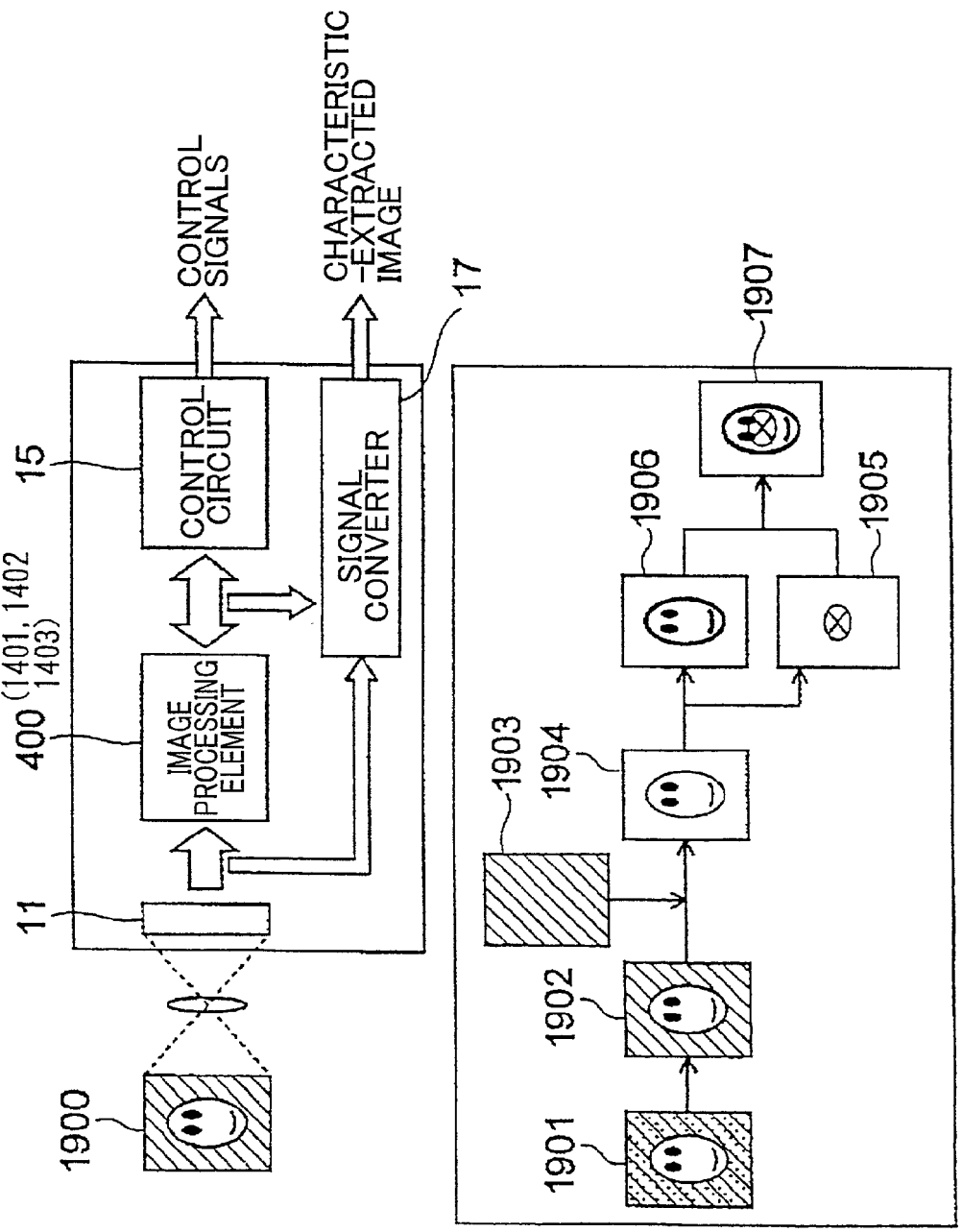
FIG. 20 is an explanatory diagram showing the concept of image processing in the camera system according to the second embodiment.

Next, the operations of the camera system 1 according to the present embodiment will be described with reference to FIG. 20.

A raw image 1901 of an object 1900 taken by the photodetector array 11 and the analog-to-digital converter array 13 includes a noise component. Therefore, the image pre-processing circuit 1401 performs noise reduction on the image. That is, the bit comparator $1407_j$ for each row j performs a comparison between the image signal and a comparison signal, which is a predetermined threshold value. The bit comparator $1407_j$ outputs the image signal as is (if the raw image signal is four bits, for example, the four bit raw image signal is outputted without change) only when the image signal matches or is greater than the comparison signal, and outputs a zero (for example, the four-bit image signal (0 0 0 0) when the raw image signal is four bits) when smaller. With this process, raw image signals that are less than the predetermined value are eliminated as noise. The result of this process is a pre-processed (noise-reduced) image 1902 of the raw image 1901, as shown in FIG. 20.

Next, the image comparing circuit 1402 eliminates the background of the pre-processed image 1902 (the raw image data, from which noise has been removed). Image data for a background image 1903 is prestored in the data buffer 1405. The data controller 1404 controls transmission of the background image data from the data buffer 1405 to each subtractor $1408_j$. In other words, the data controller 1404 transfers background image data for each pixel (x, y) from the data buffer 1405 to the corresponding subtractor $1408_j$ at the same time noise-reduced image data for the same pixel (x, y) is inputted into the corresponding subtractor $1408_j$ (here, j=y).

Each subtractor $1408_j$ generates a noise/background-removed image 1904 after removing the background image 1903 from the pre-processed image 1902 by subtracting image signals for the background image 1903 from image signals for the pre-processed image 1902. The noise/background-removed image 1904 is outputted to the image post-processing circuit 1403 via corresponding data transfer lines $440_j$.

Image signals for the noise/background-removed image 1904 are transferred to the center-of-gravity calculating circuit 402 and edge extraction circuit 403 in the image post-processing circuit 1403. The center-of-gravity calculating circuit 402 performs the same operation described in the first embodiment. Accordingly, the center-of-gravity position is determined by the center-of-gravity detecting circuit 409 and a center-of-gravity image 1905 is generated by the center-of-gravity image data generating circuit 425. The edge extraction circuit 1403 generates an edge extraction image 1906.

As shown in FIG. 19, the switch $20_j$ corresponding to each row j is switched between the corresponding data transfer line $520_j$ and the corresponding data transfer line $540_j$. By doing so, the center-of-gravity image 1905 and edge extraction image 1906 are combined to generate a composite image 1907. The composite image 1907 is stored in the corresponding data buffer $171_j$.

As in the first embodiment, the control circuit 15 in the present embodiment controls the entire apparatus to perform the process of the flowchart shown in FIG. 12. When the center-of-gravity position (Px, Py) determined by the center-of-gravity detecting circuit 409 in a certain frame matches a predetermined set position (Yes in S40), it is determined that the time reaches a display timing. Accordingly, the composite images 1907 for successive frames, including the previous n frames, the current frame, and the following n frames, are converted to a frame rate appropriate for the monitor 18 and displayed thereon.

As described above, the image-processing unit 14 according to the second embodiment includes the image pre-processing circuit 1401, image comparing circuit 1402, image post-processing circuit 1403, and data buffer 1405 for performing high-speed image processing. The signal converter 17 combines signals outputted from the image post-processing circuit 1403. Under control of the control circuit 15 and signal conversion controller 19, the signal converter 17 downconverts the composite signal at an important timing into a frame rate appropriate for display on the monitor 18, and then displays the image on the monitor 18.

In the present embodiment, a background image is stored in the data buffer 1405, and the image comparing circuit 1402 generates an output image by subtracting the background image from the picked up image. Therefore, images minus their backgrounds can be outputted in real-time.

As in the variation of the first embodiment, the sum-of-product computing units $430_j$ of the present embodiment also can be configured to output the unaltered input image data, as shown by the dotted line in FIG. 8. In this case, the sum-of-product computing units $430_j$ output the unchanged noise/background-removed image 1904, which has had the noise and background removed. The processed image data buffer 433 and the raw image data buffer 435 are provided after the edge extraction circuit 403, as described with reference to FIGS. 15 and 16, with the N2 data transfer lines $540_j$ and N2 data transfer lines $560_j$ outputted therefrom. With this construction, the edge extraction circuit 404 generates the edge extraction image 1906 and transfers the noise/background-removed image 1904 unaltered. In this case, similarly in the manner shown in FIG. 16, the switch $20_j$ corresponding to each row j is switched to connect the corresponding data transfer lines $520_j$, $540_j$, and $560_j$ alternately to the corresponding data buffer $171_j$. By doing so, the noise/background-removed image 1904, center-of-gravity image 1905, and edge extraction image 1906 are combined to generate the composite image 1907. The composite image 1907 is stored in the corresponding data buffer $171_j$ and can be displayed at a desirable timing.

When it is desirable to perform image processing with the above system at an even faster frame rate, the analog-to-digital converters $210_j$ can perform analog-to-digital conversion at a desirable gradation as described in the first embodiment. In this case, the comparison image stored in the data buffer 1405 should have the same number of bits as the converted image. Alternatively, it is possible to control the data controller 1404 to convert the bit number when reading the image from the data buffer 1405.

As described in the first embodiment, it is also possible to combine gradation alteration and binning in the analog-to-digital conversion to perform image processing suitable for the intended target in order to attain an adaptive image processing operation. However, in order to perform subtraction calculations, matching, or other comparison processes on images with different gradations or resolutions in the present embodiment, it is preferable to pre-store, in the data buffer, a plurality of comparison images (background images or reference images) for each of the plurality of possible conditions.

It is also possible to generate and output only the portions, of an image, that are different from a previous image. More specifically, it is possible to generate an extracted image of a moving object. This is achieved by storing the image of a previous frame in the data buffer 1405, and by subtracting the image of the previous frame from the present image, by using the comparison processing circuit 1402, to thereby generate an output image. Here, instead of performing a simple subtraction with the present frame, the image of the present frame can be compared with the image of the previous frame (data buffer), and subsequently, the image post-processing circuit 1403 determines that image signals exceeding a certain threshold value are moving pixels. By outputting the thus determined image signals as a final output result, it is possible to clearly output only those pixels that move in the entire image. By calculating the center of gravity based on this image output using the center-of-gravity calculating device, it is possible to perform precise tracking of moving objects.

Next, a camera system for high-speed image processing according to a third embodiment of the present invention will be described with reference to FIGS. 21 through 26.

Figure 21:
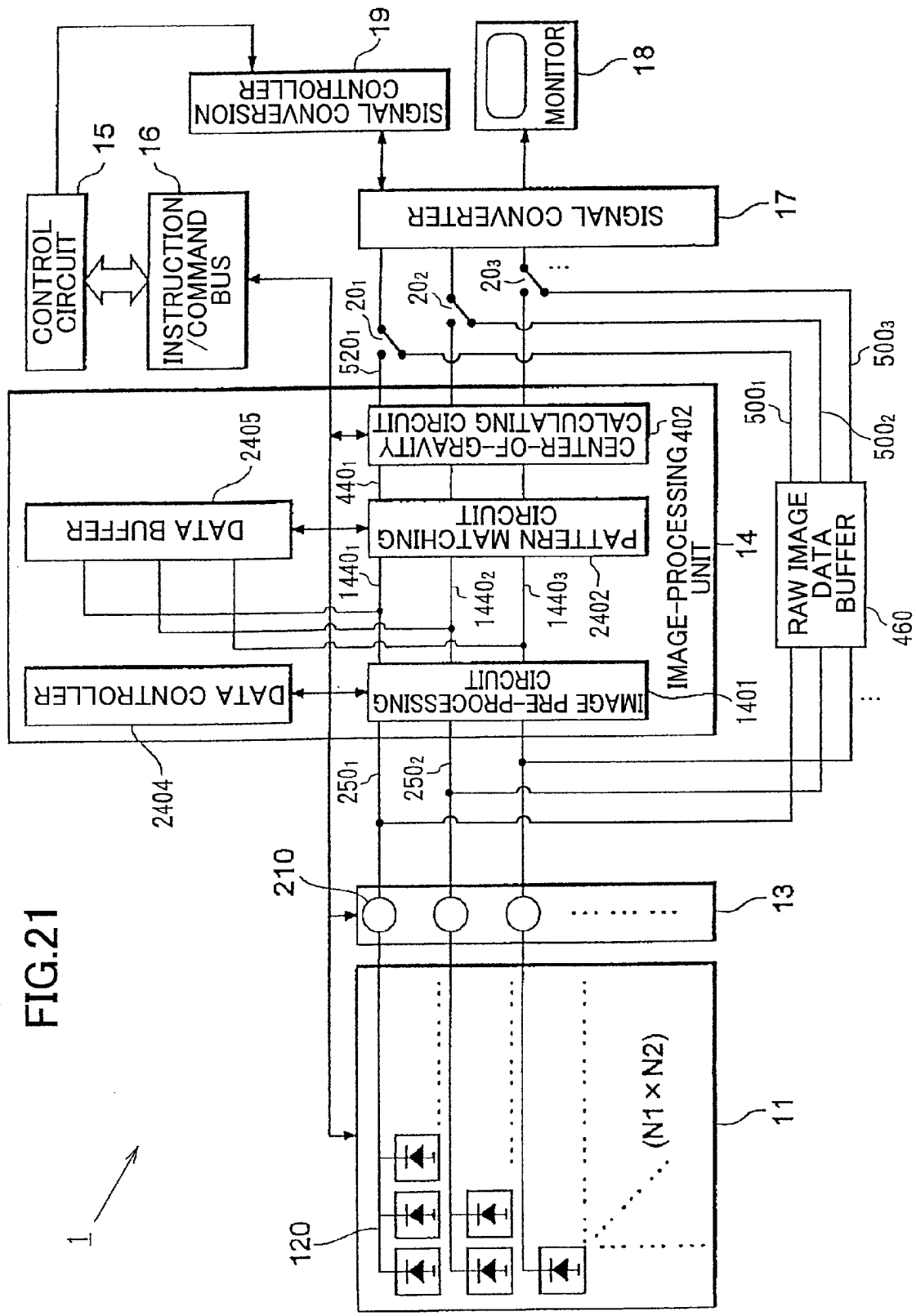
FIG. 21 shows the configuration of a camera system for high-speed image processing according to a third embodiment of the present invention.

FIG. 21 shows the construction of the camera system 1 according to the third embodiment. Parts and components the same as or similar to those in the camera system 1 according to the first and second embodiments are designated by the same reference numerals in the present embodiment to avoid duplicating description.

The image-processing unit 14 of the present embodiment is provided with the same image pre-processing circuit 1401 as described in the second embodiment. The image pre-processing circuit 1401 serves as a processing circuit 400 for performing noise reduction as a pre-process. In addition, the image-processing unit 14 is provided with a pattern matching circuit 2402. The pattern matching circuit 2402 serves as a processing circuit 400 for performing a comparison process. In addition, the image-processing unit 14 is provided with a center-of-gravity calculating circuit 402 as a processing circuit 400 for performing a post-process.

Similar to the second embodiment, a data buffer 2405 is connected to the pattern matching circuit 2402. The data buffer 2405 stores m1×m2 reference image data that the pattern matching circuit 2402 uses to perform pattern matching. Also as in the second embodiment, the image-processing unit 14 of the third embodiment is provided with a data controller 2404 for controlling the transfer of the m1×m2 reference image data from the data buffer 2405 to the pattern matching circuit 2402.

As in the first embodiment, the N2 data transfer lines $250_j$ extending from the output terminals of the analog-to-digital converter array 13 form branches, with one branch connected to the image-processing unit 14 and the other connected to the raw image data buffer 460. As in the first embodiment, the output terminal of the raw image data buffer 460 is connected to the N2 data transfer lines 500$_j$. After storing raw image data for a predetermined period of time, the raw image data buffer 460 outputs the image data to the switches 20$_j$ via the data transfer lines 500$_j$.

Figure 22:
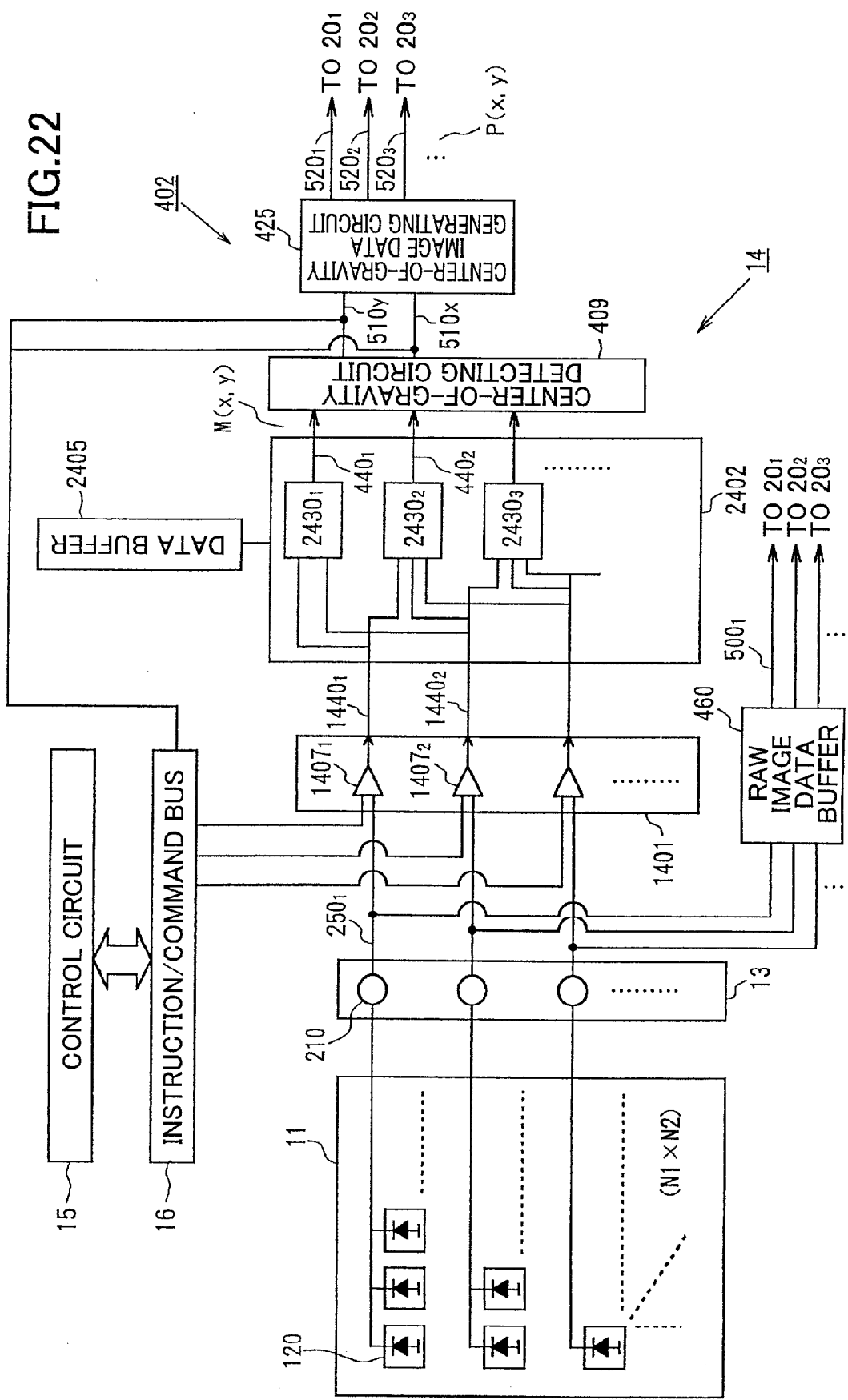
FIG. 22 is a block diagram of the processing circuits in the image-processing unit of the camera system according to the third embodiment.

As shown in FIG. 22, the image pre-processing circuit 1401 is configured of N2 bit comparators 1407$_j$, as in the second embodiment. N2 data transfer lines 1440$_j$ are connected to the output terminals of the bit comparators 1407$_j$. The N2 data transfer lines 1440$_j$ are connected to the pattern matching circuit 2402.

Next, the pattern matching circuit 2402 will be described with reference to FIGS. 22 and 23.

The pattern matching circuit 2402 performs a matching operation on a m1×m2 reference image s(p, q) and the raw image data D(x, y), from which noise has been reduced.

Numerous algorithms for matching operations have been proposed. For example, the following function "Error" is determined for an m1×m2 region, which has the pixel (x, y) in its upper left corner, and the m1×m2 reference image. It is possible to determine that these regions match when the value of this function is less than or equal to a predetermined threshold value.

$$\text{ERROR}(x, y) = \sum_{p=1}^{m1} \sum_{q=1}^{m2} |D(x + p - 1, y + q - 1) - s(p, q)|$$

For simplicity, the present embodiment employs a 3×3 reference image as the m1×m2 reference image data. In other words, m1=m2=3. The 3×3 regions, centered on each pixel (x, y), in the N1×N2 image are compared to the 3×3 reference image in a matching operation. Hence, the function Error shown below is determined for 3×3 regions, each of which is centered on the each pixel (x, y), and the 3×3 reference image. When the value of the function is equal to or below the predetermined threshold value, the 3×3 region and 3×3 reference image are said to match. When a match is determined, a value of one (1) is outputted for the center pixel (x, y). When the images do not match, a value of zero (0) is outputted for the center pixel (x, y) Through this process, matching image data M(x, y) is generated.

$$\text{ERROR}(x, y) = \sum_{p=1}^{3} \sum_{q=1}^{3} |D(x + p - 2, y + q - 2) - s(p, q)|$$

In a more detailed description, the pattern matching circuit 2402 includes N2 total sum of differential absolute values comparators 2430$_j$ which are provided in one-to-one correspondence with the N2 data transfer lines 1440$_j$.

Figure 23:
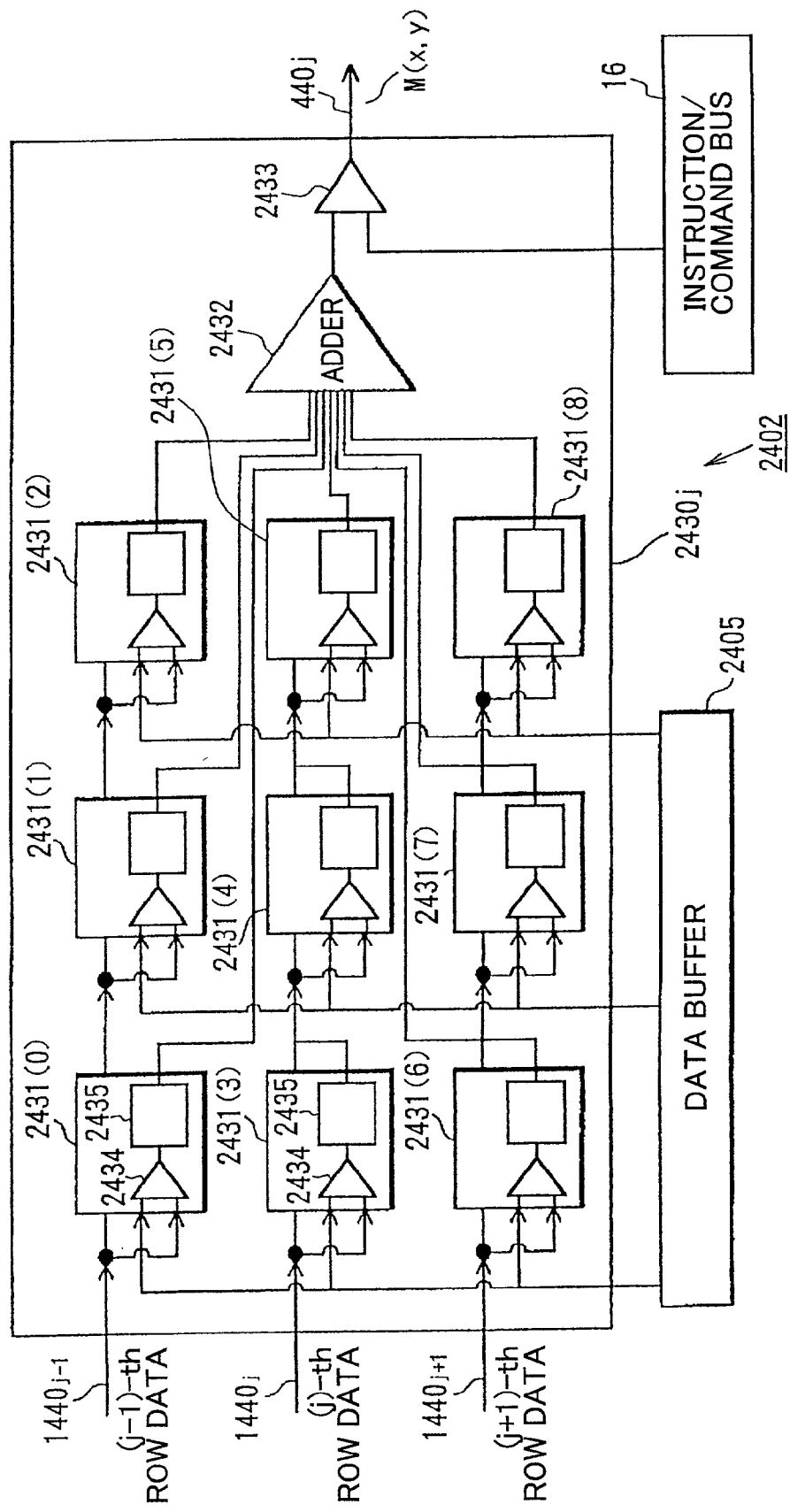
FIG. 23 is a block diagram of the pattern matching circuit in the processing circuits in FIG. 22.

As shown in FIG. 23, each total sum of differential absolute values comparator 2430$_j$ is connected to not only the corresponding data transfer line 1440$_j$, but also the data transfer line 1440$_{j-1}$ and data transfer line 1440$_{j+1}$ directly above and below the data transfer line 1440$_j$. In other words, the total sum of differential absolute values comparator 2430$_j$ is connected to the corresponding m2 (3 in the present embodiment) data transfer lines j−1, j, and j+1. Within the total sum of differential absolute values comparator 2430$_j$ are provided m1×m2 (3×3=9 in the present embodiment) differential absolute value processors 2431(0) through 431 (8), one adder 2432, and one comparator 2433.

Every m1 (3 in the present embodiment) differential absolute value processors among the differential absolute value processors 2431(0) through 2431(8) are connected to one of the m2 data transfer lines 1440$_{j-1}$, 1440$_j$, or 1440$_{j+1}$. In other words, the differential absolute value processors 2431(0) through 2431(2) are connected to the data transfer line 1440$_{j-1}$. The differential absolute value processors 2431(3) through 2431(5) are connected to the data transfer line 1440$_j$. The differential absolute value processors 2431 (6) through 2431(8) are connected to the data transfer line 1440$_{j+1}$. The differential absolute value processors 2431 in each row are configured to transfer image data from the corresponding data transfer line 1440 to subsequent differential absolute value processors in sequence. According to this data transfer, image data for a certain photodetector element 120 and the eight photodetector elements surrounding this photodetector element 120 is inputted into the input terminals of the differential absolute value processors 2431. It is noted that since no j−1 row exists for the total sum of differential absolute values comparator 2430, corresponding to the first row (j=11) data transfer lines 1440 are not connected to the differential absolute value processors 2431 (0) through 2431(2) in the comparator 2430$_1$. Accordingly, the image data 0 is always inputted into the differential absolute value processors 2431(0) through 2431(2) in the comparator 2430$_1$. Similarly, since no row j+1 exists for the total sum of differential absolute values comparator 2430$_{N2}$ corresponding to the N2$^{th}$ row (j=N2), data transfer lines 1440 are not connected to the differential absolute value processors 2431(6) through 2431(8) in the comparator 2430$_{N2}$. Accordingly, the image data 0 is always inputted into the differential absolute value processors 2431(6) through 2431(8) in the comparator 2430$_{N2}$.

The other input terminal of each of the differential absolute value processors 2431(0) through 2431(8) is connected to the data buffer 2405. The data buffer 2405 transfers the m1×m2 (3×3 in this example) reference image s(p, q) to the other input terminals.

The output of each differential absolute value processor 2431 is connected to the corresponding input terminal of the adder 2432. The output of the adder 2432 is connected to one input terminal of the comparator 2433. A predetermined threshold value transmitted from the instruction/command bus 16 is inputted into the other input terminal of the comparator 2433.

Each differential absolute value processor 2431 includes a subtractor 2434 and an absolute value processor 2435. The subtractor 2434 subtracts reference image data received from the data buffer 2405 from the input image data, from which noise has been reduced. The absolute value processor 2435 determines the absolute value of the difference obtained in the subtraction process. The adder 2432 determines the total sum of absolute values received from all the nine differential absolute value processors 2431 (0) through 2431 (8). The comparator 2433 compares the total sum of these absolute values with the predetermined threshold value. The comparator 2433 outputs a value of one (1) when the total sum is less than or equal to the threshold value, and outputs a value of zero (0) when the total sum is greater than the threshold value. The comparison result indicates whether or not the input image for an m1×m2 (3×3) region, centered on a pixel (x, y) for the noise-reduced image data D(x, y) which is inputted into the centered differential absolute value processor 2431(4), is equivalent to the m1×m2 (3×3) reference image. An output of one (1) indicates that the images are the same, while an output of zero (0) indicates they are not the same.

Each total sum of differential absolute values comparator $2430_j$ having the construction described above repeatedly performs calculation-and-comparing operation for sequential 3×3 regions, each of which is centered on one of the N1 pixels (x, y) in the corresponding row j (j=y). For each 3×3 region, the differential absolute values comparator $2430_j$ calculates absolute values of the differences, and compares the calculated results with the threshold value. In this way, the differential absolute values comparator $2430_j$ sequentially outputs matching image data M(x, y) for the corresponding row j. The data transfer line $440_j$ is connected to the output terminal of each total sum of differential absolute values comparator $2430_j$. Accordingly, N2 data transfer lines $440_j$ are connected to the output terminals of the overall pattern matching circuit 2402. The N2 data transfer line $440_j$ are also connected to the center-of-gravity calculating circuit 402.

It is noted that the size (m1×m2) of the reference image used as the comparison image is not limited to 3×3, but can be selected arbitrarily according to the size of the object image to be compared, providing m1×m2 differential absolute value processors 2431 are arranged two-dimensionally in m1 columns and m2 rows within the total sum of differential absolute values comparator $2430_j$ provided for each row j. The m2 rows of differential absolute value processors 2431 can be connected to a total of m2 neighboring data transfer lines 1440, including the corresponding data transfer line $1440_j$. m1 differential absolute value processors 2431 are provided in each row that corresponds to one data transfer line 1440.

Figure 7:
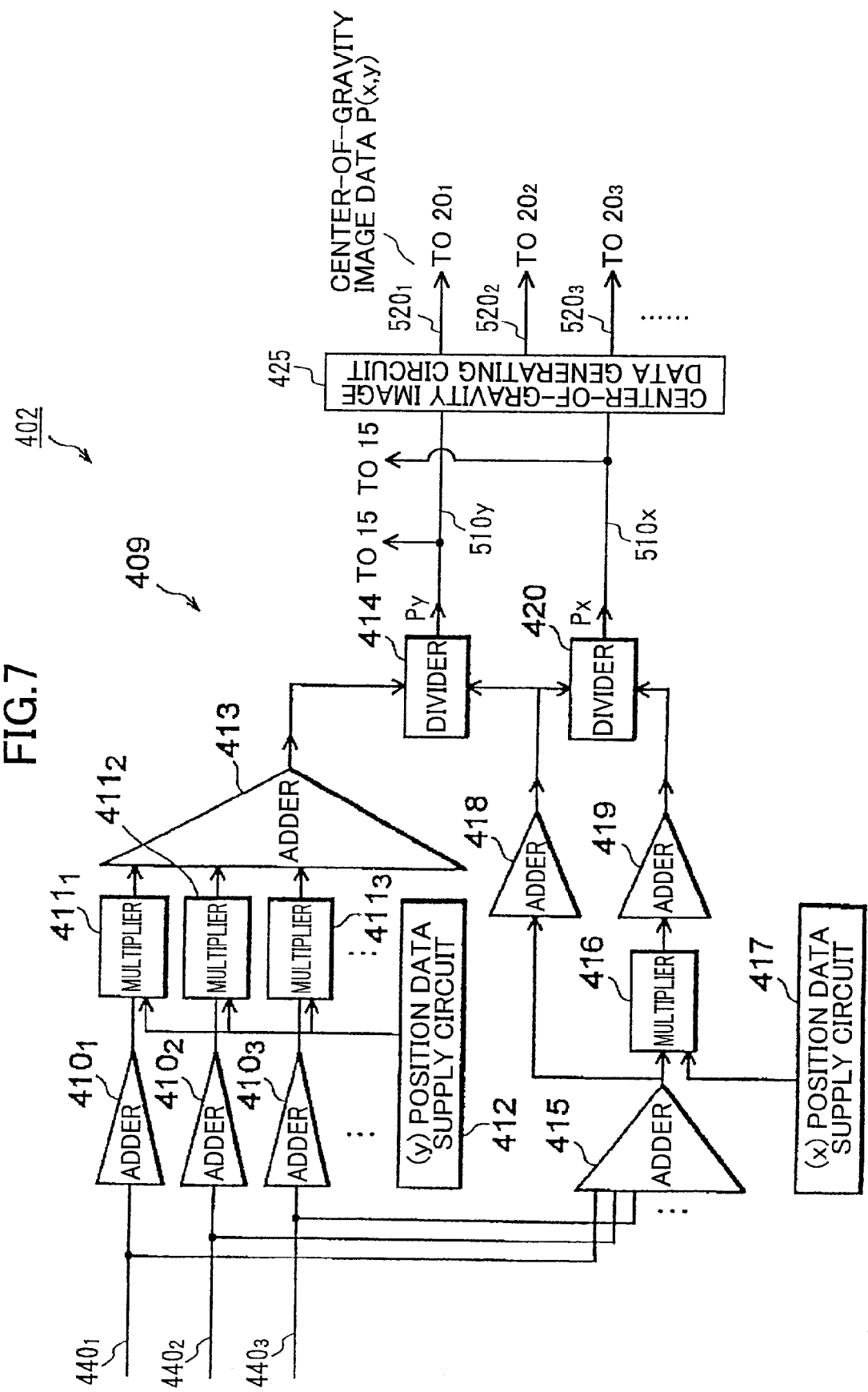
FIG. 7 is a block diagram of a center-of-gravity calculating circuit in the image-processing unit of the camera system according to the first embodiment.

As in the first embodiment, the center-of-gravity calculating circuit 402 has the construction shown in FIG. 7. The center-of-gravity detecting circuit 409 performs a center-of-gravity operation on the matching image data M(x, y) inputted from the pattern matching circuit 2402 via the N2 data transfer lines $440_j$ to find the center-of-gravity position (Px, Py). This result is outputted to the control circuit 15. The center-of-gravity image data generating circuit 425 in the center-of-gravity calculating circuit 403 generates the center-of-gravity image data P(x, y) indicating the center-of-gravity position (Px, Py) and outputs this data to the data transfer lines $520_j$.

Figure 24:
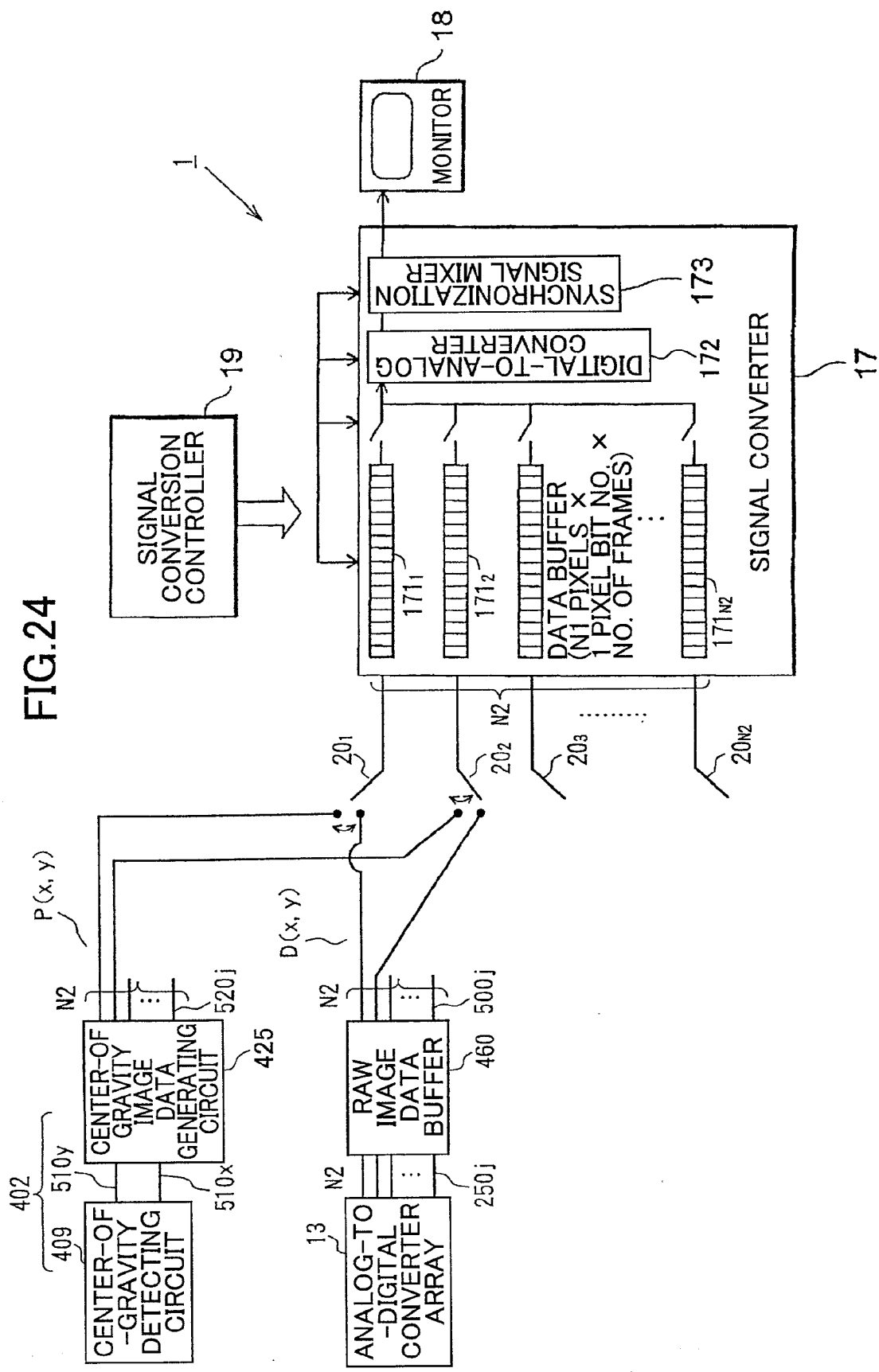
FIG. 24 is an explanatory diagram showing how the signal converter is connected to the analog-to-digital converter array and each processing circuit in the third embodiment.

As shown in FIGS. 21 and 24, the switch $20_j$ corresponding to each row j switches between the data transfer line $500_j$ from the raw image data buffer 460 and the data transfer line $520_j$ from the center-of-gravity calculating circuit 402 to connect the data transfer lines $500_j$ and data transfer lines $520_j$ to the corresponding data buffer $171_j$. Therefore, the raw image data and center-of-gravity image data can be combined and stored in the data buffer $171_j$.

The camera system 1 of the present embodiment having the construction described above can monitor movement of an object at a fast frame rate. The camera system 1 can extract an important moment, such as the moment in which the object's moving state changes, and display n frames before and n frames after that moment on the monitor.

Figure 25:
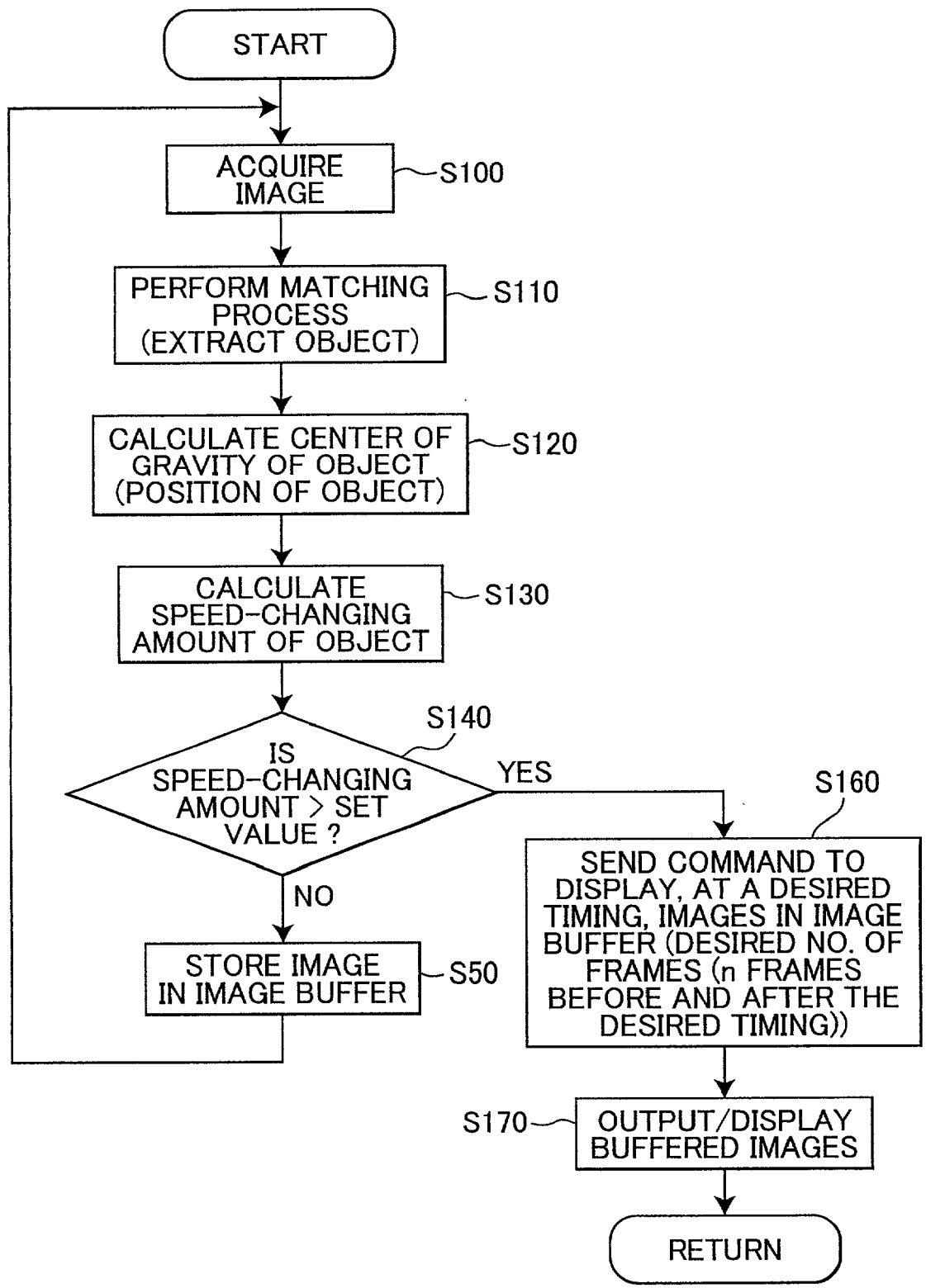
FIG. 25 is a flowchart showing the process of control in the camera system according to the third embodiment.

Next, the above-described processes in the present embodiment performed under the control of the control circuit 15 will be described according to the flowchart in FIG. 25.

Beginning in S100, the control circuit 15 controls the photodetector array 11 and analog-to-digital converter array 13 to acquire one frame of raw image data. The raw image data is transferred to the image-processing unit 14 via the data transfer lines $250_j$ and stored in the raw image data buffer 460.

Next, the control circuit 15 directs the image-processing unit 14 to perform image processes in S110. First the image-processing unit 14 directs the image pre-processing circuit 1401 to perform noise reduction on the image data. The image-processing unit 14 then controls the pattern matching circuit 2402 to perform a matching operation on the noise-reduced data and the m1×m2 reference image showing the targeted object. Through these processes the image-processing unit 14 generates matching image data M(x, y). The position of the object in the present frame is indicated by the position of a data (1) in the matching image data.

In S120, the control circuit 15 directs the center-of-gravity calculating circuit 402 to calculate the center-of-gravity position (Px, Py) in the matching image data M(x, y) for the current frame. The result of this calculation indicates the center-of-gravity position (Px, Py) of the object in the current frame. This result is transmitted to the control circuit 15. The center-of-gravity image data generating circuit 425 in the center-of-gravity calculating circuit 402 generates center-of-gravity image data.

In S130, the control circuit 15 calculates the amount, by which the speed of the object presently changes, based on the center-of-gravity position (Px, Py) of the object obtained in S120. More specifically, the control circuit 15 includes a memory (not shown in the drawings) for storing speed data and center-of-gravity position data for the previous frame. Hence, the control circuit 15 determines the current speed of the object by calculating the difference between the center-of-gravity position (Px, Py) of the object from the current frame and that from the previous frame. Next, the control circuit 15 determines the speed-changing amount by calculating the absolute value of the difference between the current speed data obtained for the current frame and the speed data obtained for the previous frame.

In S140, the control circuit 15 compares the current speed-changing amount, calculated in S130, to a predetermined set value. When the current speed-changing amount is less than or equal to the set value (No in S140), composite image data for the current frame is generated and stored in the data buffers 171 in S150. In other words, by controlling the switches $20_j$, raw image data from the raw image data buffer 460 and center-of-gravity image data from the center-of-gravity image data generating circuit 425 are combined and stored in the data buffers 171. The process then continues by obtaining and processing the next frame (S100).

On the other hand, if the current speed changing amount is larger than the set value (Yes in S140), it is determined that the moving state of the object has changed. Accordingly, in S160 the control circuit 15 controls the signal conversion controller 19 to start a monitor display process. After directing the signal conversion controller 19 to begin this process, the control circuit 15 begins acquiring and processing the next frame in S100.

After receiving the command to perform a monitor display process, the signal conversion controller 19 begins directing the signal converter 17 in S170 to sequentially display composite image data for n frames already stored in the data buffers 171, composite image data for the current frame, and composite image data for n subsequent frames. Hence, this process is the same as step S70 in the first embodiment (FIG. 12).

Figure 26:
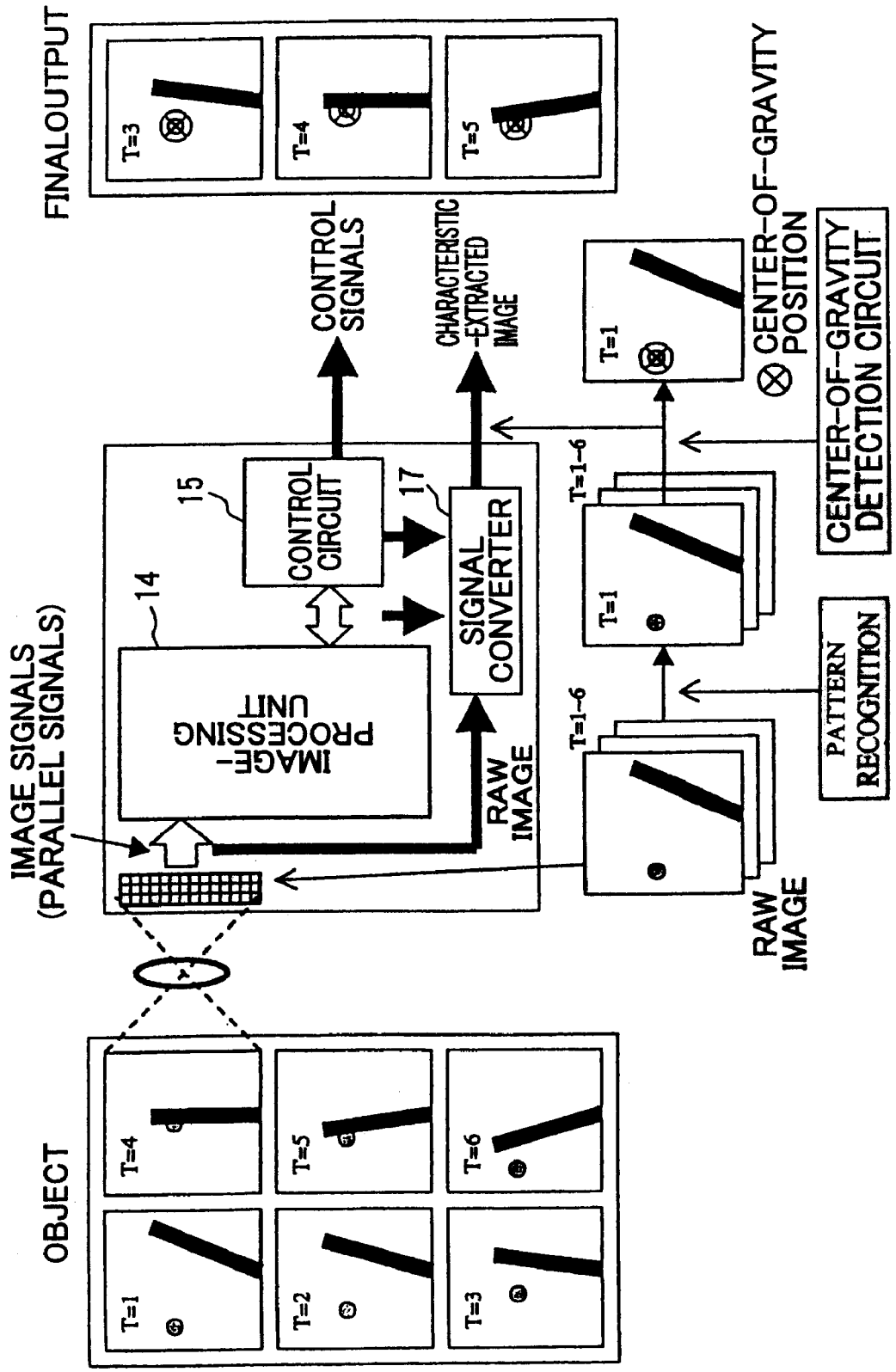
FIG. 26 is an explanatory diagram showing the concept of image processing in the camera system according to the third embodiment.

By performing the operations described above, the camera system 1 of the present embodiment can continuously take images showing the state of a swinging bat, for example, at a high frame rate, as shown in FIG. 26. The camera system 1 can extract and display the frame showing the instant at which the ball, which is the moving object, meets the bat and several frames before and after this instant.

More specifically, the photodetector array 11 and analog-to-digital converter array 13 acquire images for a plurality of consecutive frames at a high frame rate (S100). In the image processing unit 14, the pattern matching circuit 2402 performs a pattern matching process on the acquired image data (S110). In this step, an image of the ball, which is the target object, is used as the m1×m2 reference image, thereby enabling the ball to be extracted from the image data. Next, the center of gravity is calculated for the extracted ball (S120). Position data for the center of gravity of the ball is transferred to the control circuit 15, which then calculates the velocity of the ball based on the difference from the position in the previous frame (S130). When the ball meets the bat, the velocity and direction of the ball change abruptly. It is possible to extract the frame at that moment (S140). The frame for this moment and the frames before and after this moment are set as the final output (S160 and 2170).

According to this process, images for a plurality of frames (T=1–6) showing the bat swinging are acquired consecutively at a high frame rate. The moment at which the ball hits the bat (T=4) is detected. Only the image of the moment at which the ball meets the bat (T=4) and the previous and following images (T=3, 5) are extracted. It is then possible to overlay the position of the ball's center of gravity in the display of these images.

In this way, it is possible to extract images appropriate to the observation objective from an enormous amount of data acquired at a high frame rate.

If the image acquisition rate of the photodetector array 11 and the analog-to-digital converter array 13 according to the present embodiment is 1,000 frames/sec, for example, images can be taken for every four centimeters the ball moves when the ball is traveling at 150 km/hr. Moreover, since the image-processing unit 14 performs image processes in real-time, only desired frames at which the ball meets the bat can be extracted. Accordingly, the images can be displayed on the monitor 18 at a normal frame rate (such as 30 frames/sec) and inputted into a general-purpose image processor supporting NTSC camera input (about 30 frames/sec). Further, since the result of the center-of-gravity process is displayed over the raw image, it is possible to reduce the amount of load placed on subsequent image-processing devices.

Accordingly, the camera system 1 of the present embodiment can monitor a moving object at a high frame rate, extract images only for the desired moment of observation, and output images just before and after that moment. For example, when inspecting a sheet metal drilling process in real-time, it is possible to extract the image at the moment the drill bit, which is the object of observation, contacts and drills through the sheet metal. It is possible to display this image and images before and after this image on the monitor. It is therefore possible to measure the rotational speed and moving speed of the drill bit, bending state of the plate, and the like for this moment. These measurements can be used for conducting more precise inspections and uncovering the causes of abnormalities.

The control process described above calculates the velocity of an object and extracts images when the speed variation of the object exceeds a predetermined value. However, the camera system 1 of the present embodiment can also determine the position of the object, as in the first embodiment. For example, the camera system 1 can determine when the object, the drill bit for example, reaches the sheet metal.

In the present embodiment, the pattern matching circuit 2402 includes N2 total sum of differential absolute values comparators 2430 which are connected to the N2 data transfer lines 1440. However, the pattern matching circuit 2402 can also be configured of a smaller number of total sum of differential absolute values comparators 2430, that is, M total sum of differential absolute values comparators 2430, where M<N2. In this case, switches are provided at the input terminals of the M total sum of differential absolute values comparators 2430. The control circuit 15 estimates a position at which a match of the object can be found in the current frame based on the center-of-gravity position (Px, Py) detected in the previous frame. The control circuit 15 connects the M total sum of differential absolute values comparators 2430 to M neighboring data transfer lines $1440_j$ through $1440_{j+M-1}$ that correspond to a region including the estimated position. The pattern matching circuit 2402 outputs matching image data M(x, y) for these M rows j through j+M−1 and outputs the data 0 for all other data transfer lines. As a result, matching image data M(x, y) corresponding to all N1×N2 pixels is generated and inputted into the center-of-gravity calculating circuit 402. With this configuration, the pattern matching circuit 2402 can generate matching image data using a more simplified construction.

Next, a camera system for high-speed image processing according to a fourth embodiment of the present invention will be described with reference to FIGS. 27(a) and 27(b).

In the present embodiment, an extraction timing is determined by comparing the acquired images to external data.

Figure 27A:
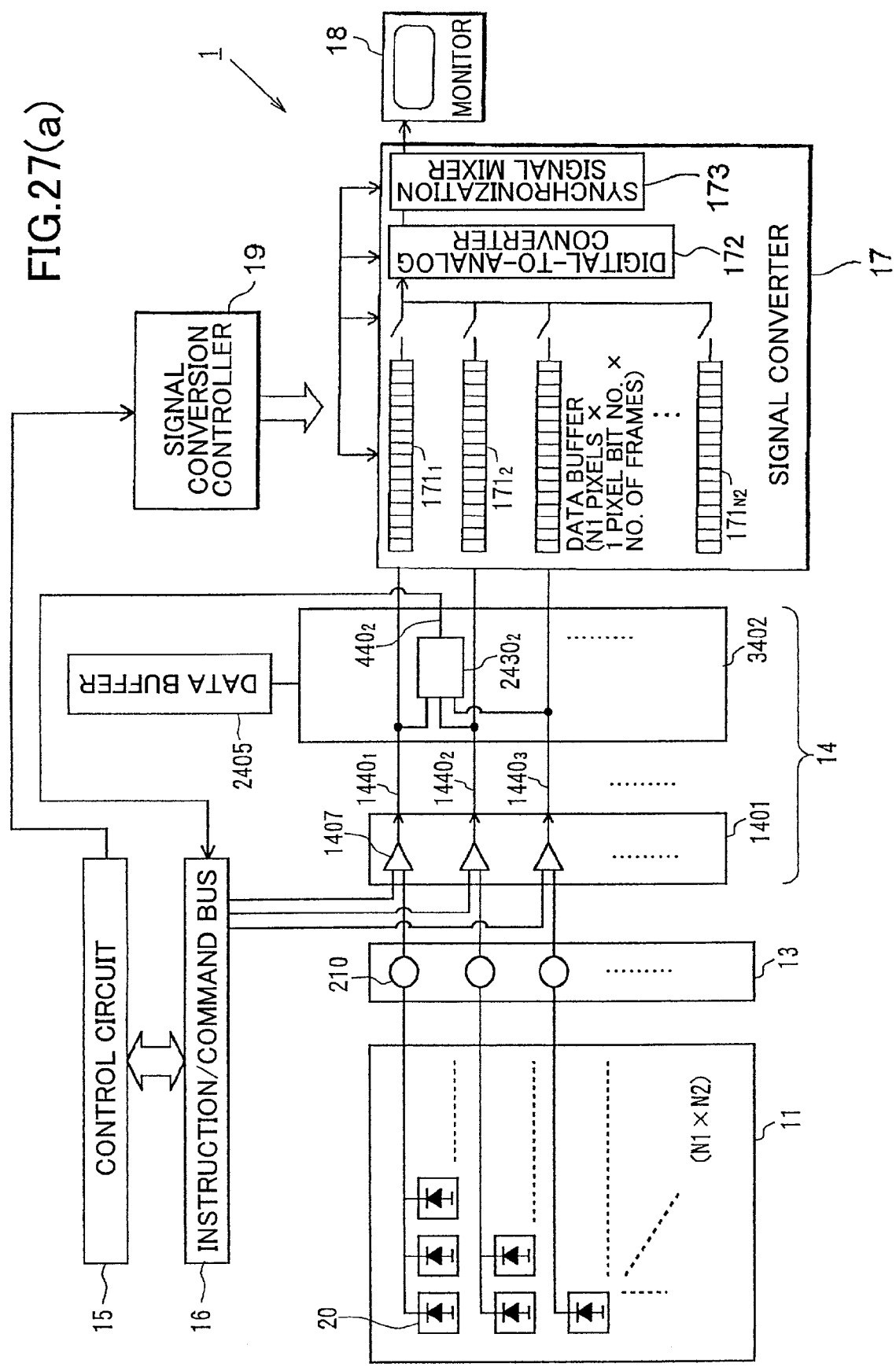
FIG. 27(a) shows the configuration of a camera system for high-speed image processing according to a fourth embodiment of the present invention.

FIG. 27(a) shows the construction of the camera system 1 according to the fourth embodiment of the present invention. The camera system 1 is similar to the camera system 1 of the second embodiment, having an image pre-processing circuit 1401 for performing noise reduction. However, a pattern matching circuit 3402 is provided after the image pre-processing circuit 1401.

As in the second embodiment, the image pre-processing circuit 1401 includes N2 bit comparators $1407_j$. N2 data transfer lines $1440_j$ are connected to the output terminals of the bit comparators $1407_j$ and also to the pattern matching circuit 3402.

In the present embodiment, the pattern matching circuit 3402 performs a matching operation with an m1×m2 reference image on the raw image that has passed through the noise reduction pre-process. In this example, m1 and m2 are set to 3, as in the third embodiment. The pattern matching circuit 3402 differs from the pattern matching circuit 2402 in the third embodiment in that the pattern matching circuit 3402 is configured of only one total sum of differential absolute values comparator $2430_2$. The total sum of differential absolute values comparator $2430_2$ is connected to a single corresponding line from among the N2 data transfer line $1440_j$ (in this example, the data transfer line $1440_2$) and the lines directly above and below this line (in this example, the data transfer lines $1440_1$ and $1440_3$).

The total sum of differential absolute values comparator $2430_2$ has the same configuration as that shown in FIG. 23. However, the output terminal of the comparator 2433 is connected to the control circuit 15 via the instruction/command bus 16.

The pattern matching circuit 3402 allows the N2 data transfer lines $1440_j$ from the image pre-processing circuit 1401 to be fixedly connected directly to the corresponding data buffers $171_j$. Accordingly, after undergoing the noise reduction pre-process in the image pre-processing circuit 1401, the raw image data in the present embodiment is stored directly in the data buffers $171_j$ without being combined with other image data. Therefore, the switches $20_j$ are not provided in the present embodiment.

According to the present embodiment, a search image s(x, y) (having a size of m1×m2) representing the object is pre-stored in the data buffer 2405. When the input image D(x, y) for a certain frame is transferred to the image-processing unit 14, the m1×m2 search image s(p, q) stored in the data buffer is retrieved to perform the matching operation.

The pattern matching circuit 3402 calculates whether any of the N1 number of m1×m2 regions, each of which is centered on one of the N1 pixels of the second row in the photodetector array 11, matches the m1×m2 reference image. That is, the total sum of differential absolute values comparator $2430_2$ calculates the following difference equation.

$$\text{ERROR}(x, 2) = \sum_{p=1}^{3} \sum_{q=1}^{3} |D(x + p - 2, 2 + q - 2) - s(p, q)|$$

The total sum of differential absolute values comparator $2430_2$ outputs a value of one (1) when the result of calculating the function Error is less than or equal to a predetermined threshold value, and outputs a value of zero (0 when the result is greater than the threshold value.

Hence, the function Error is obtained for each of the N1 m1×m2 regions centered on each of the N1 pixels in the second row (x, 2) for an image of a certain frame. If some of the results calculated for the function Error is less than or equal to the predetermined threshold value, that frame is set as the desired timing.

Accordingly, the pattern matching circuit 3402 detects the degree of conformity between the input image D(x, y) and the comparison image s(p, q) in real-time. When an error less than or equal to the threshold value is obtained, the image data for the frame at that time and the image data for the previous and subsequent frames are set as output images. The signal conversion controller 19 directs the signal converter 17 to convert these output images to image signals.

Figure 27B:
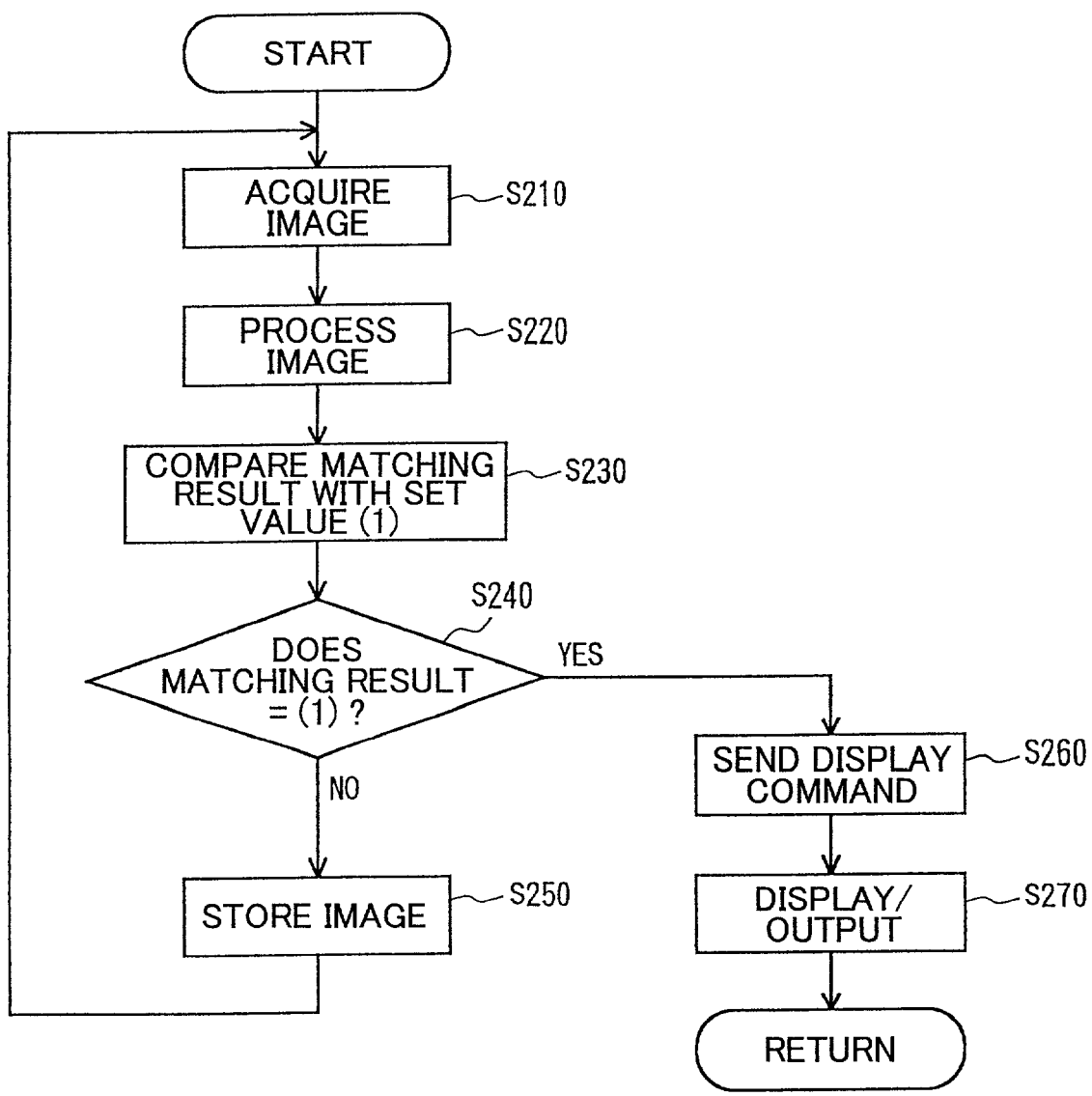
FIG. 27(b) is a flowchart showing the process of control in the camera system according to the fourth embodiment.

The control circuit 15 in the present embodiment performs the process shown in the flowchart of FIG. 27(b). Specifically, as in S10 of the first embodiment (FIG. 12) the control circuit 15 obtains the image for each frame in S210. In S220, the image pre-processing circuit 1401 executes a noise reduction process on the acquired image, and the pattern matching circuit 3402 executes the matching process on the image. In S230, the control circuit 15 determines if any of the N1 comparison results sent sequentially from the total sum of differential absolute values comparator $2430_{2\,is}$ equal to one (1). If none of the N1 comparison results is equal to one (1) (No in S240), the raw image for the current frame is stored in S250 and the process returns to S210 to process the next frame. On the other hand, if at least one of the N1 comparison results is equal to one (1) (Yes in S240), the current timing is determined to be the extraction timing and the process shifts to S260. In S260, a monitor display instruction is outputted to the signal conversion controller 19. In S270, a display/outputting operation is attained. Accordingly, noise-reduced raw image data outputted from the image pre-processing circuit 1401 for the current frame and the previous and subsequent frames is displayed on the monitor 18. With this process, video images before and after a desired timing can be displayed on the monitor 18.

For example, it is possible to extract images at the moment the chip 53 is mounted on a substrate, as described with reference to FIGS. 14(a) through 14(c). In other words, the matching operation determines whether any of predetermined regions, in an input image, that represent predetermined positions on a substrate (corresponding to positions in the second row j of the photodetector array 11 in the present embodiment) matches an image showing the chip 53 as the target image. In doing so, it is possible to extract the moment at which the chip 53 is mounted at any of the predetermined positions on the substrate and to output images at this timing.

A particular aspect of the present apparatus is that it transfers signals in parallel from the plurality of rows in the photodetector array 11. Moreover, the image-processing unit 14 achieves high-speed image processing by performing parallel processes. More specifically, the image pre-processing circuit 1401 includes the plurality of bit comparator $1407_j$, one for each row, in order to perform noise reduction on all the rows in parallel. The pattern matching circuit 3402 includes m1 differential absolute value processors 2431 for each of corresponding m2 rows (the first, second, and third rows in the example described above) and performs a matching operation by determining the absolute values of the differentials for the respective rows in parallel. When tracking an object moving at a high speed, the shape of the object's image varies when the rotation or orientation of the object changes. Therefore, it is difficult to display the object in real-time at a slow frame rate (30 Hz), such as that of a conventional TV camera, because an extremely complex algorithm is necessary to find the same object in images of different frames. However, when capturing images at a high frame rate (>1 KHz), as with the apparatus of the present embodiment, there is only a little difference in images between frames. Therefore, it is possible to track the object accurately by performing a matching calculation at a high rate of speed using the simple algorithm described above.

The camera system for high-speed image processing according to the present invention is not limited to the embodiments described above. Many modifications may be made therein.

In the embodiments described above, the image processing device 14 for parallel processing is provided with one processing element for each row of an image in order to perform image processing in parallel. By performing image processing in parallel, it is possible to operate at a high speed necessary for such large-scale calculations as image data.

Figure 28:
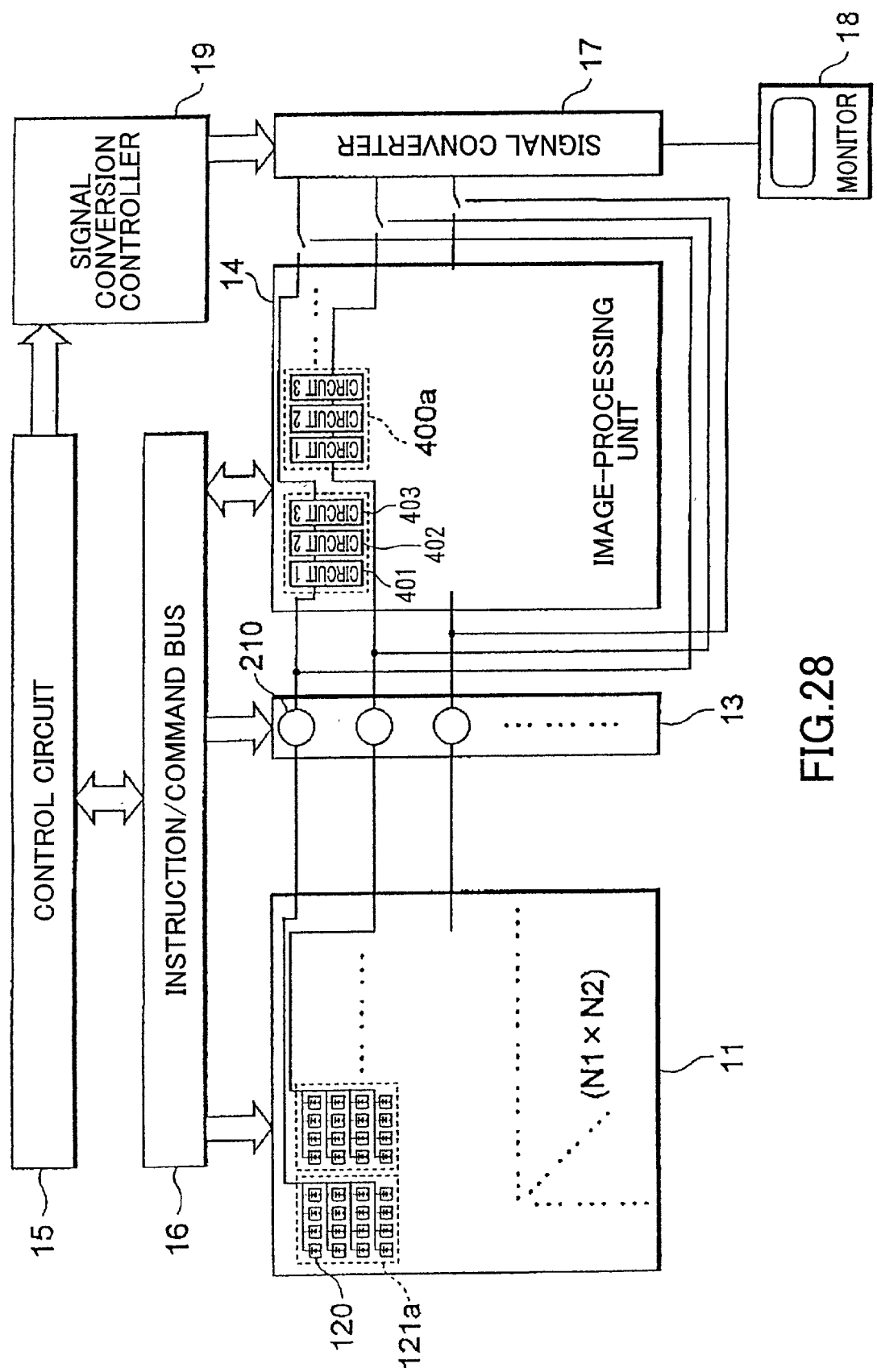
FIG. 28 is a block diagram showing a modification of the camera system according to the present invention.
Figure 29:
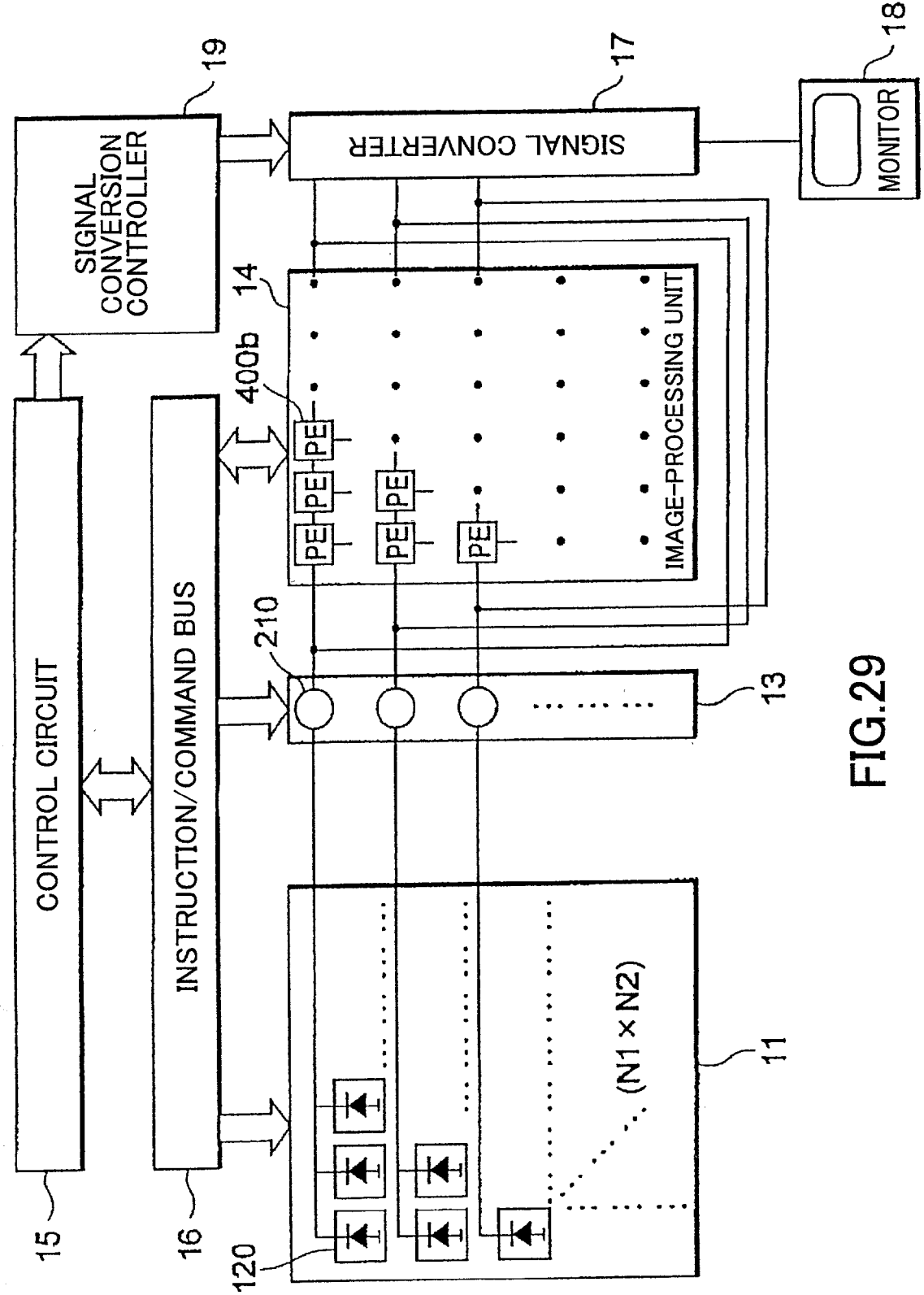
FIG. 29 is a block diagram showing another modifidation of the camera system according to the present invention.

In addition to the examples described above, another method of parallel processing employs a block parallel structure (see FIG. 28). Here, the photodetector array is divided into a plurality of blocks. A plurality of processing circuits 400a (each including the binarization circuits 401, center-of-gravity calculating circuit 402, and edge extraction circuit 403) are provided with a one-on-one correspondence to the plurality of blocks. It is also possible to use a complete parallel structure (see FIG. 29) for performing a completely parallel process. In this method, a plurality of processing circuits 400b are provided with a one-on-one correspondence to the photodetector elements 120 arranged two-dimensionally in the photodetector array 11. The method of parallel processing can be selected according to the desired application, desired level of integration, or required processing speed. In the complete parallel processing method (FIG. 29), the processing elements disclosed in Japanese unexamined patent application publication no. HEI-10-145680, for example, can be used as the processing circuits 400b. The processing circuits 400b can achieve a completely parallel process by performing a total sum calculation, center-of-gravity calculation, or other calculation based on image signals received from the corresponding photodetectors. Accordingly, the apparatus can determine whether the result of the center-of-gravity calculation or the total sum calculation is equivalent to a predetermined set value, for example. The apparatus can determine that the extraction timing has reached when the calculation result becomes equivalent to the predetermined set value, and display the images of a frame for this timing and for previous and subsequent frames. A feature of the block parallel method is its efficiency in finding a match or a center of gravity for each region, while the complete parallel method achieves speed enhancement. Both methods employ an architecture, in which an analog-to-digital converter 210 is provided for each line or each block to perform efficient analog-to-digital conversion and the processing circuits 400a or 400b are arranged in the partially parallel manner or in the complete parallel manner to perform high-speed image processing.

In the first through third embodiments described above, a plurality of image signals are combined together and outputted. That is, in the first embodiment, a raw image signal, center-of-gravity image signal, and edge extraction image signal are combined and outputted. In the second embodiment, the center-of-gravity image signal, edge extraction image signal, and possibly also the raw image signal that has undergone noise reduction and background removal are combined and outputted. In the third embodiment, the raw image signal and center-of-gravity image signal are combined and outputted. However, it is not necessary to combine these signals. That is, a raw image signal generated by the analog-to-digital converter array 13, or either one of the processed image signals generated by the processing circuits 400 in the image-processing unit 14 can be outputted unaltered. In this case, the switches $20_j$ are unnecessary. Hence, similarly as described in the fourth embodiment, each data buffer $171_j$ can be fixedly connected to some data transfer line that is used to transfer image signals desired to be outputted.

Figure 30:
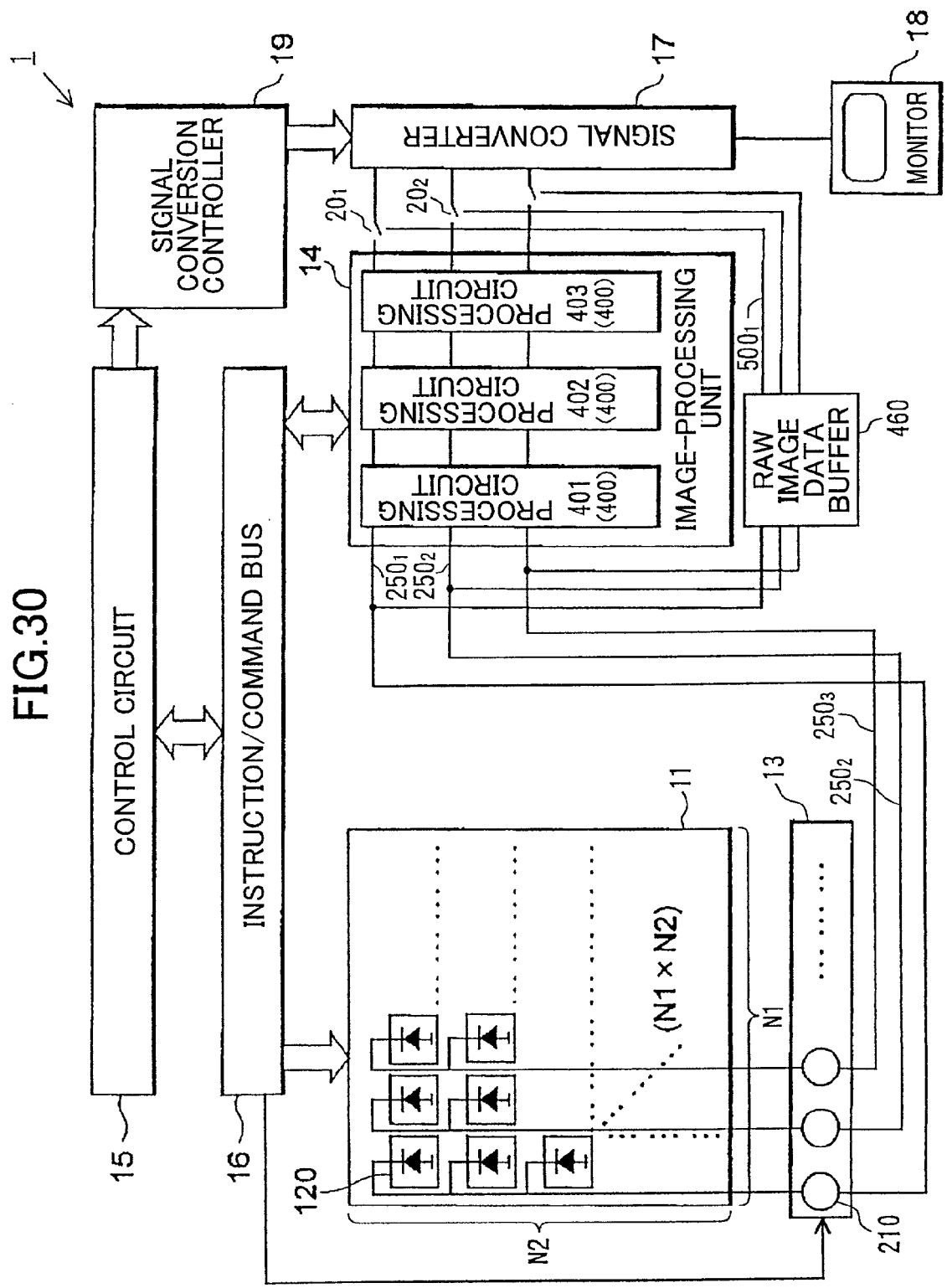
FIG. 30 is a block diagram showing another modifidation of the camera system according to the present invention.

In the above-described embodiments, the plurality of analog-to-digital converters 210 are provided in the analog-to-digital converter array 13 in one-to-one correspondence with the plurality of rows j in the photodetector array 11. However, it is also possible to provide the analog-to-digital converters 210 in one-to-one correspondence with the plurality of columns i, as shown in FIG. 30. In this case, the analog-to-digital converter array 13 includes N1 analog-to-digital converters 210. The N2 photodetector elements 120 in each column i are electrically connected together in the photodetector array 11 and connected to the corresponding analog-to-digital converter 210. In each column i, by switching the vertical scanning signal sequentially, the photoelectric output from each of the N2 photodetector elements 120 can be read sequentially. In this case, the processing circuits 400 in the image-processing unit 14 can perform parallel processing by processing output signals from the plurality of columns i.

Figure 31:
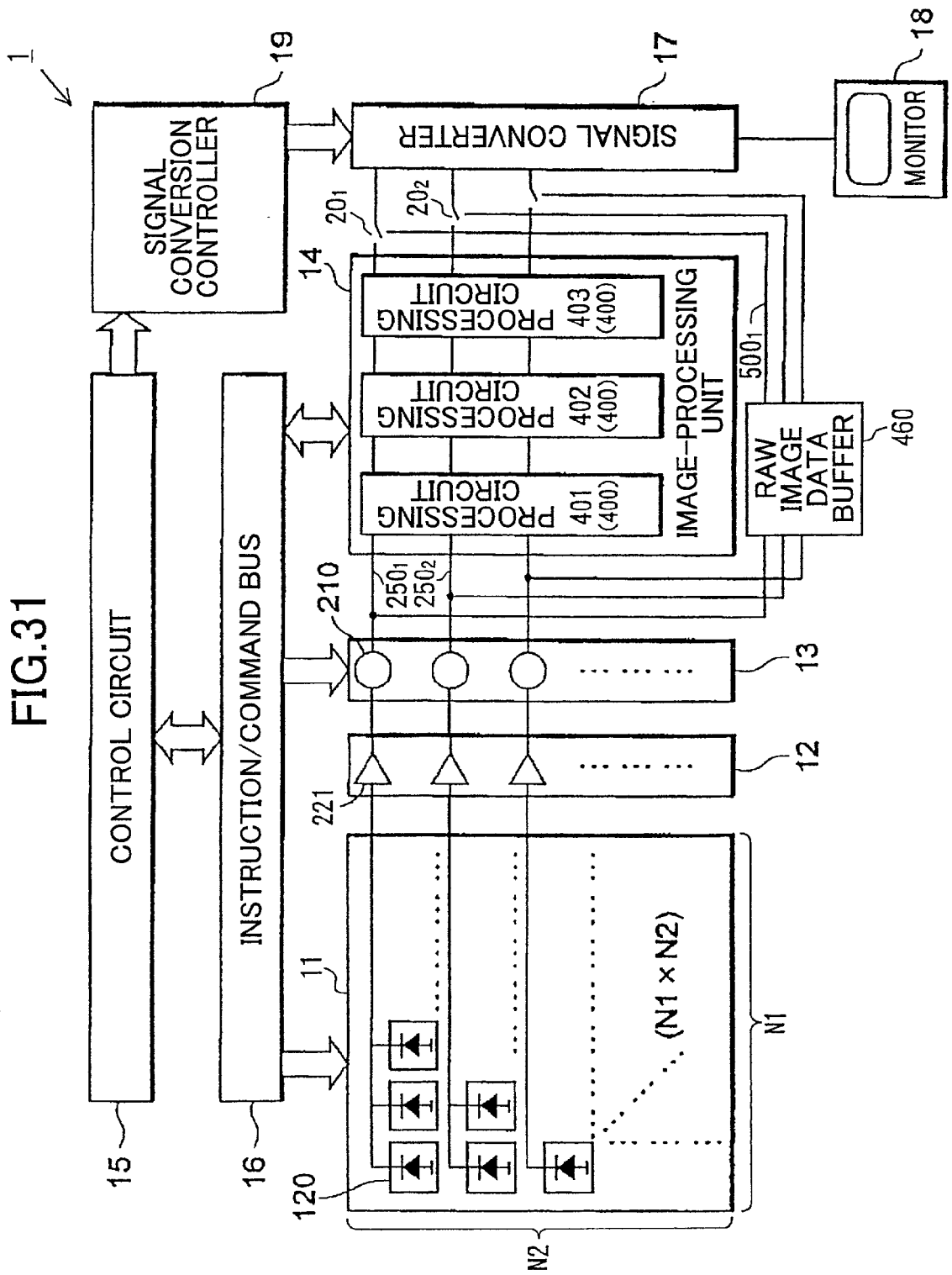
FIG. 31 is a block diagram showing another modifidation of the camera system according to the present invention.

In the above-described embodiments, the analog-to-digital converter 210 includes the charge amp 221. However, the analog-to-digital converter 210 and the charge amp 221 can be provided separately as shown in FIG. 31. As shown in this figure, an amp array 12 is connected to the photodetector array 11. The amp array 12 has N2 charge amps 221. The analog-to-digital converter array 13 is provided between the amp array 12 and the parallel processing unit 14. The analog-to-digital converter array 13 has N2 analog-to-digital converters 210. With this construction, each amp 220 in the amp array 12 successively converts charges, outputted from the N1 photodetectors 120 on the corresponding row 110 of the photodetector array 11, into voltage signals. These analog voltage signals are outputted to the corresponding analog-to-digital converter 210 in the analog-to-digital converter array 13. The analog-to-digital converter 210 successively converts the analog voltage signals to digital signals, and supplies the digital signals to the parallel processing unit 14.

While a single photodetector array 11 is provided in the embodiments described above, it is also possible to provide a plurality of photodetector arrays 11.

The invention claimed is:

1. A camera for high-speed image processing, comprising:
a photodetector array having a plurality of photodetectors, which are arranged two-dimensionally in a plurality of rows and in a plurality of columns and which are divided into a plurality of blocks, the photodetector array repeatedly receiving optical images and generating output signals for optical images in a plurality of consecutive frames at a predetermined frame rate;
an analog-to-digital converter array receiving, from the photodetector array, the output signals for the optical images in the plurality of consecutive frames and generating digital signals in the plurality of consecutive frames, the analog-to-digital converter array including a plurality of analog-to-digital converters in one-on-one correspondence with the plurality of blocks in the photodetector array, each analog-to-digital converter performing analog-to-digital conversion of the output signals which are read sequentially from the photodetectors in a corresponding block;
an image-processing unit performing predetermined processes on the plurality of consecutive frames of the digital signals, which are successively transferred from the analog-to-digital converter array and which correspond to the signals outputted from the photodetectors, thereby generating processed result signals, other than the output signals for the optical signals, indicating results of the processes on the plurality of consecutive frames;
a selector selecting, among the plurality of consecutive frames, at least one frame based on the processed result signals for the plurality of consecutive frames obtained by the image-processing unit;
a signal converter converting, into an image signal of a desired frame rate, at least one of the processed result signal and the digital signal from the analog-to-digital converter array, the signal converter outputting the image signal; and
a signal conversion controller controlling the signal converter to perform the converting for the at least one frame selected by the selector.

2. A camera for high-speed image processing as claimed in claim 1, wherein the desired frame rate is lower than the predetermined frame rate.

3. A camera for high-speed image processing as claimed in claim 1, wherein the signal converter converts either one of the digital signal from the analog-to-digital converter array and the processed result signal, into the image signal of the desired frame rate, and outputs the image signal.

4. A camera for high-speed image processing as claimed in claim 1, wherein the signal converter combines the digital signal from the analog-to-digital converter array and the processed result signal, converts the combined signal into the image signal of the desired frame rate, and outputs the image signal.

5. A camera for high-speed image processing as claimed in claim 1, wherein the signal converter has a buffer memory at a signal input side thereof, the buffer memory storing at least one of the digital signal from the analog-to-digital converter array for at least several frames and the processed result signal for the at least several frames.

6. A camera for high-speed image processing as claimed in claim 1, further comprising a data buffer storing predetermined process data, the image-processing unit performing a predetermined parallel process, using the predetermined process data, onto the digital signals that are transferred from the analog-to-digital converter array and that correspond to the signals outputted from the photodetectors.

7. A camera for high-speed image processing as claimed in claim 1, wherein the plurality of analog-to-digital converters in the analog-to-digital converter array are provided in one-on-one correspondence with the plurality of rows of photodetectors in the photodetector array.

8. A camera for high-speed image processing as claimed in claim 1, wherein the plurality of analog-to-digital converters in the analog-to-digital converter array are provided in one-on-one correspondence with the plurality of columns of photodetectors in the photodetector array.

9. A camera for high-speed image processing as claimed in claim 1, wherein the image-processing unit includes a plurality of processors in one-to-one correspondence with the plurality of photodetectors, the plurality of processors performing parallel processes on the digital signals that are transferred from the analog-to-digital converter array and that correspond to the signals outputted from the plurality of photodetectors.

10. A camera for high-speed image processing as claimed in claim 1, wherein the image-processing unit includes at least one parallel processing circuit, each of the at least one parallel processing circuit performing a corresponding parallel process on the digital signals that are transferred from the analog-to-digital converter array and that correspond to the signals outputted from the photodetectors, thereby outputting a processed result signal indicative of the processed result, the selector selecting at least one frame based on at least one process result from the at least one parallel processing circuit, the signal converter converting at least one of the digital signal from the analog-to-digital converter array and the processed result signal obtained by the at least one parallel processing circuit, into the image signal of the desired frame rate, and outputting the image signal.

11. A camera for high-speed image processing as claimed in claim 10, wherein each of the at least one parallel processing circuit is provided with several processing elements in one-to-one correspondence with several blocks that make up at least a portion of all the plurality of blocks in the photodetector array, each of the several processing elements performing a predetermined parallel process on the digital signals that are transferred from the corresponding analog-to-digital converter and that are equivalent to the signals outputted from the photodetectors existing in the corresponding block.

12. A camera for high-speed image processing as claimed in claim 10, wherein the plurality of analog-to-digital converters in the analog-to-digital converter array are provided in one-to-one correspondence with the plurality of rows of photodetectors in the photodetector array, each of the at least one parallel processing circuits including several processing elements which are provided in one-to-one correspondence with several rows that make up at least a portion of all the plurality of rows in the photodetector array, each of the several processing elements performing a predetermined parallel process on digital signals that are transferred from the analog-to-digital converter array and that are equivalent to the signals outputted from the photodetectors in the corresponding row.

13. A camera for high-speed image processing as claimed in claim 1, wherein the selector selects at least one frame that includes one frame, processed results thereof obtained by the image-processing unit satisfying a predetermined condition.

14. A camera for high-speed image processing as claimed in claim 13, wherein the selector judges whether or not the processes results for the consecutive frames satisfy the predetermined condition, determines one frame, processed results thereof satisfying the predetermined condition, and selects at least one frame including the determined one frame.

15. A camera for high-speed image processing as claimed in claim 1, wherein the image processing unit performs a characteristic extracting process on the plurality of consecutive frames of the digital signals to determine characteristics of the consecutive frames, and wherein the selector judges whether or not the extracted characteristics of the consecutive frames satisfy the predetermined condition, determines one frame, a characteristic thereof satisfying the predetermined condition, and selects at least one frame including the determined one frame.

16. A camera for high-speed image processing as claimed in claim 15, wherein the image processing unit performs a center of gravity calculation process on the plurality of consecutive frames of the digital signals to determine locations of the centers of gravity in the consecutive frames of the digital signals, and wherein the selector judges whether or not the locations of centers of gravity in the consecutive frames satisfy the predetermined condition, determines one frame, the locations of the center of gravity thereof satisfying the predetermined condition, and selects at least one frame including the determined one frame.

17. A camera for high-speed image processing as claimed in claim 15, wherein the image processing unit performs a pattern matching process on the plurality of consecutive frames of the digital signals to generate the processed result signals indicating whether or not a predetermined pattern is detected in the consecutive frames, and wherein the selector determines, based on the process result signals, one frame in which the predetermined pattern is detected, and selects at least one frame including the determined one frame.

18. A camera for high-speed image processing as claimed in claim 1, wherein the image-processing unit includes a parallel processing circuit that performs a parallel process on the plurality of consecutive frames of the digital signals to generate the processed result signals indicative of whether or not the consecutive frames of the digital signals satisfy a predetermined condition, and wherein the selector selects at least one frame that includes one frame, a processed result signal thereof indicating that the one frame satisfies the predetermined condition.

19. A camera for high-speed image processing as claimed in claim 18, wherein the parallel processing circuit performs a center of gravity calculation process on the plurality of consecutive frames of the digital signals to generate the processed result signals indicative of the locations of the centers of gravity in the consecutive frames of the digital signals, and wherein the selector judges, based on the processed result signals, whether or not locations of the centers of gravity of the consecutive frames satisfy the predetermined condition, determines one frame, the locations of the center of gravity thereof satisfying the predetermined condition, and selects at least one frame including the determined one frame.

20. A camera for high-speed image processing as claimed in claim 18, wherein the parallel processing circuit performs a pattern matching process on the plurality of consecutive frames of the digital signals to generate the processed result signals indicating whether or not a predetermined pattern is detected in the consecutive frames, and wherein the selector determines, based on the processed result signals, one frame in which the predetermined pattern is detected, and selects at least one frame including the determined one frame.

* * * * *